United States Patent
Goh et al.

(10) Patent No.: US 12,530,090 B1
(45) Date of Patent: Jan. 20, 2026

(54) INFORMATION HANDLING SYSTEM KEYBOARD WITH ADAPTIVE MODULAR KEYS

(71) Applicant: Dell Products L.P., Round Rock, TX (US)

(72) Inventors: Peng Lip Goh, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/910,232

(22) Filed: Oct. 9, 2024

(51) Int. Cl.
  *G06F 3/023* (2006.01)
  *G06F 3/02* (2006.01)
  *G06F 3/044* (2006.01)

(52) U.S. Cl.
  CPC .......... *G06F 3/0238* (2013.01); *G06F 3/0213* (2013.01); *G06F 3/0237* (2013.01); *G06F 3/044* (2013.01); *G06F 2203/04108* (2013.01)

(58) Field of Classification Search
  None
  See application file for complete search history.

(56) References Cited

U.S. PATENT DOCUMENTS

| | | | |
|---|---|---|---|
| 9,606,664 | B2 | 3/2017 | Knepper et al. |
| 10,148,268 | B2 | 12/2018 | Bolender |
| 10,429,901 | B2 | 10/2019 | Aurongzeb et al. |
| 10,535,323 | B2 | 1/2020 | Ward et al. |
| 10,712,832 | B2 | 7/2020 | Torres et al. |
| 10,811,201 | B1 | 10/2020 | Files et al. |
| 10,852,769 | B2 | 12/2020 | Yildiz et al. |
| 10,990,204 | B1 | 4/2021 | Trim et al. |
| 11,347,314 | B2 | 5/2022 | Knoppert et al. |
| 11,951,385 | B2 | 4/2024 | Soelberg |
| 2017/0149433 | A1* | 5/2017 | Bolender ........... H03K 17/9622 |
| 2020/0319679 | A1 | 10/2020 | Knoppert et al. |
| 2021/0247850 | A1* | 8/2021 | Norwalk ................ G06F 3/038 |

* cited by examiner

*Primary Examiner* — Stephen T. Reed
(74) *Attorney, Agent, or Firm* — Zagorin Cave LLP; Robert W. Holland

(57) ABSTRACT

An information handling system keyboard liquid crystal display (LCD) presents visual images of key values through adaptive modular keys placed over the LCD and having a transparent key cap. Each adaptive modular key has a base portion that magnetically couples to the LCD and an upper portion slidingly engaged in the base portion biased to a raised position and depressing to indicate an input by contacting the LCD. A controller detects the adaptive modular key positions to automatically determine visual images for presentation at the LCD under each key.

19 Claims, 52 Drawing Sheets

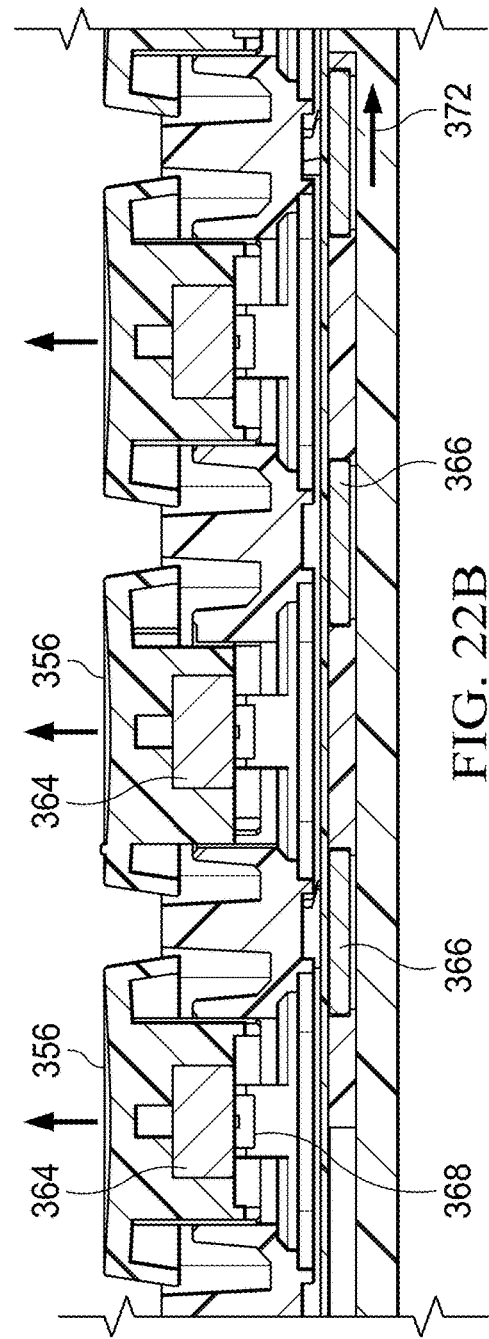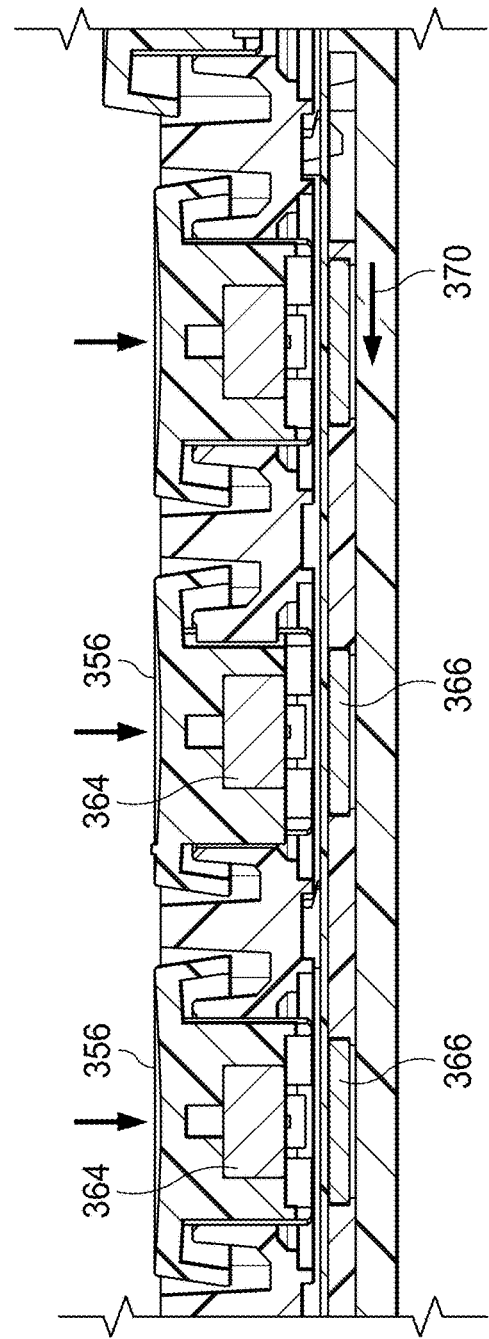

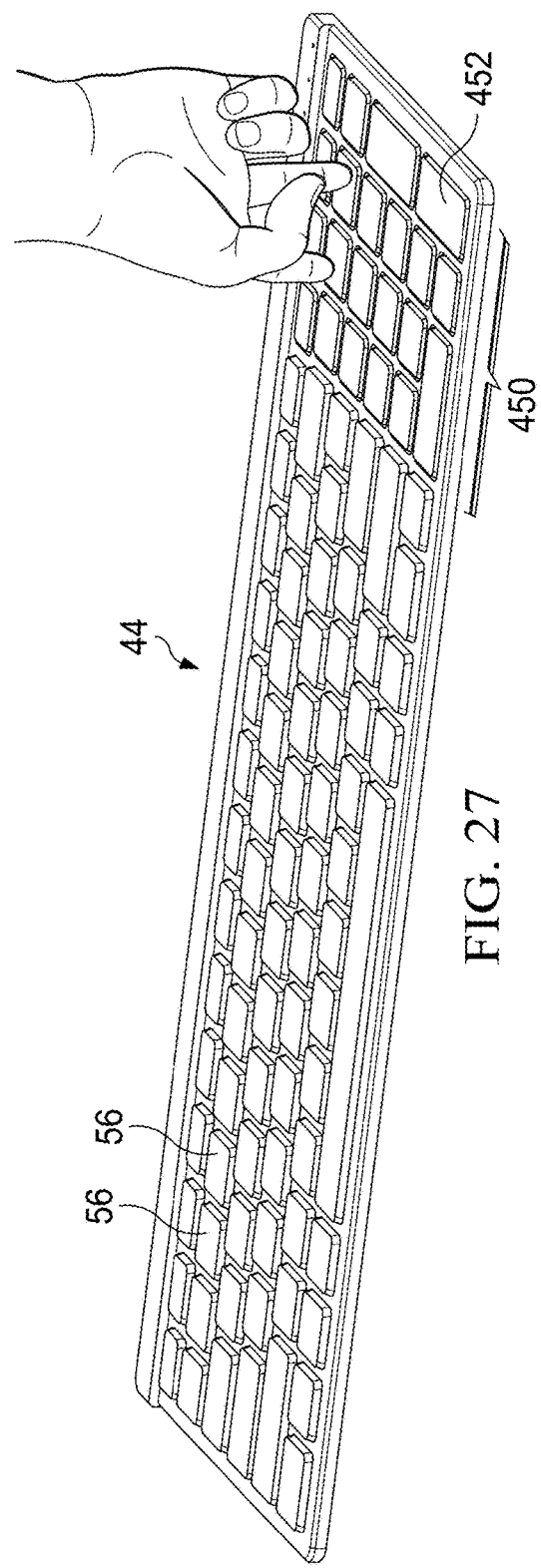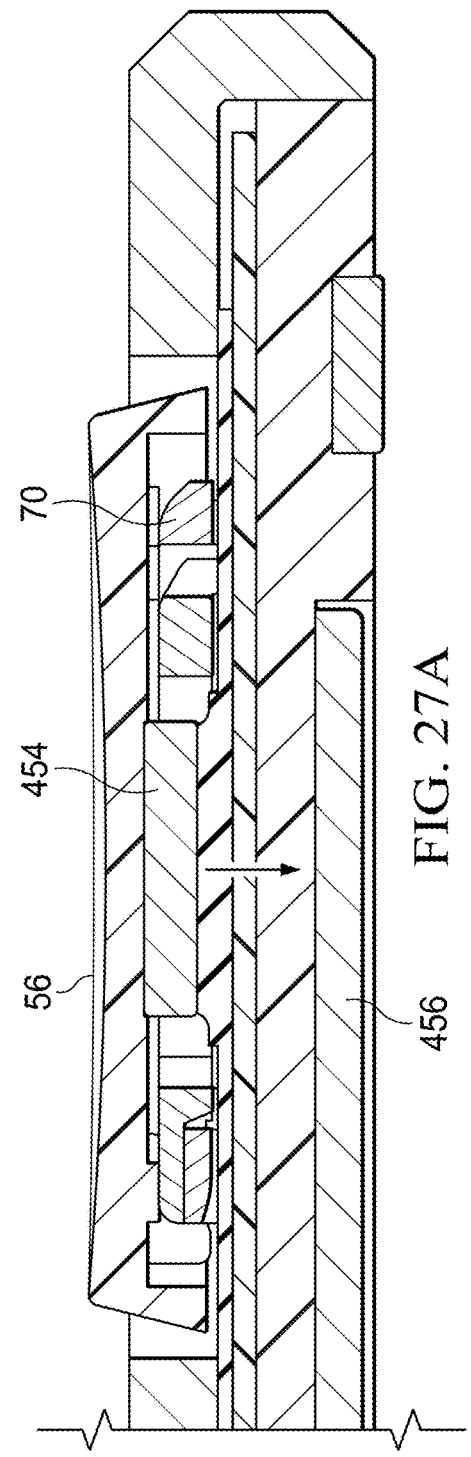

INFORMATION HANDLING SYSTEM KEYBOARD WITH ADAPTIVE MODULAR KEYS

BACKGROUND OF THE INVENTION

Field of the Invention

The present invention relates in general to the field of information handling system keyboards, and more particularly to an information handling system keyboard with adaptive modular keys.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components coupled in a housing, such as a central processing unit (CPU) and random access memory (RAM) that cooperate to execute instructions that process information. Stationary information handling systems, such as desktops and towers, build the processing components in a stationary housing to interact with end users through peripheral devices, such as a peripheral keyboard, mouse and display. Portable information handling systems integrate processing components, a keyboard, a display and a power source in a portable housing to support mobile operations. Portable information handling systems allow end users to carry a system between meetings, during travel, and between home and office locations so that an end user has access to processing capabilities while mobile. When in a fixed location, such as an office cubicle, portable information handling systems will typically interact through both integrated and peripheral devices, such as through a docking station that supports a display, keyboard and mouse. Generally, peripheral devices offer a more user friendly interface with a greater size and a layout that is not constrained by the portable housing footprint.

Peripheral keyboards tend to offer a more natural input experience than integrated keyboards. Peripheral keyboards can include a larger frame with a longer layout of keys that often includes function keys and a number pad. A peripheral keyboard frame can have an incline that aids end user typing and keys with a greater vertical travel that offers a more natural feedback to an end user for more rapid and accurate typing inputs than a typical integrated keyboard. Peripheral keyboards typically operate through either a cabled interface or a wireless interface. When a USB cable or an internal bus cable interfaces a keyboard with an embedded controller and CPU, power to detect key inputs through the keyboard matrix is typically provide from the information handling system power supply, such as through a USB power pin of a USB port and cable connector. When a keyboard interfaces with an information handling system through a wireless interface, the keyboard typically includes a wireless network interface controller (WNIC) with a radio that communicates key inputs, such as through BLUETOOTH. To support operation of the WNIC, the keyboard will typically include a battery, such as a rechargeable lithium ion battery.

One difficulty with conventional keyboards is that the physical beating taken at a keyboard during normal use can result in failures of keys that impact end user interactions. When a key fails, the keyboard is typically discarded, which generates unnecessary waste at the first failure of any key. Another difficulty is that a conventional keyboard tends to have a large desktop footprint that is centrally-located and can disrupt an end user's workflow. For instance, when an end user changes between keyboard and mouse input devices, the end user may have to shift the positions of the keyboard and mouse to achieve a comfortable position to make inputs. As another example, when a keyboard integrates into a portable information handling system housing the keys tend to have a smaller size and leave room for a touchpad and palm rest. Another difficulty is that conventional QWERTY keyboards have a set layout that limits flexibility for adding functions as the types of inputs desired by end users change over time. For instance, conventional keyboards tend to include a function row that accept defined functions as inputs that can vary based upon key combinations, such as pressing a function, control or alt key. Another difficulty involves maintaining keyboard security so that only authorized end users have access to an information handling system through a keyboard.

SUMMARY OF THE INVENTION

Therefore, a need has arisen for a system and method which offers a more efficient keyboard footprint use to accept end user inputs.

In accordance with the present invention, a system and method are provided which substantially reduce the disadvantages and problems associated with previous methods and systems for accepting end user inputs at a keyboard. Key input selection is enhanced with touch detection for proximity sensing near the keys and adaptable presentation of key input values by an underlying display panel.

More specifically, an information handling system processes information with a processor and memory that cooperate to execute instructions based upon inputs by an end user to a keyboard having plural keys. In one embodiment, the keyboard has plural modular keys that independently snap to a circuit board having a contact aligned to accept key press inputs. Alternatively, the modular key magnetically couples over a display panel that presents key input values through a transparent key cap. In another embodiment, a touch detection sensor is placed below the keyboard keys to sense by proximity a finger location at the key so that key presses at a side of the key is given a different input value than key presses in the center of the key. The capacitive detection sensor supports a touchpad function above the keys that is enhanced when the keys are retracted during touchpad operations, such as by interactions with a magnetic field. As an alternative, optical sensors deployed under plural keys in a touchpad-type area detect and identify gestures made by an end user above the keys to manage the key inputs. In one embodiment, a speaker included in the keyboard communicates commands to peer devices with ultrasonic pulses that are detected and decoded by microphones of the peer devices. Each of the embodiments may be used in peripheral keyboards and integrated keyboards of portable information handling systems.

The present invention provides a number of important technical advantages. One example of an important technical advantage is that a keyboard is more readily repaired by selective replacement of a modular key. The modular key placed over a display panel and having a transparent key cap adapts to accept different input values presented by the display panel. A capacitive touch detection membrane under some or all of the keys enhances flexibility of key inputs by detecting finger proximity near a key, such as to vary the value of the key input based upon the location of the key that is pressed for the input, to highlight key values at a display presentation for user awareness of finger locations and to support a touchpad function with finger tracking in a defined zone of the keyboard. Keyboard security is enhanced by limiting inputs to keys until a pattern is traced in the touchpad area in conjunction with other security measures. Automated retraction of keys to a lower position by magnetic attraction reduces the distance to the touchpad for more accurate proximity sensing. Metallic or other conductive material embedded in plastic keys above the capacitive touch detection sensors enhances the proximity sensing.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 22, 22A, 22B and 22C depict sectional transparent views of the keyboard having key retraction and touch sensing to support dual authentication for keyboard key access;

FIGS. 27 and 27A depict an alternative embodiment of the peripheral keyboard having a touchpad area in a peripheral keyboard under number pad keys;

DETAILED DESCRIPTION

An information handling system keyboard offers enhanced interactions by proximity sensing below the keyboard keys, including improved feedback to end users, more efficient use of keyboard footprint for touchpad interactions and improved repairability. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
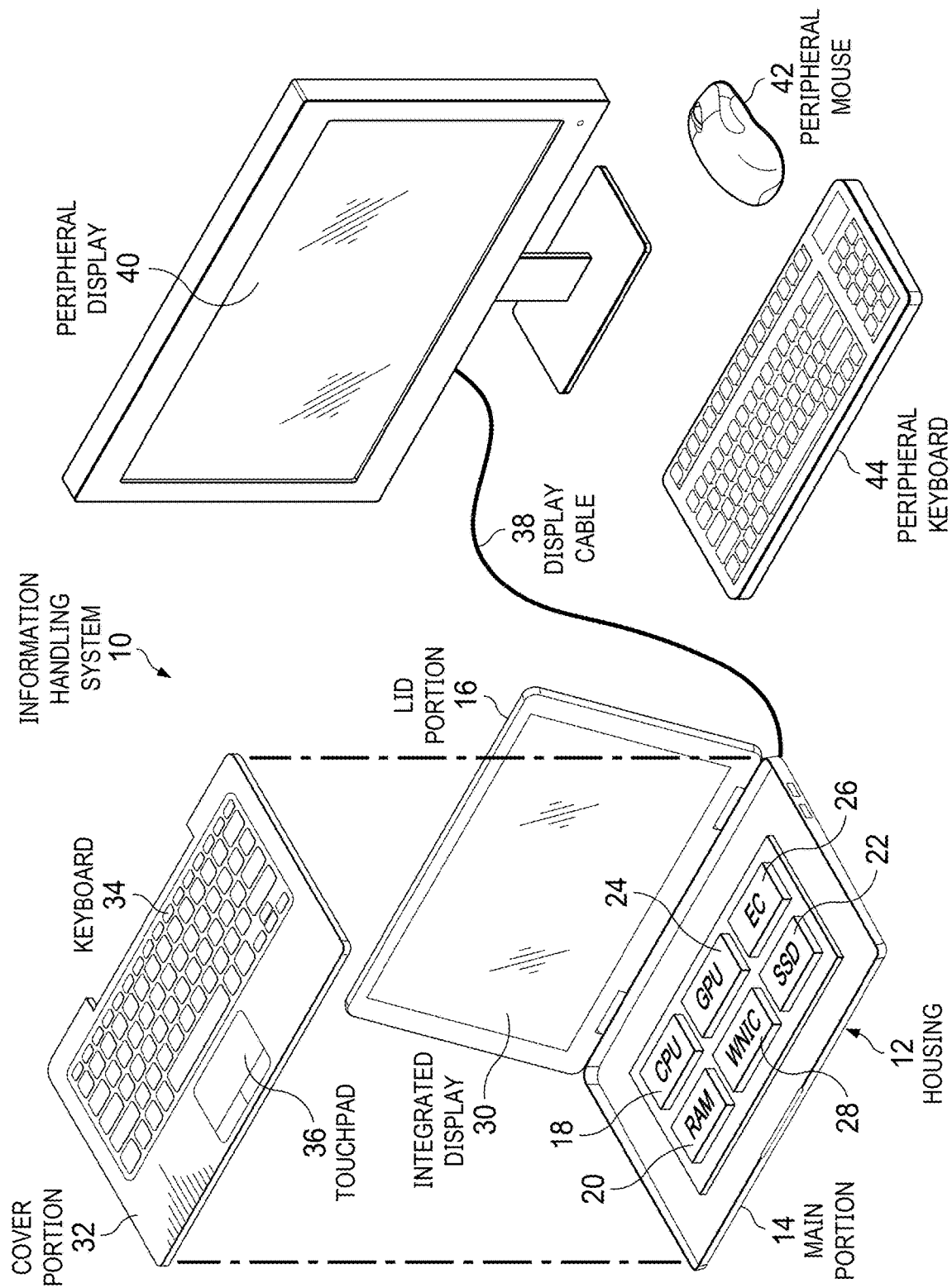
FIG. 1 depicts an exploded perspective view of an information handling system interfaced with an integrated keyboard and a peripheral keyboard that have modular keys to accept end user inputs.

Referring now to FIG. 1, an exploded perspective view depicts an information handling system 10 interfaced with an integrated keyboard 34 and a peripheral keyboard 44 that have modular keys to accept end user inputs. In the example embodiment, information handling system 10 is built in a portable housing 12 having a main portion 14 rotationally coupled to a lid portion 16 in a convertible configuration to open and close. Processing components coupled in main portion cooperate to process information, such as a central processing unit (CPU) 18 that executes instructions in cooperation with a random access memory (RAM) 20 that stores the instructions and information. A solid state drive (SSD) 22 has persistent storage that stores information and instructions when the system powers down, such as an operating system and applications that execute as instructions on CPU 18. A graphics processing unit (GPU) 24 further processes information to define visual images for presentation at a display. An embedded controller executes firmware instructions stored in non-transitory memory, such as flash, to manage operating conditions in the housing, such as application of power, maintaining thermal constraints and interacting with input/output (I/O) devices. A wireless network interface controller (WNIC) 28 supports communication with external devices, such as through Ethernet, WIFI and BLUETOOTH. An integrated display 30 presents information as visual images, such as by scanning pixel values to display pixels.

A housing cover portion 32 couples over housing main portion and supports a keyboard 34 that accepts keyed inputs and a touchpad 36 that accepts touched inputs. For example, the keyed and touch inputs are communicated through embedded controller 26 to CPU 18. In addition to managing inputs of integrated I/O devices, embedded controller 26 manages external peripheral devices, such as a peripheral display 40 that receives visual image information through a display cable 38, a peripheral keyboard 44 and a peripheral mouse 42. In the example embodiment, integrated keyboard 34 and peripheral keyboard 44 can have a variety of enhancements to enhance end user interactions, such as backlight to illuminate key values in low ambient light conditions and a liquid crystal display to accept touch inputs at the keyboard. In various embodiments, keyboards 34 and 44 include modular keys that couple in place as independent keys. The modular keys may have transparent key caps so that key values are presented through the key cap by an underling display panel. One example embodiment includes a touch or position detection sensor to detect end user touch and gesture inputs, such as by retracting keys in a touchpad area to have the key cap upper surface act as a touchpad. Other modular keys accept multi-value inputs by detection touch position at the key cap to perform a "combination key input" with only a single key press.

Figure 2:
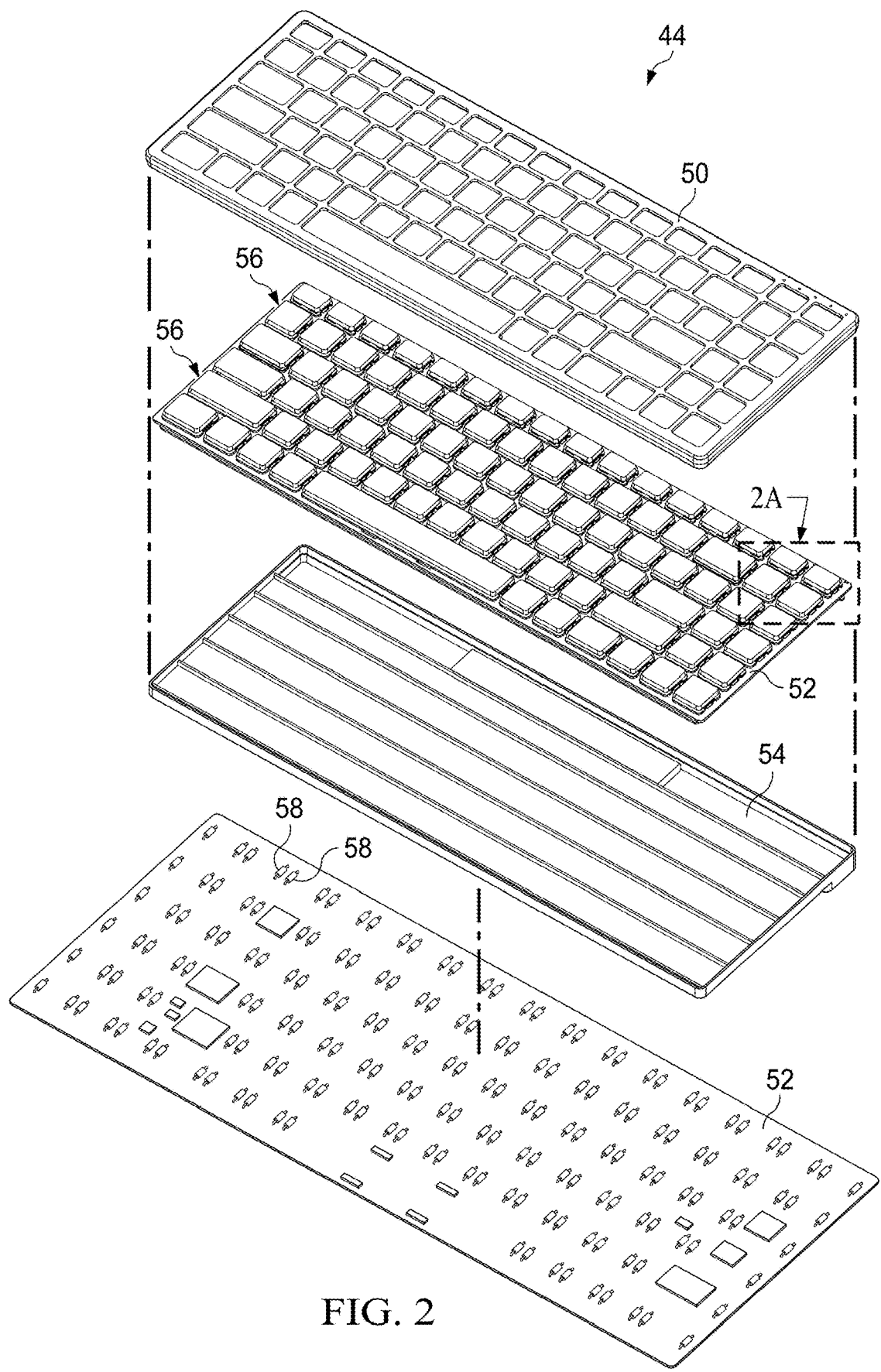
FIGS. 2, 2A, 2B and 2C depict exploded perspective and detailed views of a peripheral keyboard configured with modular keys that couple and decouple to a circuit board as independent units.
Figure 2A:
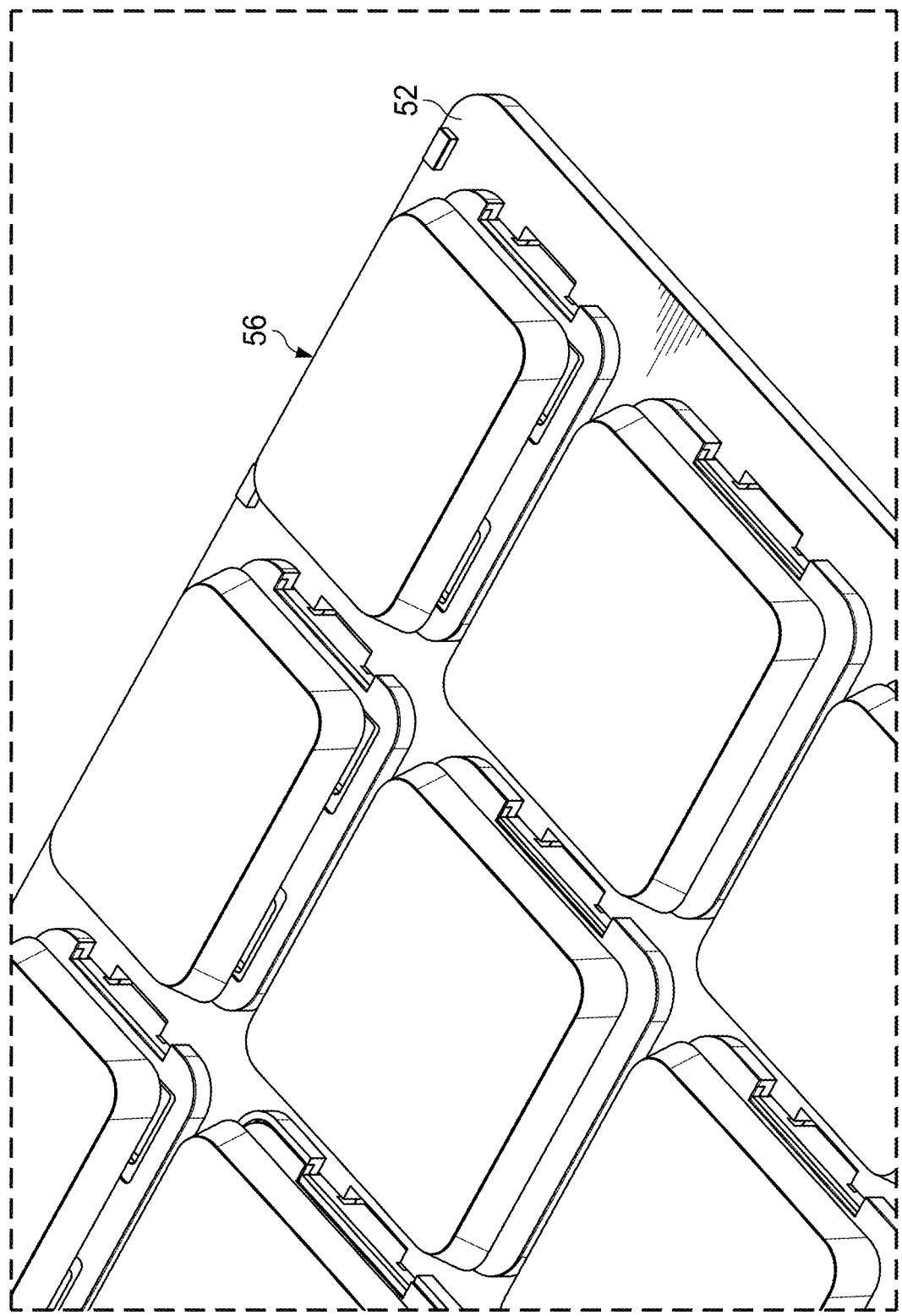
Figure 2B:
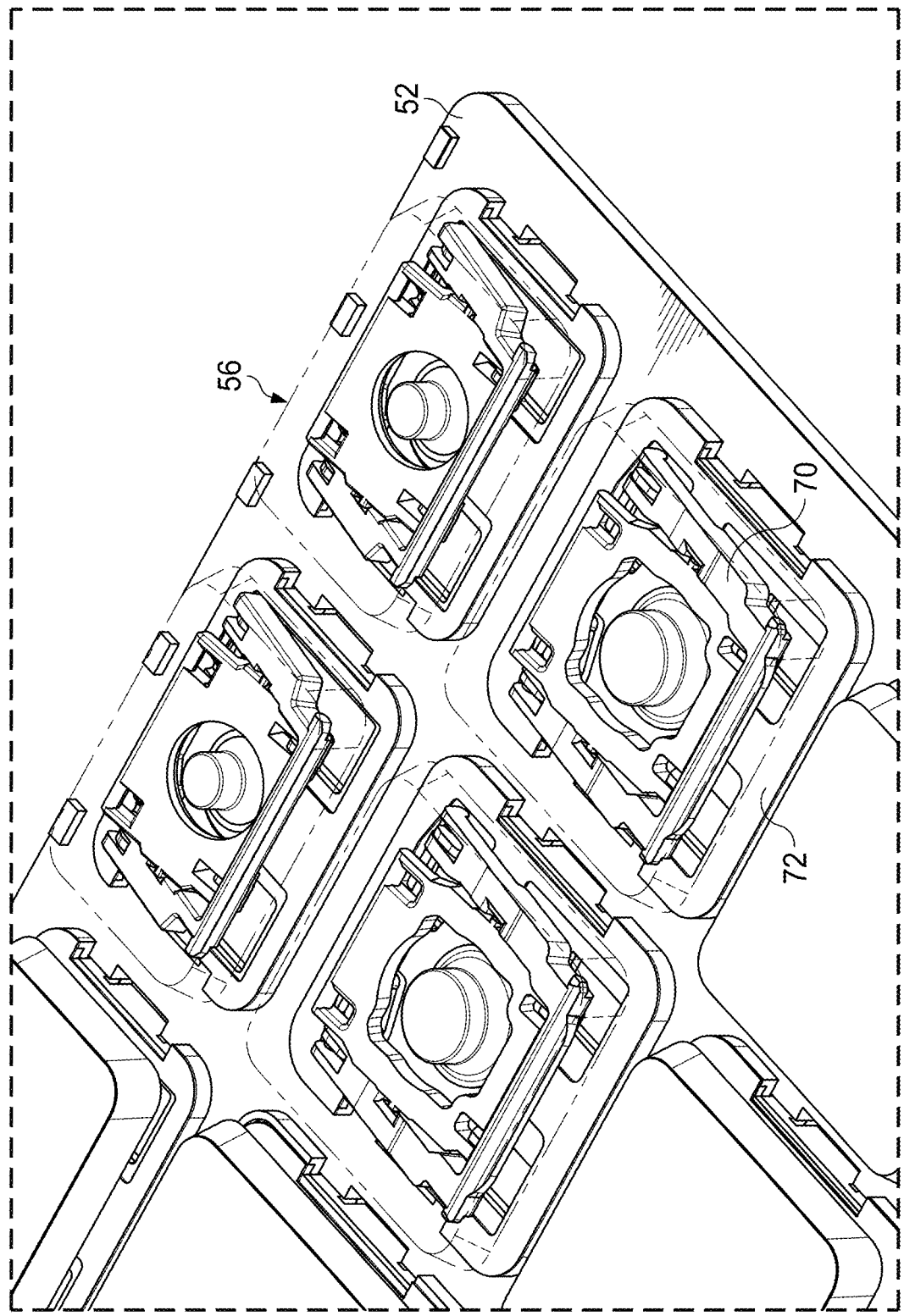
Figure 2C:
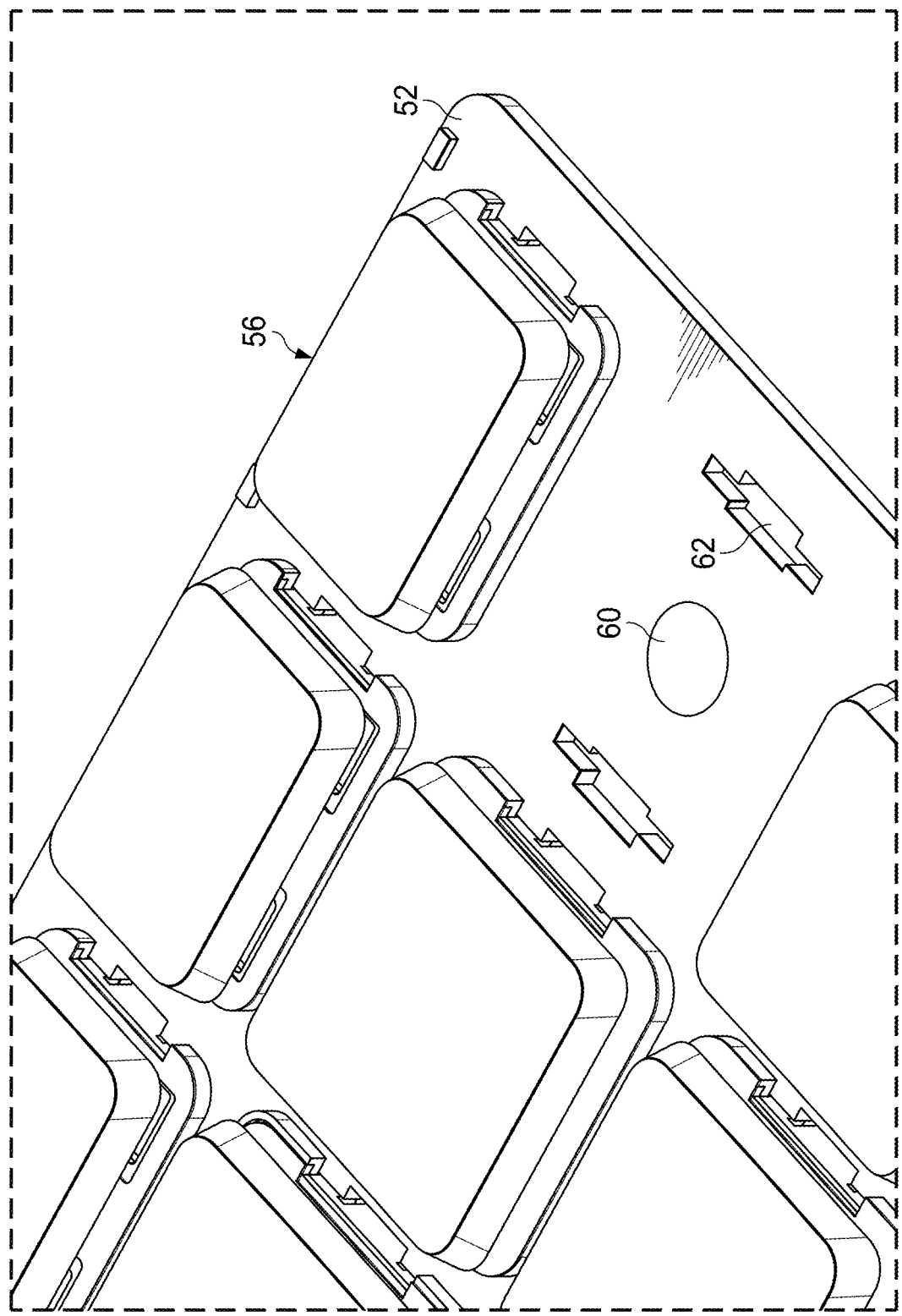

Referring now to FIGS. 2, 2A, 2B and 2C, exploded perspective and detailed views depict a peripheral keyboard 44 configured with modular keys 56 that couple and decouple to a circuit board 52 as independent units. FIG. 2 depicts an exploded view of keyboard 44 having an assembly of modular keys 56 coupled individually to keyboard 52. The assembly of modular keys 56 on circuit board 52 is captured between a bottom case 54 and a top case 50 that has a matrix of openings through which modular keys 56 extend upwards. Keyboard 52 is also shown as a bottom view having pairs of openings through which snap connectors 58 insert from a modular key above and aligned with a conductive pad that the key contacts when pressed to indicate an input. FIG. 2A depicts a detailed view of modular keys 56 each independently coupled to circuit board 52. FIG. 2B depicts a transparent view of the modular keys 56 coupled to circuit board 52. Each modular key 56 includes a scissors 70 that defines a vertical range of motion of the key cap and a biasing assembly 72 that includes a rubber dome aligned with a circuit board contact pad to bias the key upward and away from circuit board 52. FIG. 2C depicts the detailed view with one of the modular keys 56 removed from circuit board 52 to expose a contact pad 60 that accepts a key input when a conductive member contacts the contact pad, such as by completing a circuit across a split conductive area. On each side of conductive pad 60 is an opening 62 to fit a snap connector 58 of the modular key in place. The opening has an outer region with a smaller size to accept a guide of the modular key and a central region to accept the snap, as is shown in greater detail below.

Figure 3:
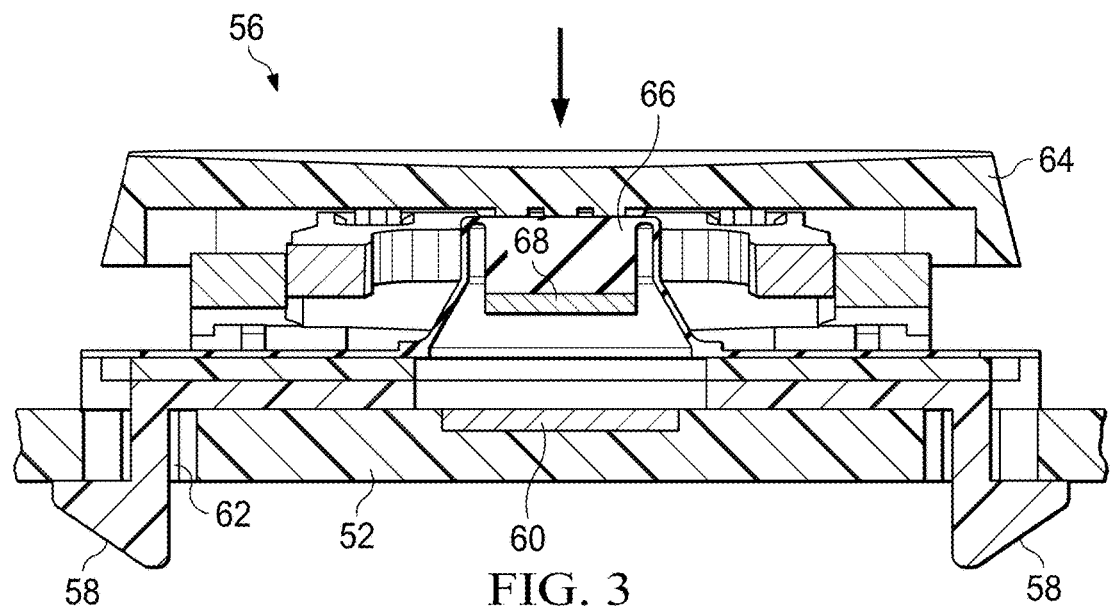
FIGS. 3 and 3A depict a side sectional view of the modular key coupled to the circuit board by a snap connector.
Figure 3A:
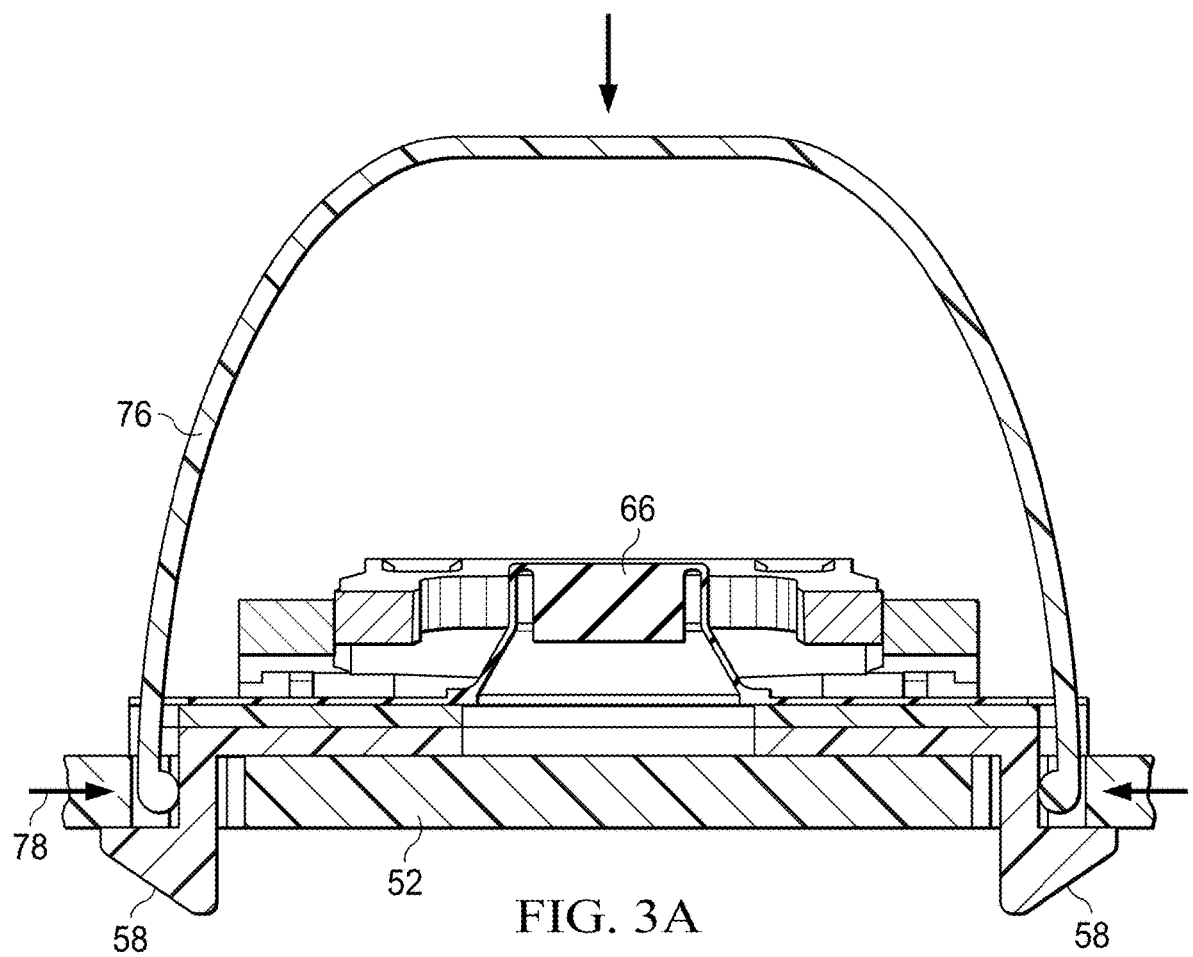

Referring now to FIGS. 3 and 3A, a side sectional view depicts the modular key 56 coupled to the circuit board 52 by a snap connector 58. FIG. 3 depicts modular key 56 having a key cap 64 in a raised position above circuit board 52 biased upwards by a rubber dome 66. Rubber dome 66 has a conductive member 68 at a bottom planar surface, such as carbon print applied to the base of the rubber dome. When key cap 64 is pressed down, conductive member 68 contacts the circuit board conductive pad 60 to complete an input circuit. Snap connector 58 has a beveled bottom surface to engage against the opening and an upper lip surface that snaps into place once the connector fully inserts into the circuit board opening. FIG. 3A depicts modular key 56 with the key cap removed to provide room for insertion of a tool 76 into the circuit board opening 62 to press inward on the snap connector 58 as indicated by arrow 78. When both snap connectors are pressed inward, a lifting motion on tool 76 lifts the modular key out of the circuit board.

Figure 4:
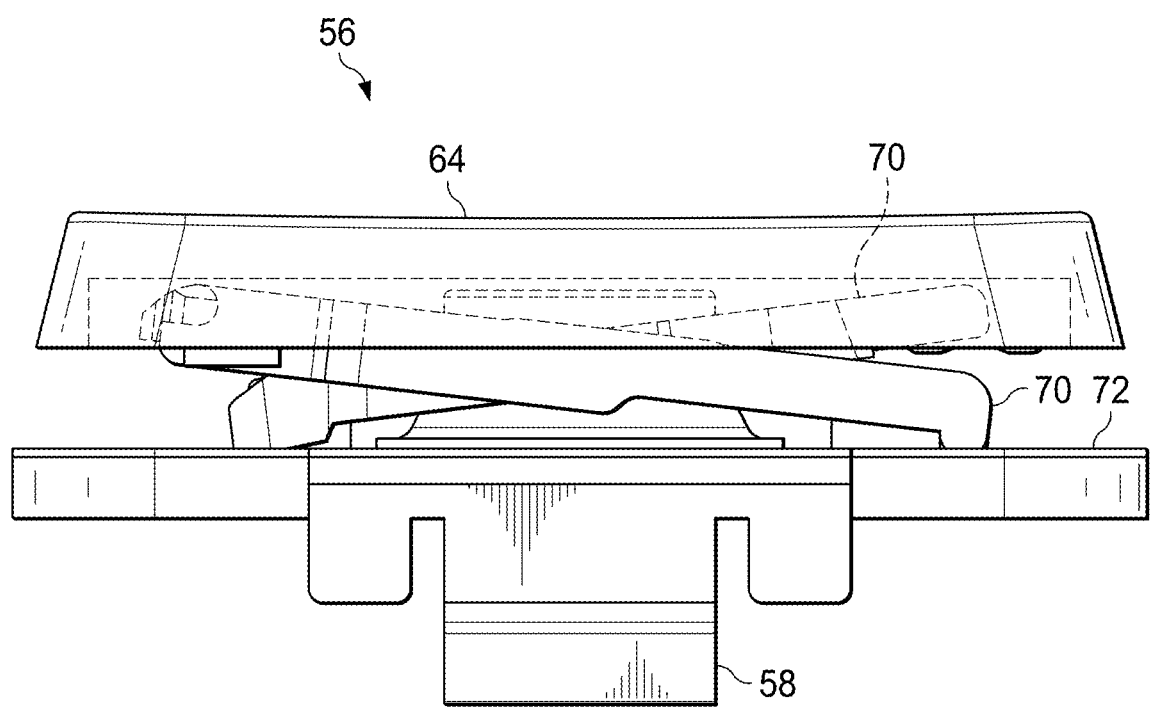
FIGS. 4, 4A and 4B depict side sectional and exploded views of the modular key assembly that supports individual coupling and decoupling at a circuit board.
Figure 4A:
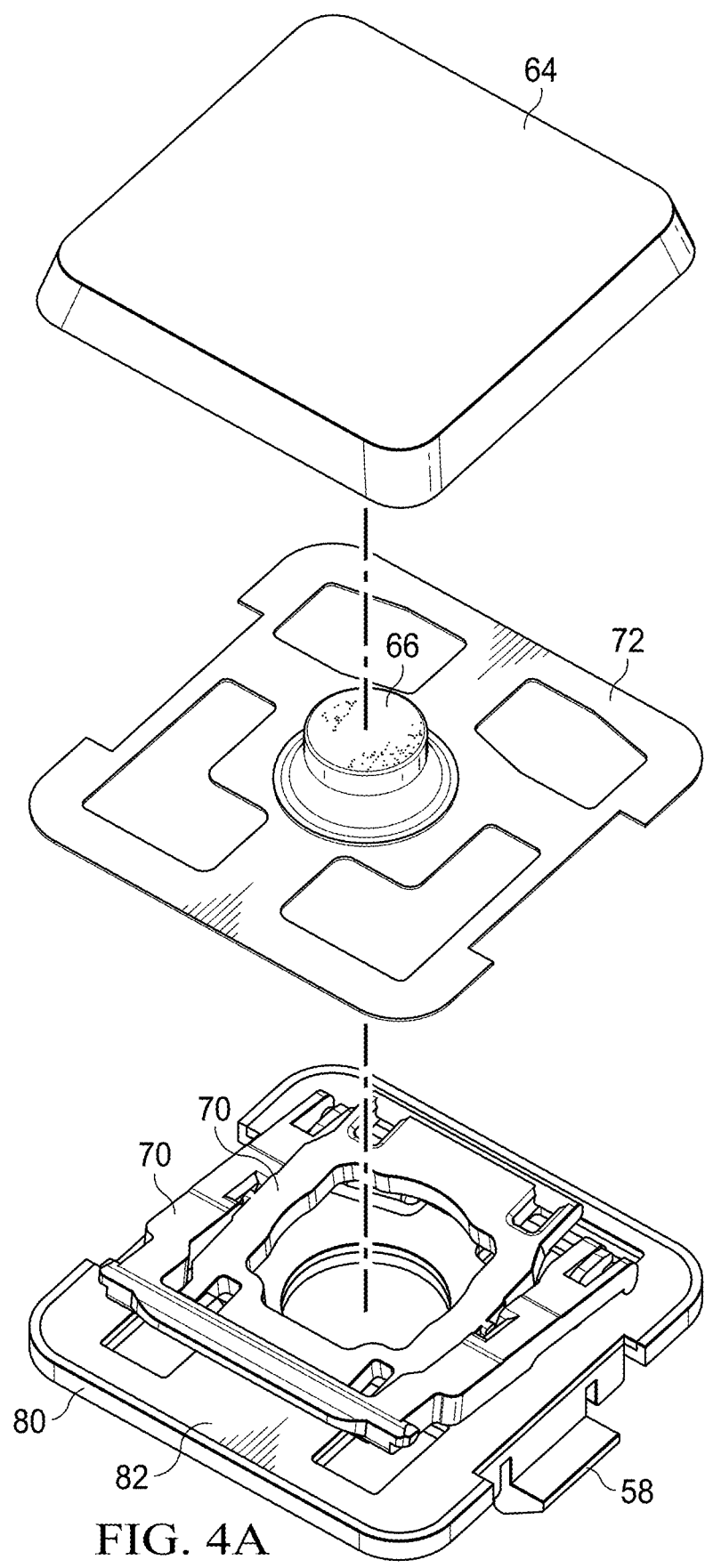
Figure 4B:
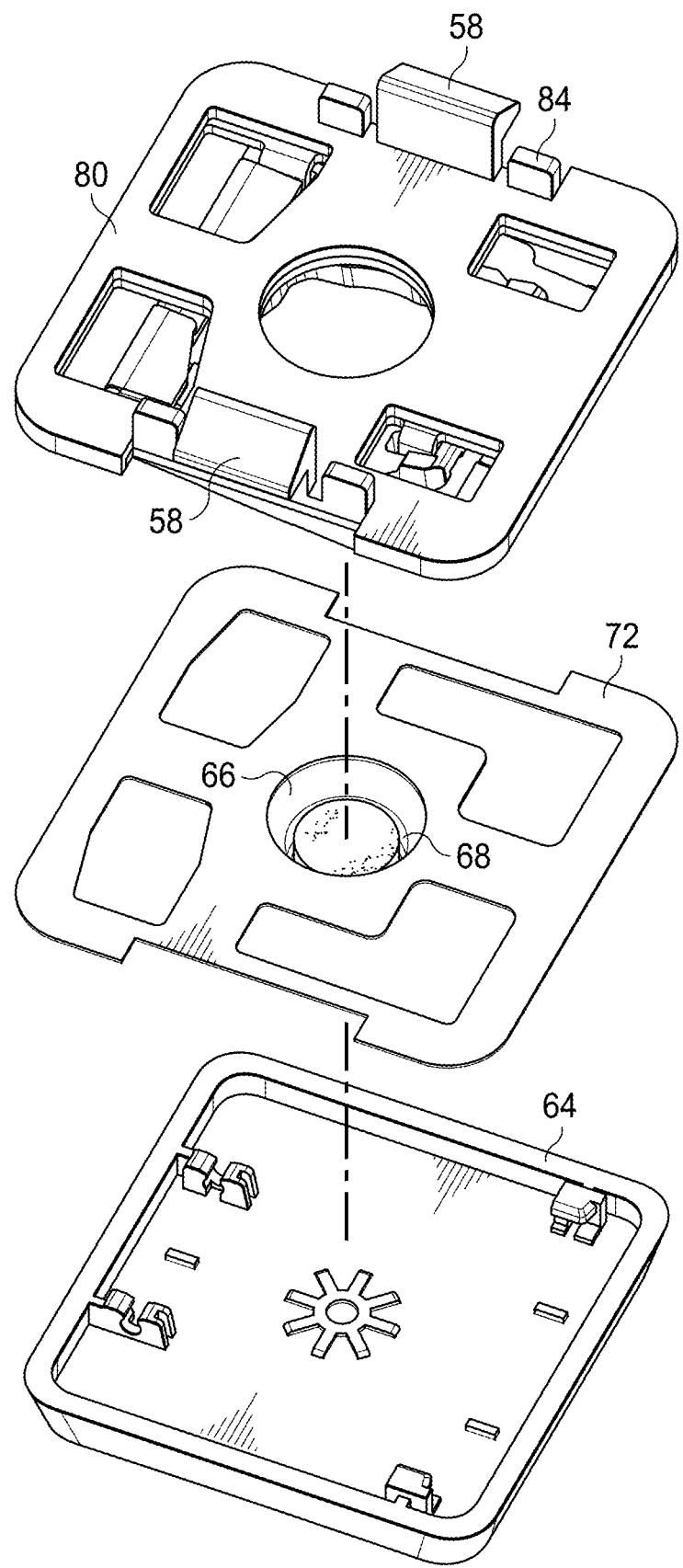

Referring now to FIGS. 4, 4A and 4B, side sectional and exploded views depict the modular key 56 assembly that supports individual coupling and decoupling at a circuit board. FIG. 4 depicts a side view from the perspective of the circuit board to show the snap connector 58 extending down and flanked on each side by insertion guides that aid in alignment of the modular key when coupled to a circuit board. A biasing assembly 72 is captured at a base of the modular key under a scissors 70 that maintains vertical alignment of the key cap 64 during end user presses and vertical upward movement induced by the biasing assembly 72. FIG. 4A depicts an upper perspective exploded view of modular key 56. A plastic base 80 that includes the snap connector 58 is double shot plastic injection molded to a metal plate 82, which provides a resilient structural base for the modular key. Scissors 70 may couple to snaps formed in the metal plate or to snaps formed in the plastic that extend up from the metal plate. Biasing assembly 72 is a thin mylar sheet having a silicon rubber dome glued by an adhesive at a central location. Key cap 64 couples to the scissors 70 with snaps at the key cap bottom surface. FIG. 4B depicts a lower perspective exploded view of modular key 56 showing snap connectors formed in the bottom side of key cap 64 to couple with the scissors. Biasing assembly 72 depicts the bottom side of rubber dome 66 having the conductive member 68 that contacts against the circuit board conductive pad. Base 80 has snap connector 58 extending down with an insertion guide 84 on each side of each snap connector 58 to aid in alignment of the modular key when assembled to the circuit board. Although the example embodiment depicts peripheral keyboard 44 having the modular keys, in an alternative embodiment the modular key couples to a portable information handling system keyboard circuit board.

Figure 5:
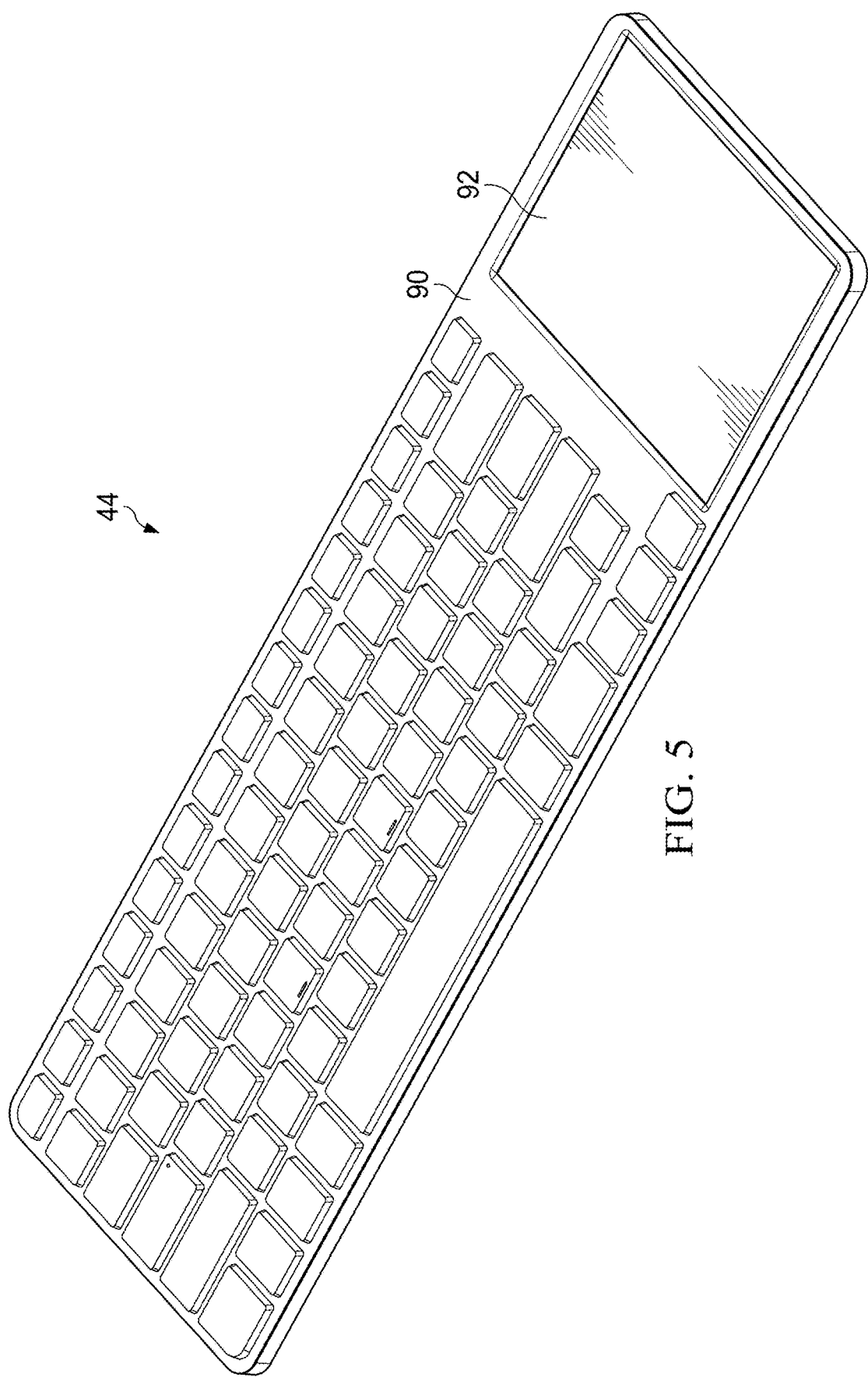
FIGS. 5, 5A and 5B depict an alternative embodiment of a modular key having adaptive input values presented by a display panel through a transparent key cap.
Figure 5A:
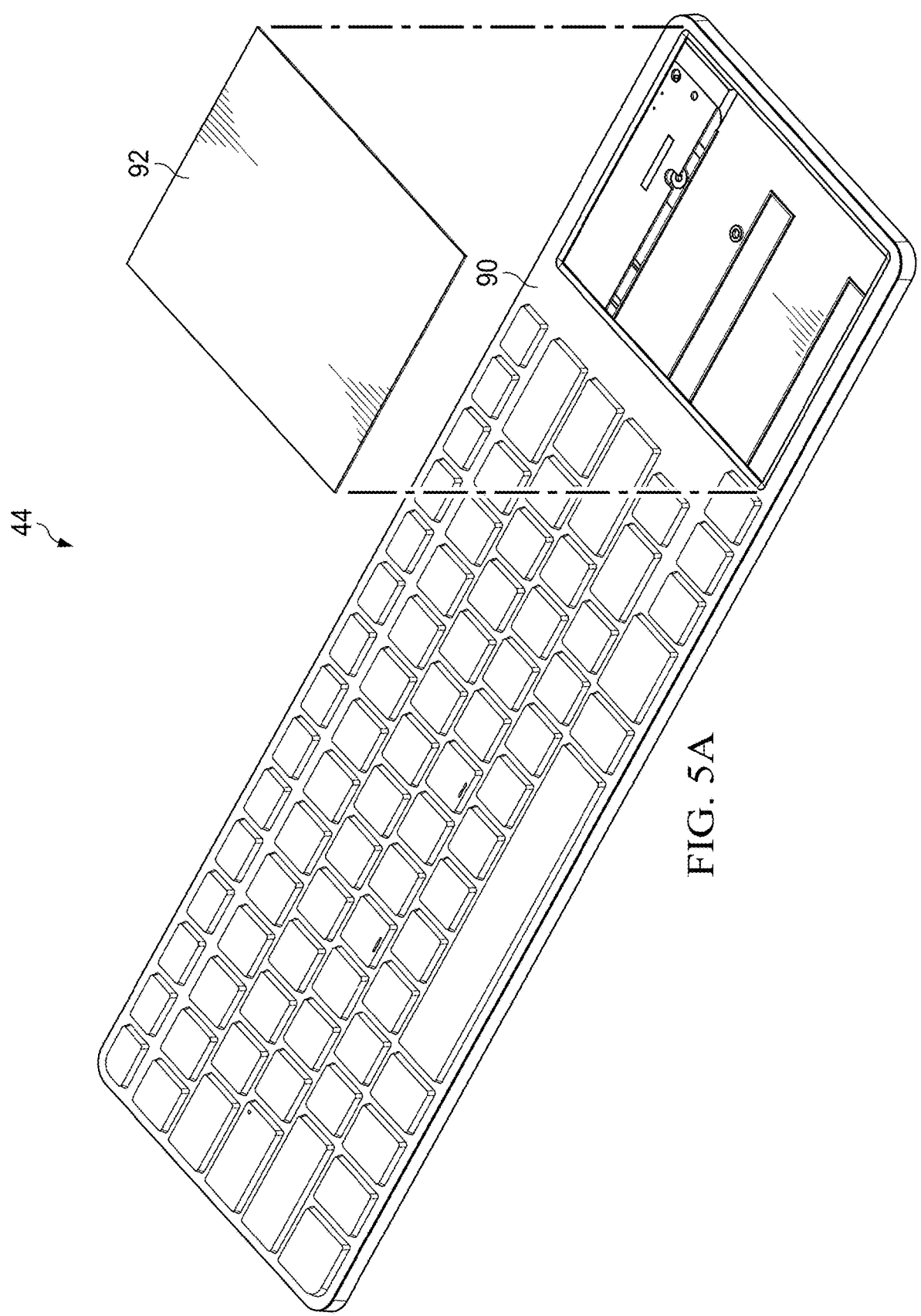
Figure 5B:
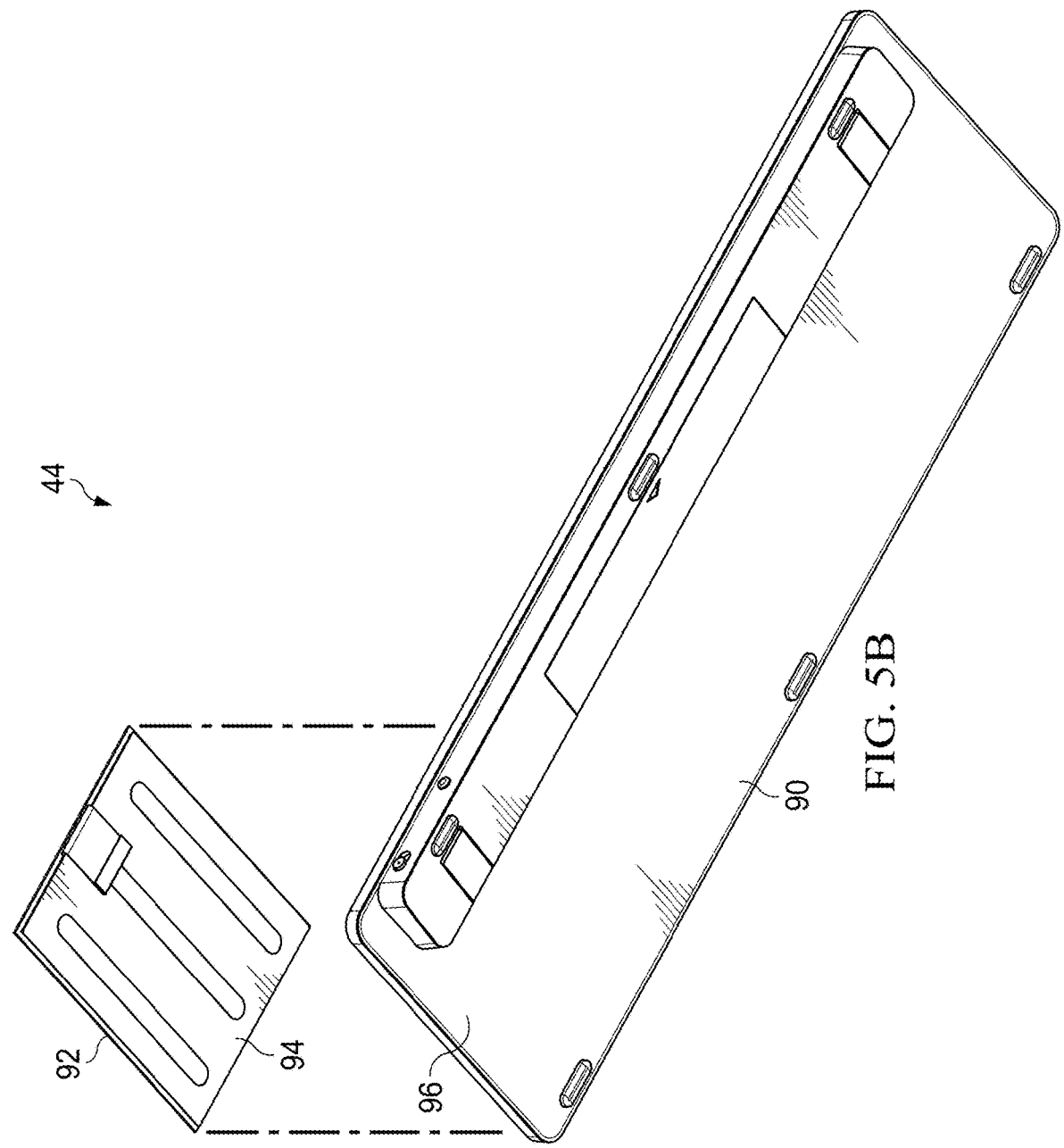

Referring now to FIGS. 5, 5A and 5B, an alternative embodiment of a modular key is depicted to have adaptive input values presented by a display panel through a transparent key cap. FIG. 5 depicts an upper perspective view of an example embodiment of a peripheral keyboard 44 having plural keys coupled to a base 90 and a liquid crystal display (LCD) touch panel 92 coupled to base 90 on a right side where the number pad is located in conventional keyboards. The keys coupled to base 90 may include modular keys as described above or other types of conventional keys. FIG. 5A depicts peripheral keyboard 44 having LCD touch display panel 92 exploded out to show a metallic material of base 90 at the bottom side of the LCD panel. FIG. 5B depicts a bottom exploded view of the LCD touch display panel 92 having a metal backside and a processing resource 94 that manages presentation of visual images at the LCD panel, such a microcontroller unit (MCU) with embedded flash memory or other non-transitory memory to store instructions. The bottom surface 96 of base 90 may also include metal backing at the location of the LCD panel to aid in magnetic coupling of modular adaptive keys as described in greater detail below. To enhance capacitive coupling between a transparent cap and through the upper and lower portions of the key to the capacitive touch detection surface, a metal additive may be included in the plastic, such as the Transport Conductor Film and the Metal Additives for Plastics available from 3M.

Figure 6:
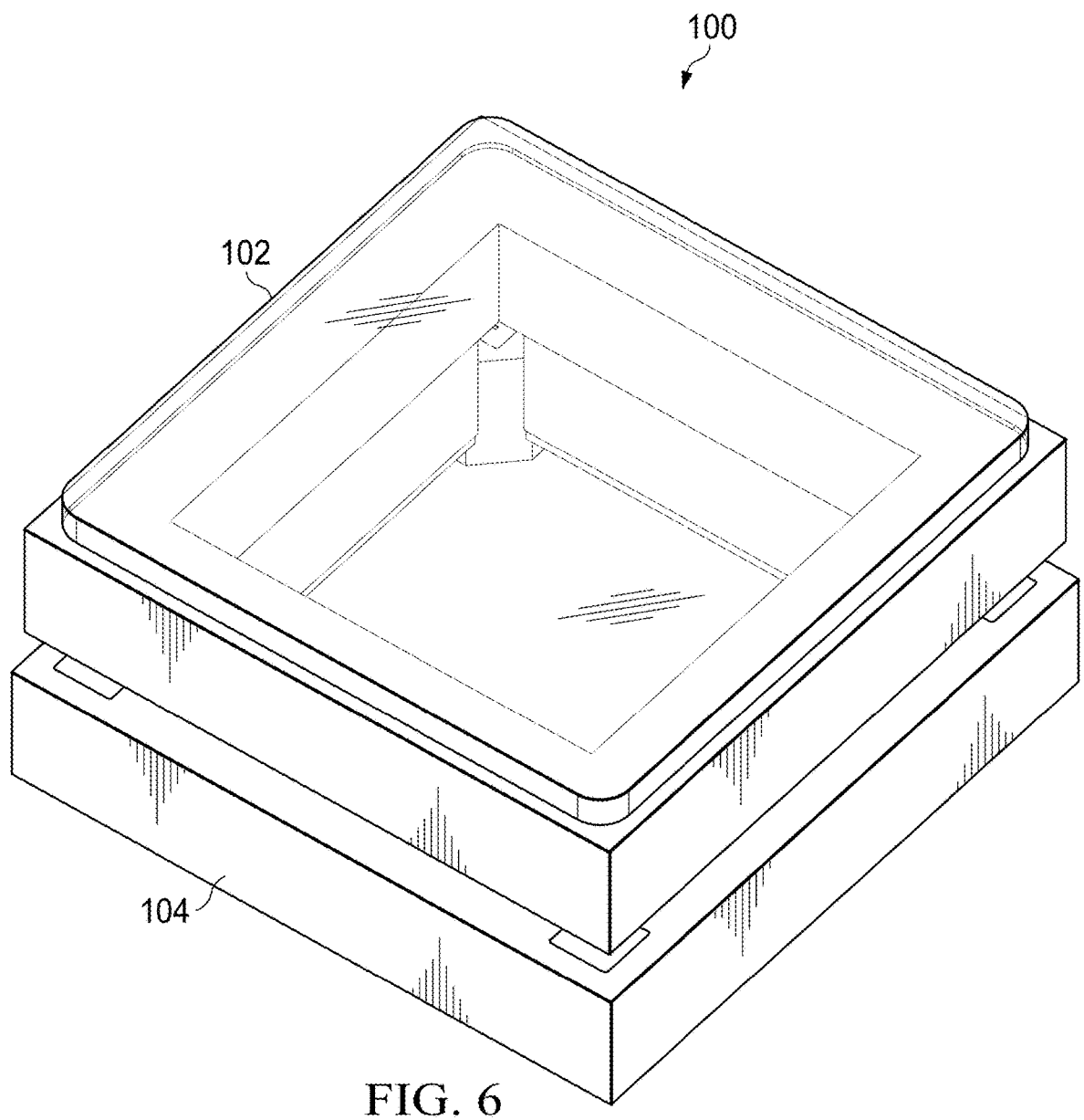
FIGS. 6, 6A, 6B and 6C depict an adaptive modular key that accepts inputs to values presented by an underlying display panel and viewed through a transparent key cap.
Figure 6A:
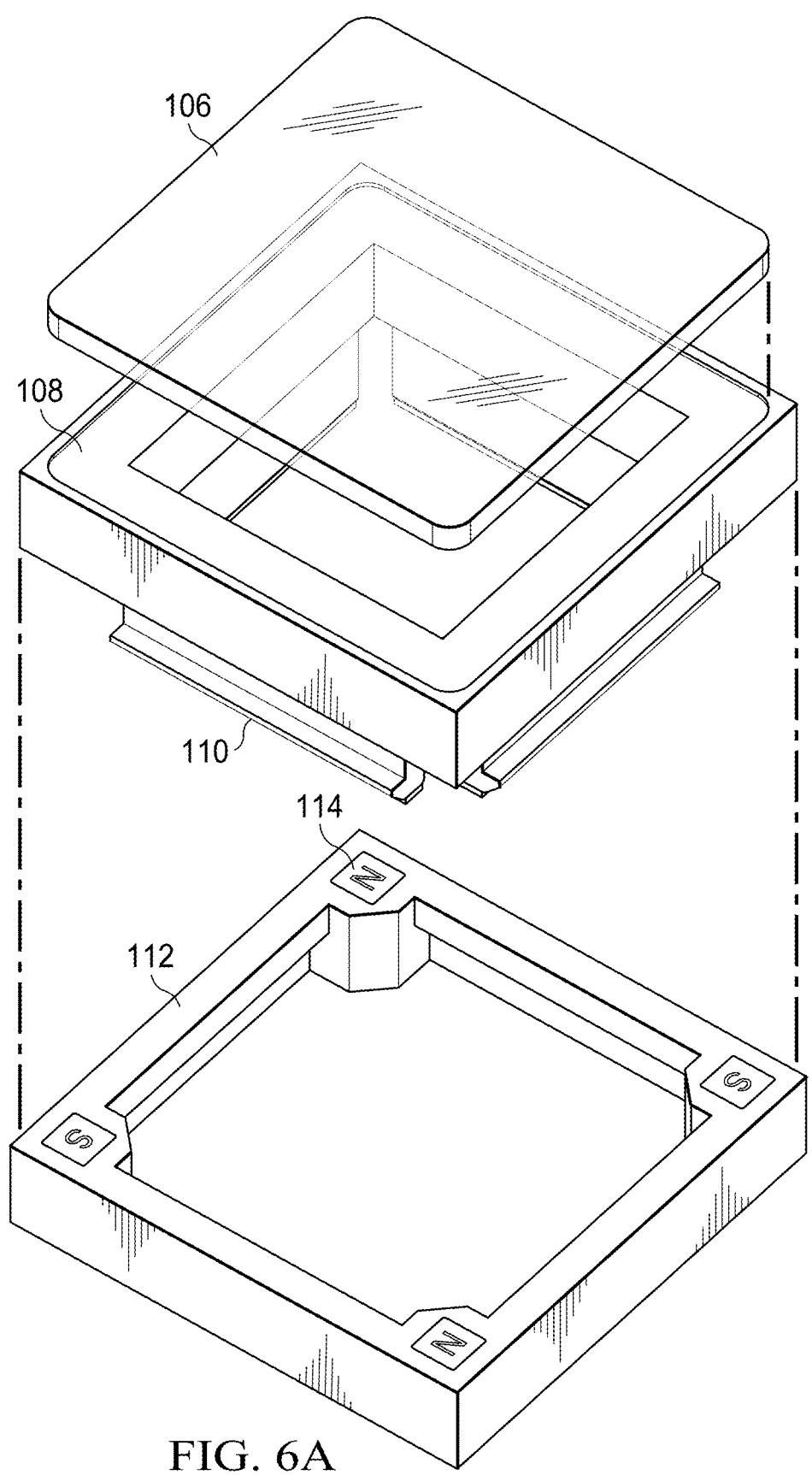

Referring now to FIGS. 6, 6A, 6B and 6C, an adaptive modular key100 is depicted that accepts inputs to values presented by an underlying display panel and viewed through a transparent key cap 102. FIG. 6 depicts an upper perspective view of the adaptive modular key 100 having a key cap 102 slidingly engaged with a key base 104 that magnetically coupled to ferromagnetic material under the display panel. The display panel detections a position and size of key base 104 through a touch detection surface, such as capacitive touch screen of the display panel that detects the key base footprint. Based upon a detected key position, the display panel presents a display input value visible to the end user through the transparent key cap. When an end user presses the key cap, a downward sliding movement of the key cap on the key base brings the end user finger in closer proximity to the display panel so that proximity or touch detection determines a key value input for the value presented at the key touch location. FIG. 6A depicts an exploded perspective view of the adaptive modular key having a transparent conductive sheet coupled over key upper portion 108. Upper portion 108 has a folded lower element with a conductive strip of material that holds the upper portion in a base portion 112 and impacts against the display panel to indicate an input while the rubberized conductive material reduces the risk of a mark on the display panel. Base portion 112 has a magnet 114 in each corner with the kitty corner magnets having like polarity. Magnets 114 arrange the polarity with a dual purpose of biasing the key upper portion away from the display panel and biasing keys placed on the display panel to form an assembly with the lower portions biased towards each other.

Figure 6B:
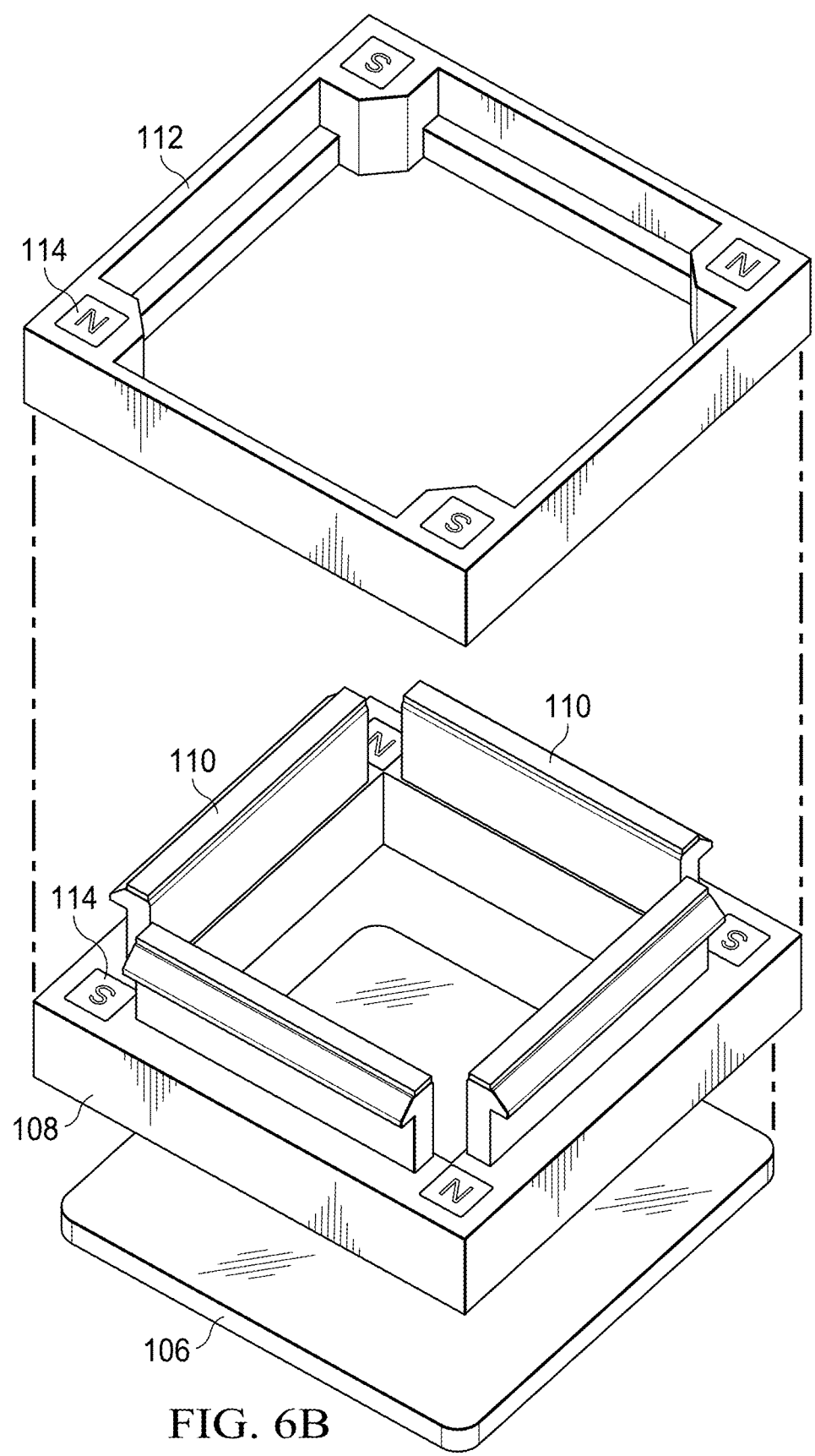
Figure 6C:
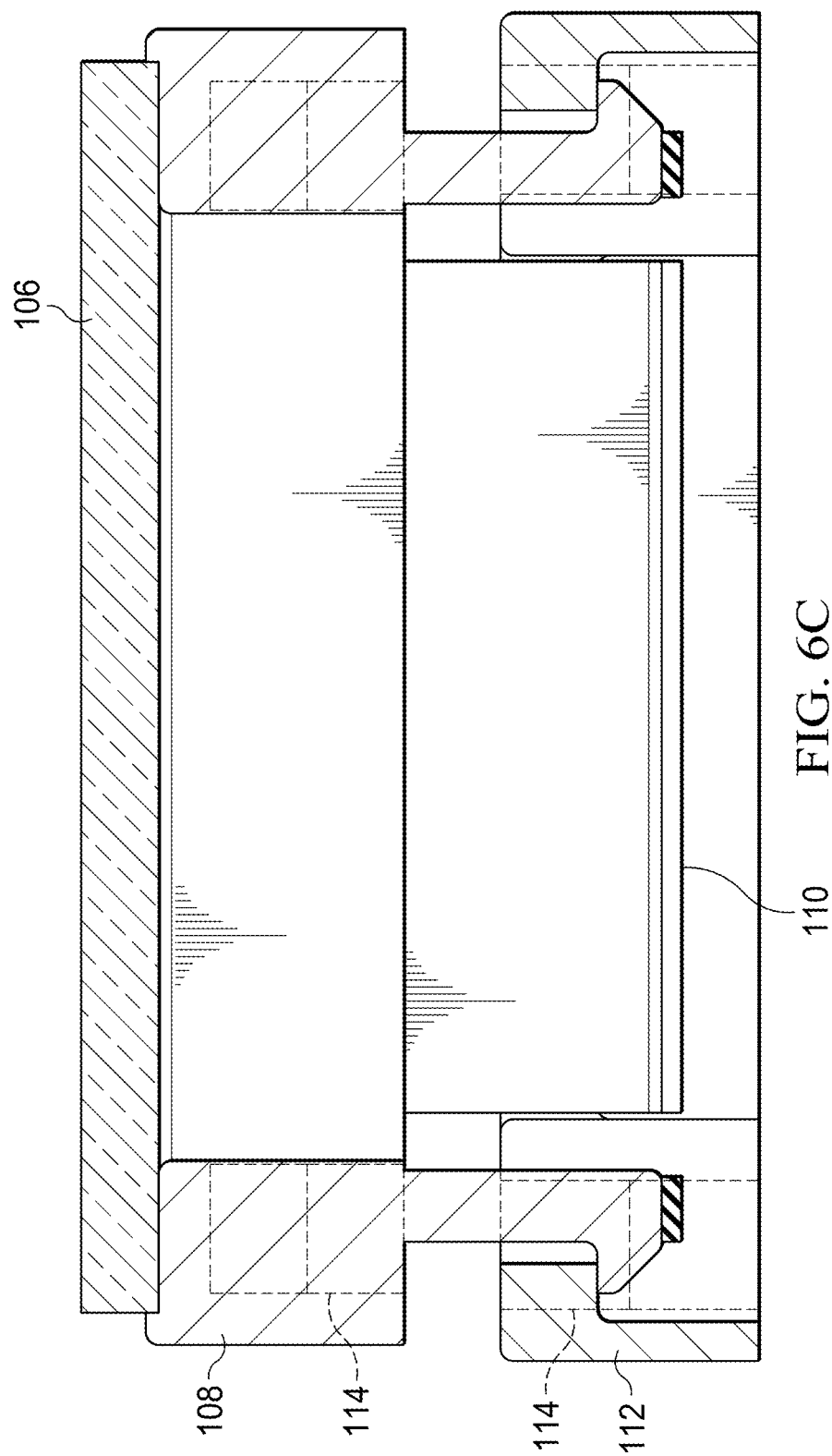

FIG. 6B depicts a lower perspective exploded view of the adaptive modular key 100 and shows the magnets 114 coupled to each corner of the upper portion 108. As is described above, the aligned magnets have like polarity and the kitty corner magnets have like polarity. The magnet polarity biases the upper and lower portions away from each other and is overcome to accept an input by an end user press on conductive transparent sheet 106. In the example embodiment, the upper portion, lower portion and conductive sheet are each a plastic material treated with a conductive material, such as a metal powder, that aids in capacitive touch detection by the display panel. Rubberized conductive strip 110 folds over when the upper and lower portions slidingly engage with each other to keep the key assembled during end user presses and releases. FIG. 6D depicts a side sectional view of the modular adaptive key cap 102 having magnets 114 repelling the upper portion 108 from the base portion 112 so that the rubberized conductive strip 110 is in a raised position until an end user presses down on transparent conductive sheet 106. In the example embodiment, a bevel is formed at the rubberized conductive strip to snap under a lip of the lower portion and maintain the upper and lower portions in sliding engagement with each other.

Figure 7:
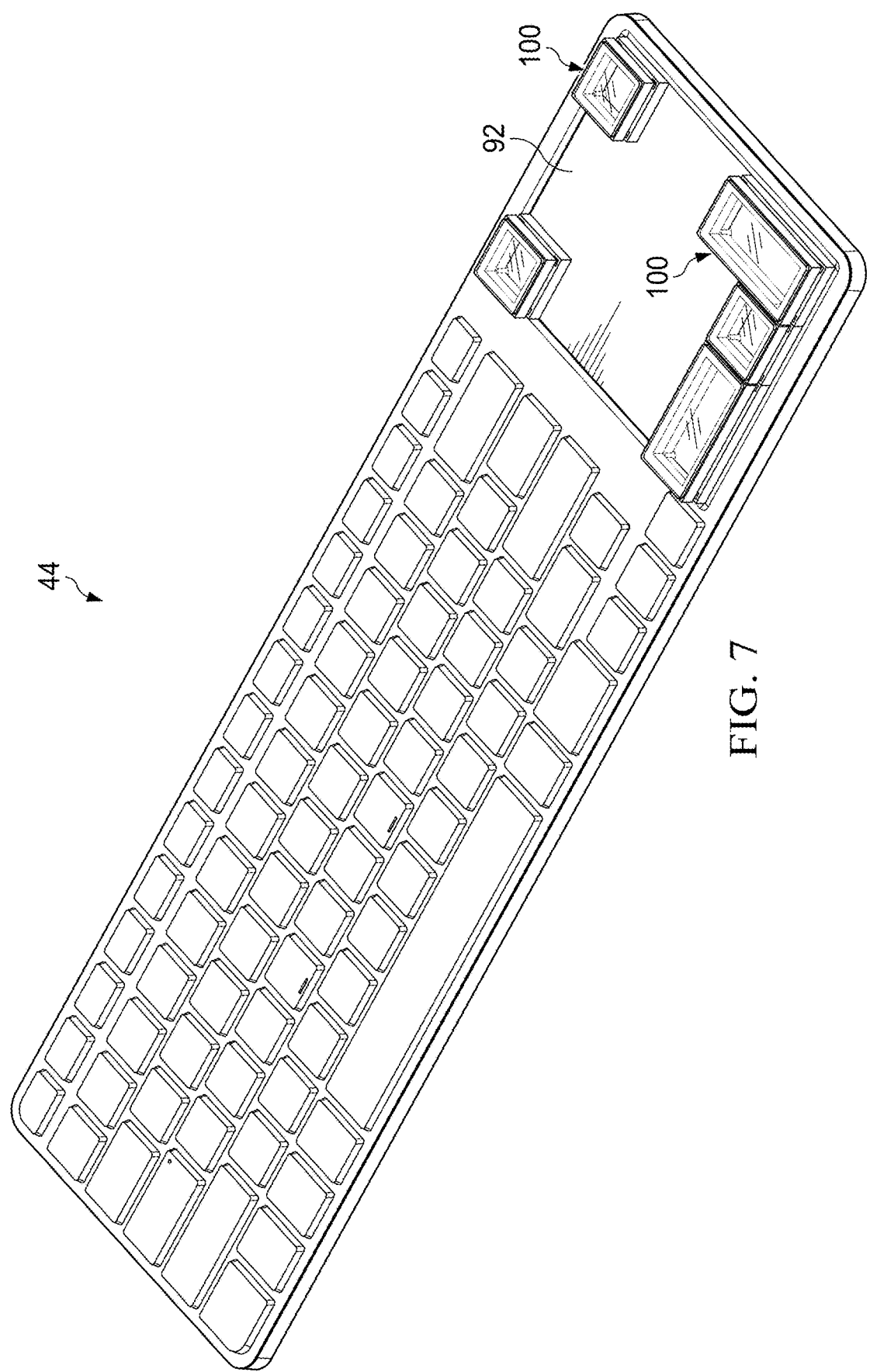
FIGS. 7, 7A, 7B and 7C depict various arrangements of adaptive modular keys that allow an end user to adapt inputs to different key sizes and configurations.
Figure 7A:
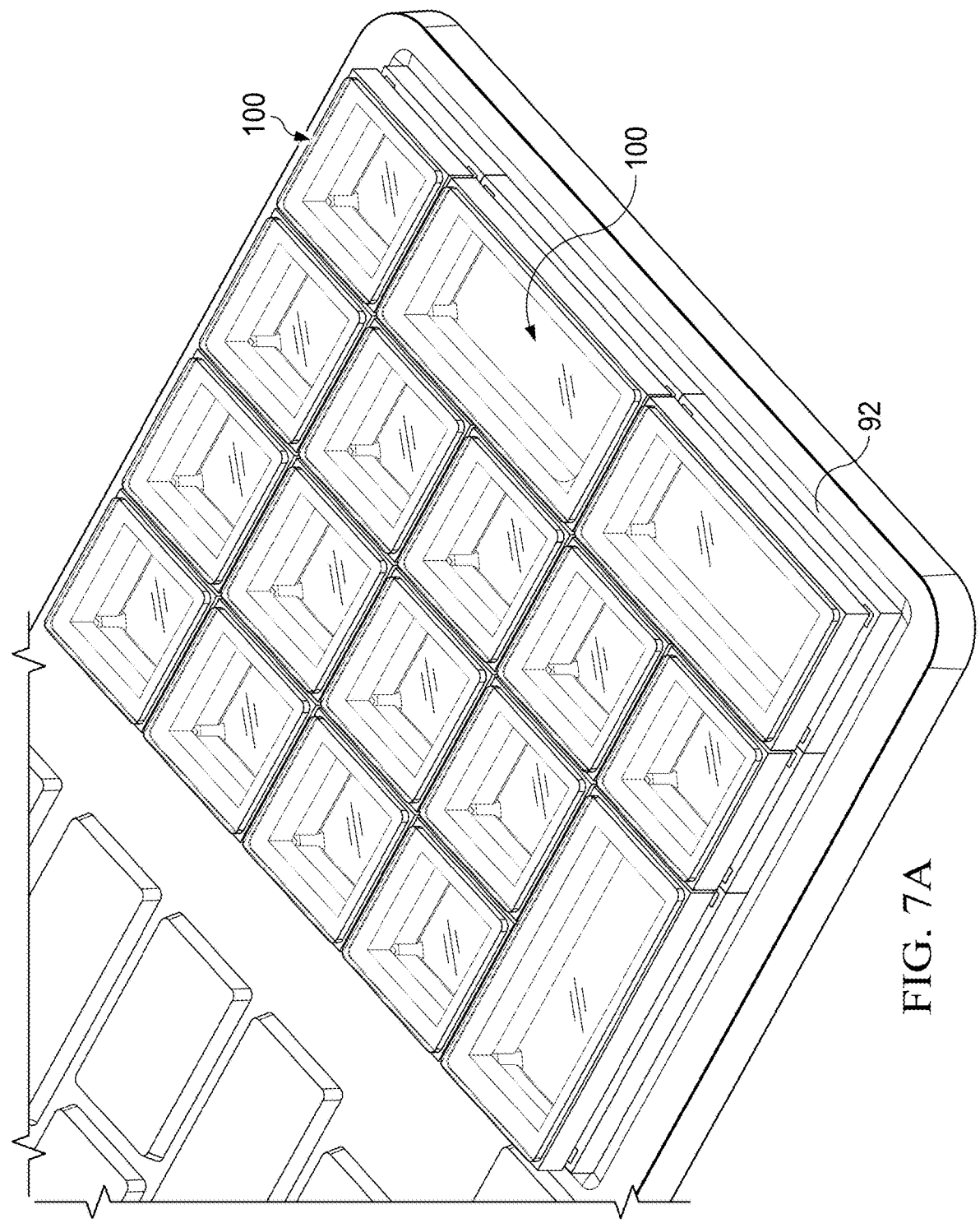
Figure 7B:
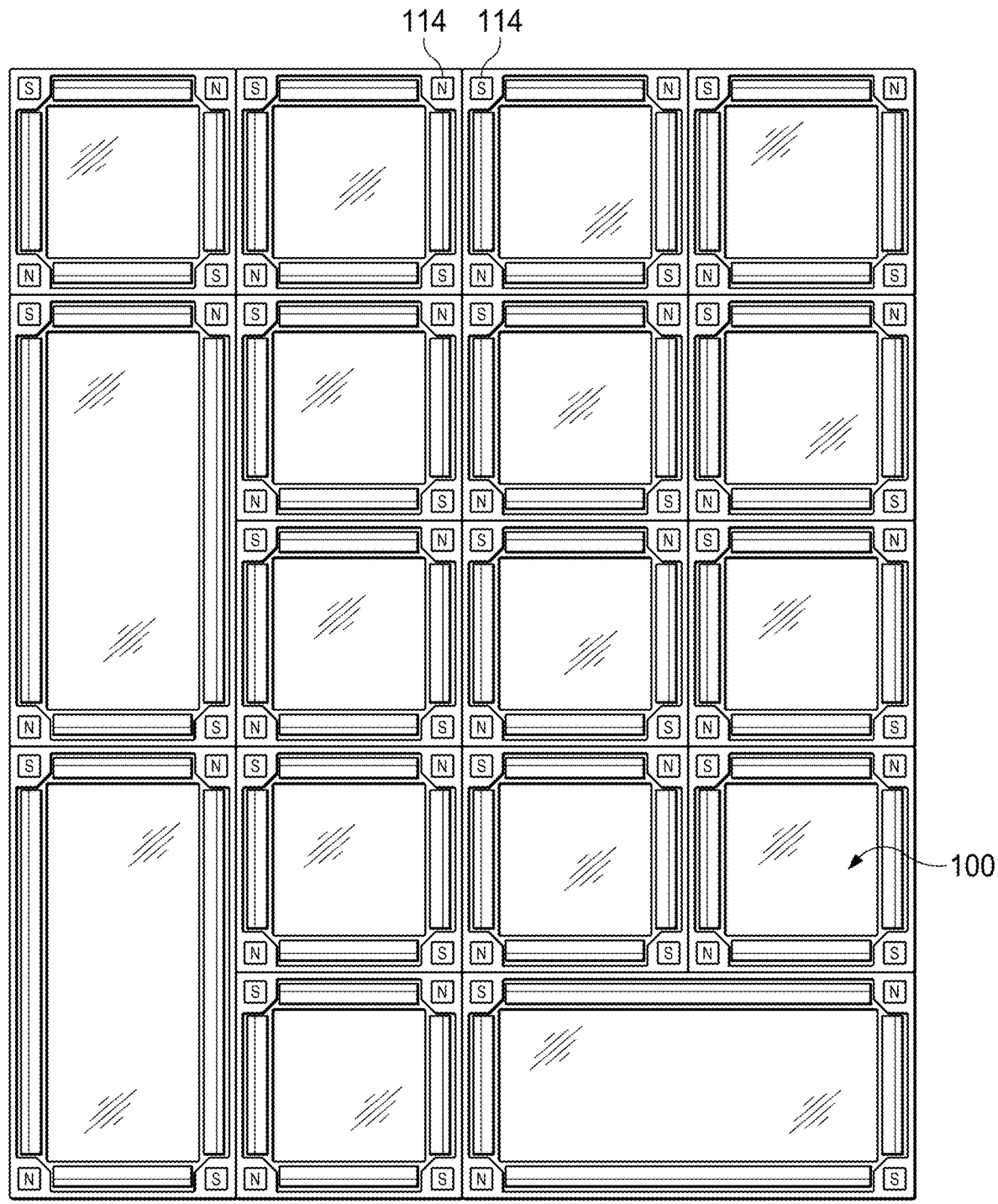
Figure 7C:
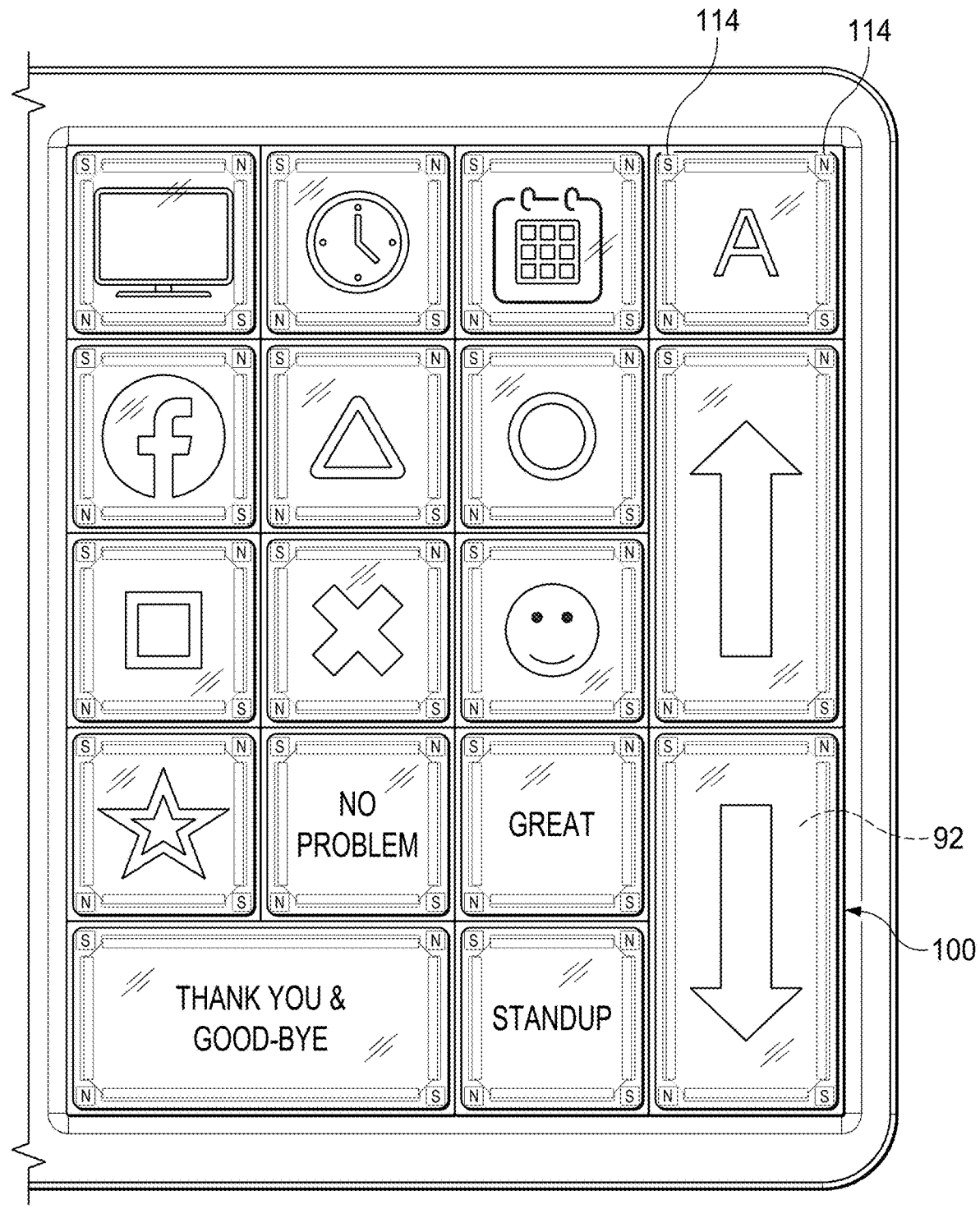

Referring now to FIGS. 7, 7A, 7B and 7C, various arrangements of adaptive modular keys are depicted that allow an end user to adapt inputs to different key sizes and configurations. FIG. 7 depicts peripheral keyboard 44 having an LCD display panel 92 coupled in place and adaptive modular keys 100 of square and rectangular shapes placed on the display panel to accept key press inputs. An end user can select different configurations of shapes to design an input interface as desired with the key values programmable through an operating system driver of the keyboard or other application. FIG. 7A depicts an arrangement of adaptive modular keys 100 that have a number pad configuration. When a processing resource of the display panel and/or information handling system detects the touches of the keys at the display panel, a comparison of the pattern against stored patterns supports identification of the number pad so that the display panel automatically displays number pad key values under the adaptive modular keys. Other patterns and associated values may be prestored in the display panel processing resource or designed by the end user and saved. FIG. 7B depicts a bottom view of the adaptive modular keys arranged as a number pad having magnets of opposite polarity arranged to attract the adaptive modular keys towards each other when placed together on the display panel. FIG. 7C depicts an example of a number pad configuration of adaptive modular keys 100 with an alternative arrangement of input values presented at a display panel 92 that vary from application launch shortcuts to icons selectable as text inputs.

Figure 8:
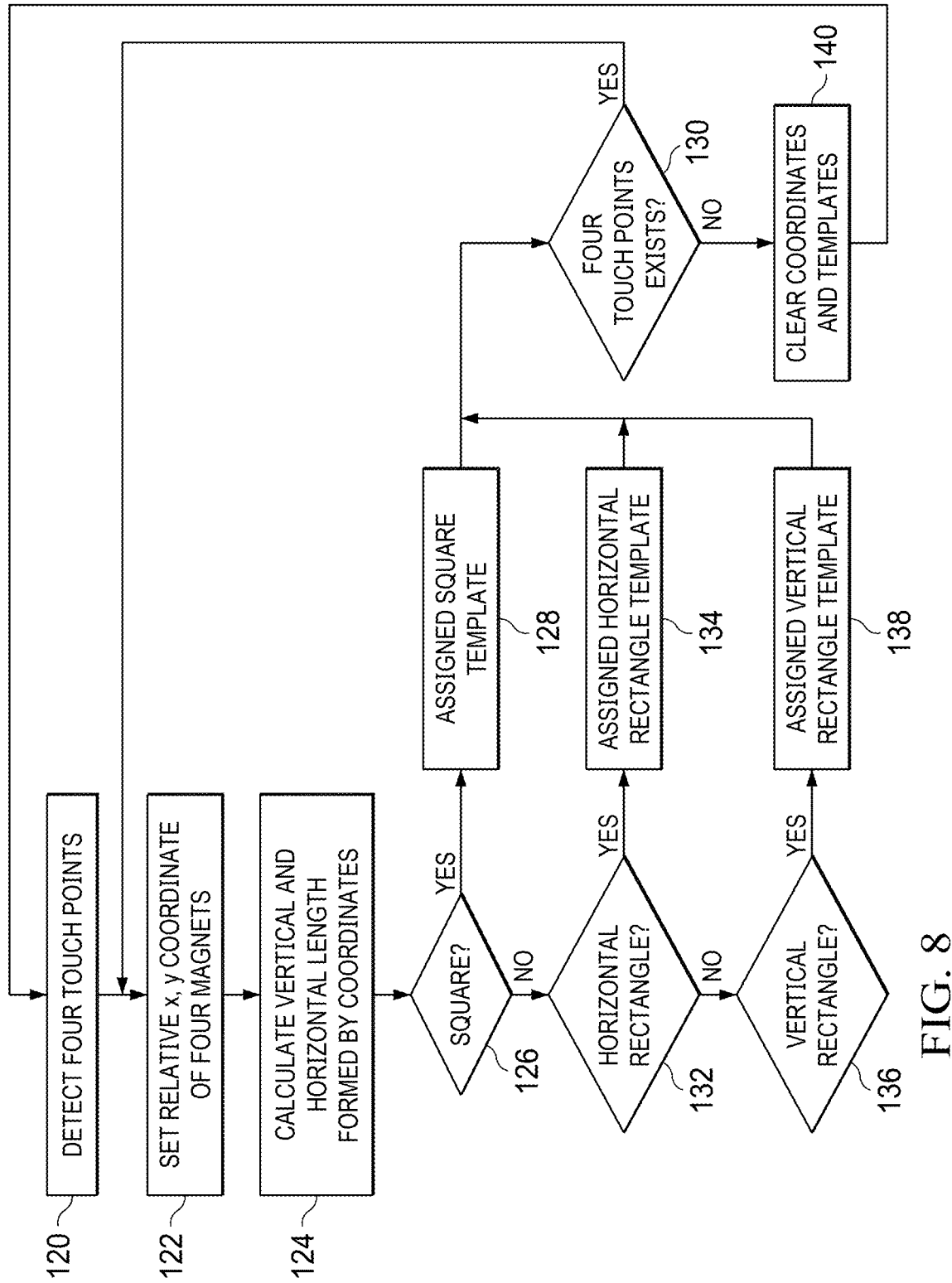
FIG. 8 depicts a flow diagram of a process for detecting adaptive modular keys placed on a display panel and selecting key values for presentation at the adaptive modular keys.

Referring now to FIG. 8, a flow diagram depicts a process for detecting adaptive modular keys placed on a display panel and selecting key values for presentation at the adaptive modular keys. The process starts at step 120 with detection of four touch points associated with an adaptive modular key placed on the display panel. In one example embodiment, each corner of the key base may project down slightly so that only four points touch the display panel without the length between the four points contacting the display panel. At step 122 the relative X and Y coordinates of the four points is set. At step 124 the vertical and horizontal length is computed for the four points, such as to determine if the adaptive modular key is a square or rectangle footprint. At step 126 a determination is made of whether the adaptive modular key is a square and, if so, the process continues to step 128 to assign a square template. If at step 126 the adaptive modular key is not a square, the process continues to step 132 to determine if the rectangle has a horizontal orientation and, if so, at step 134 the adaptive modular key is assigned a horizontal rectangle template. If at step 132 the rectangle is not horizontal, the process continues to step 136 to determine a vertical rectangle. At step 138 a vertical rectangle template is assigned. Once the footprint and orientation is determined, the process continues to step 130 to determine if the next adaptive modular key has four touch points. If so the process continues to step 122 to evaluate the key. If not, the process clears the coordinates and template at step 140 and returns to step 120 to continue the template analysis.

Figure 9:
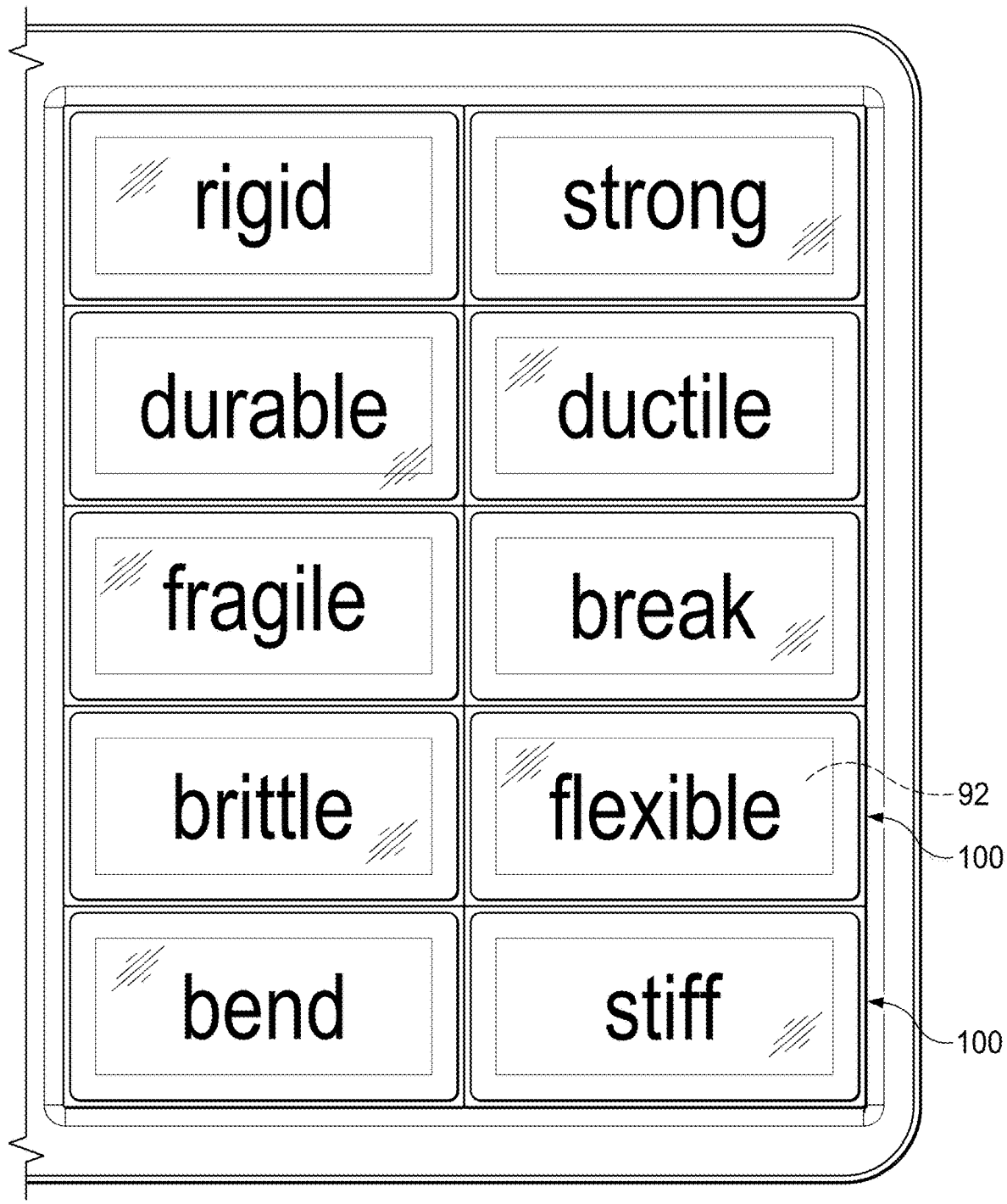
FIG. 9 depicts an alternative embodiment of the adaptive modular keys that prompts predictive text for end user selection.

Referring now to FIG. 9, an alternative embodiment of the adaptive modular keys is depicted that prompts predictive text for end user selection. In the example embodiment, an array of rectangular adaptive modular keys 100 are recognized by the display panel controller to automatically initiate a predictive text interface that offers a predicted word at each rectangular adaptive modular key presented at the underlying display panel 92. The predictive text may be generated by the display panel in cooperation with the information handling system embedded controller, processor, operating system and an application that presents text at a display, such as a word processing application. In one example, the predictive text prompts the end user with a next word or common word based on the typing context that the user selects with a press on the key. In another example, the predictive text may relate to specific subjects, such as engineering words or synonyms for a word typed by the end user.

Figure 10:
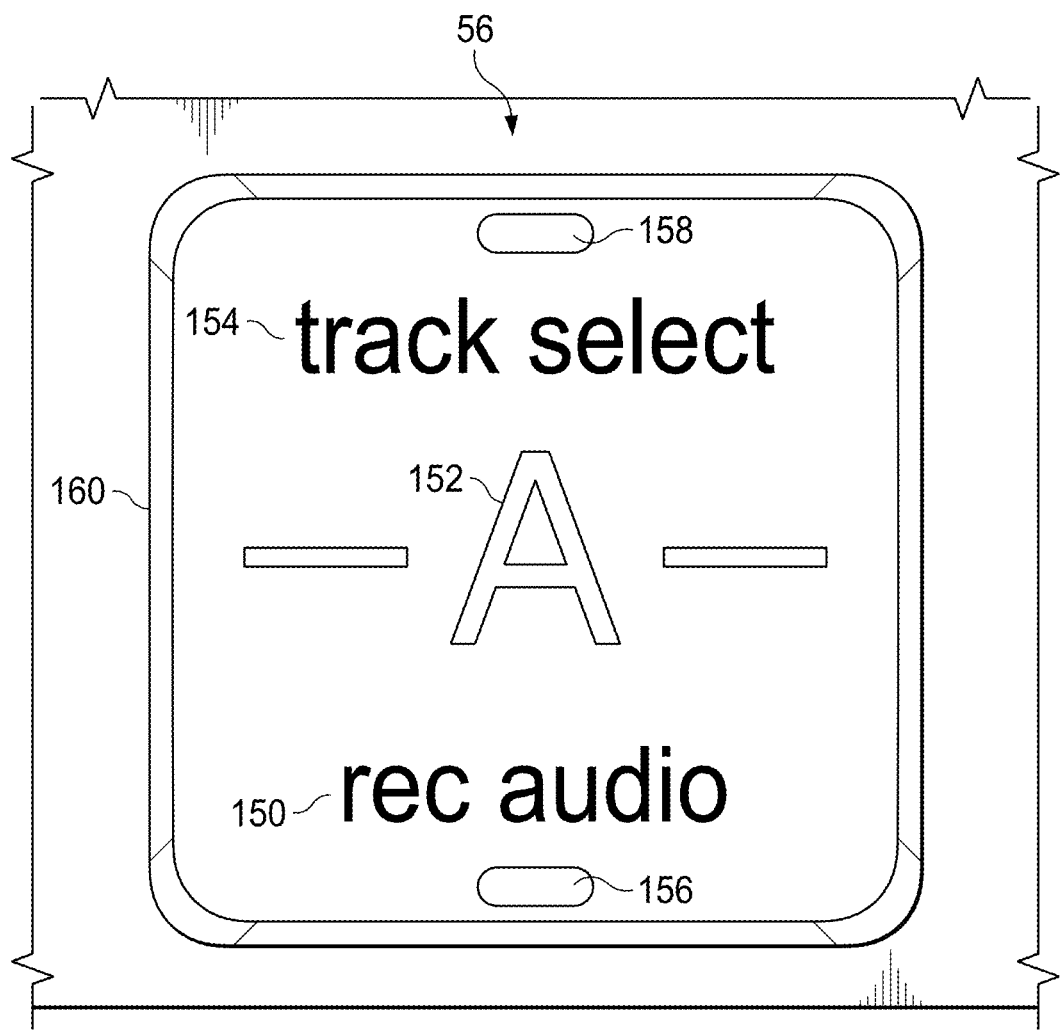
FIG. 10 depicts an alternative embodiment of a keyboard key that includes a capacitive touch detection sensor that supports a multi-function single touch key input value selection.

Referring now to FIG. 10, an alternative embodiment of a modular key 56 includes a capacitive touch detection sensor that supports a multi-function single touch key input value selection. In the example embodiment, a key cap 160 has three available input values that an end user can select with a single key press: an "A" key value 152 is selected with a centrally located key press; a "record audio" key value 150 is selected with a lower located key press; or a "track select" key value 154 is selected with an upper located key press. An upper LED indicator 158 illuminates when the upper value 154 is selected. A lower LED indicator 156 illuminates when the lower value 156 is selected. Selection of an upper, central or lower input value is performed based upon the location that an end user selects for touching the key cap 160 when the key is pressed down to perform the input. The position of the key touch is determined by a capacitive touch sensing of the key touch position, such as with capacitive touch detection in the key itself or with a capacitive touch detection sensor layer placed under the array of keys. In the example embodiment, a finger press on the lower half of the "A" key sends a record audio input from the keyboard and illuminates the record audio LED indicator 156. A finger press on the upper half of the "A" key sends a track select code from the keyboard and illuminates the track select LED indicator 158. A finger press in both the upper and lower portions of the key cap 160 sends the "A" key code from the keyboard. In alternative embodiments additional criteria may be applied to select an input, such as an amount of time that the upper or lower portion of the key is pressed before the multi-function input is triggered. In another alternative embodiment, a right side and left side touch detection may be used instead of or in combination with an upper and lower side touch detection, thus opening up to as many as five functions for each keyboard key.

Figure 11:
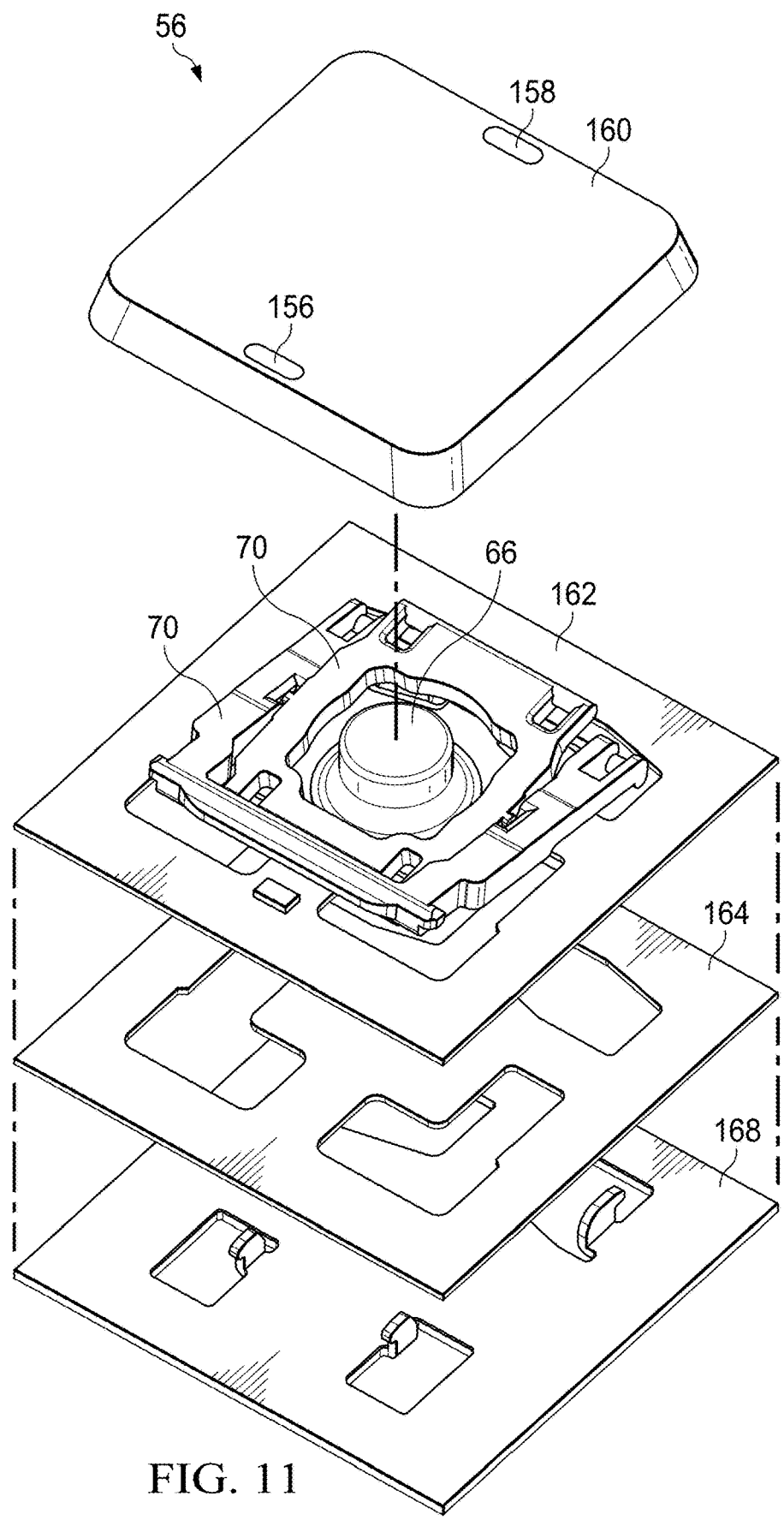
FIG. 11 depicts an exploded perspective view of an example of a multi-function single touch keyboard key.

Referring now to FIG. 11, an exploded perspective view depicts an example of a multi-function single touch keyboard key 56. Key cap 160 is double shot injection molded to include lower LED indicator 156 and upper LED indicator 158. Scissors 70 captures a key press membrane 162 and a touch detection membrane 164 at a base plate 168 having attachment snaps to couple to the scissors. A rubber dome 66 couples to the press membrane by adhesive to bias the key to a raised position. In the example embodiment, the key has a modular configuration to couple and decouple to a keyboard circuit board as described above. Alternatively, the key press membrane 162 and the touch membrane 164 are a continuous membrane that extends under the keyboard key array to support multiple key inputs with a single membrane. In this regard, key press membrane 162 may have a conventional key press detection matrix that is decoded to determine a key press location when the key is pressed down to impact a contact pad or switch in the membrane. For instance, a press in a central location performs conventional QWEWRTY inputs. Touch membrane 164 is a capacitive touch detection sensor that detects touch proximity based upon the location at which a finger presses key cap 160. In the example embodiment, a touch detection of an upper, lower or central location determines the value applied to the key input when a key press is detected by the key press membrane. In an alternative embodiment, proximity sensing determines an upper or lower input without the need for a key depression. In another alternative embodiment, an upper or lower finger position illuminates the upper or lower LED when the next key depression detected by the key press membrane will assign the associated function to the key input so that the end user knows the function that will be selected when they key is depressed. Advantageously, an end user performs a multi-function key input selection without having to select multiple keys, such as a control or function key with an input key. For instance, a press at an upper location of a key performs an input of function combined with the key, and a press at a lower location of a key performs an input of control combined with the key. The multi-function inputs performed for control and/or function key combinations may be used only for defined inputs, such as CTRL-P or CTRL-V WINDOWS multi-key functions, or may include a variety of multi-key functions on some or all keys with the multi-key input labeled at the key cap upper surface as shown in FIG. 10. Metallic material may be included in the key cap or coated on the key cap to enhance capacitive touch detection as described above.

Figure 12:
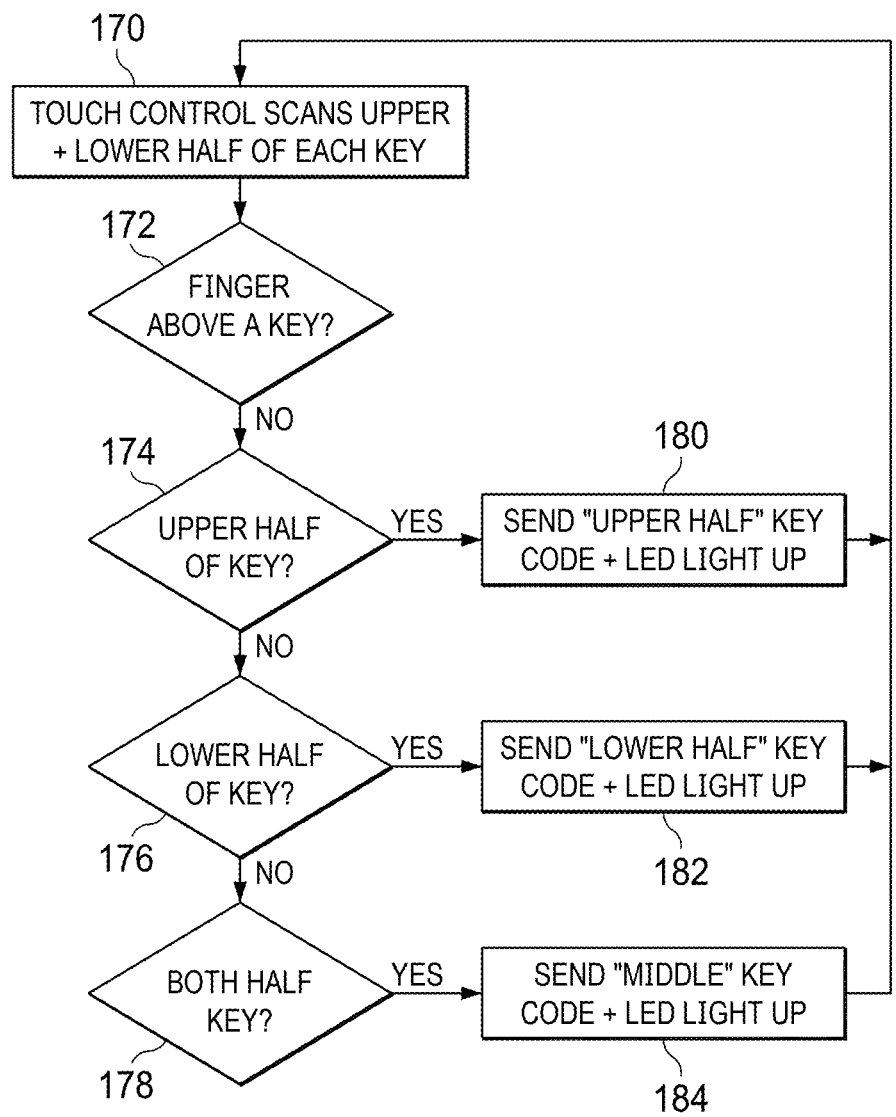
FIG. 12 depicts a flow diagram of a process for selection of a multi-function input with a single touch at a keyboard key.

Referring now to FIG. 12, a flow diagram depicts a process for selection of a multi-function input with a single touch at a keyboard key. The process starts at step 170 with a touch controller scan of the upper and lower half of each key to detect finger proximity. At step 172 a determination is made for each key whether a finger is above the key so that finger proximity detection indicates a key input is pending. At step 174 a determination is made of whether an upper half of the key has a finger touch. If yes the process continues to step 180 to send an "upper half" key code from the keyboard and to illuminate the upper half LED. At step 176 a determination is made of whether the lower half of the key is touched. If yes, the process continues to step 182 to send the lower half key code from the keyboard and illuminate the lower half LED. At step 178 a determination is made of whether the key touch is at both the upper and lower portions indicating a centrally located key touch. If the key touch is in the center of the key, the process continues to step 184 to send the middle key value code from the keyboard and to illuminate a central LED if one is included. The process then returns to step 170 to continue to scan for touch proximity at the keyboard. In one example embodiment, a PCT3854QR system on chip is used to support both a touch detection and key scan to determine the input values. For example, the touch detection location and key input value selection based on touch location are performed by an MCU processing resource of the keyboard interfaced with the touch detection surface and keyboard membrane and executing instructions stored in non-transitory flash memory as described below with respect to FIGS. 20A and 26A. The key input is detected by a press of the key against a key press membrane, a contact pad or similar key input sensor.

Figure 13:
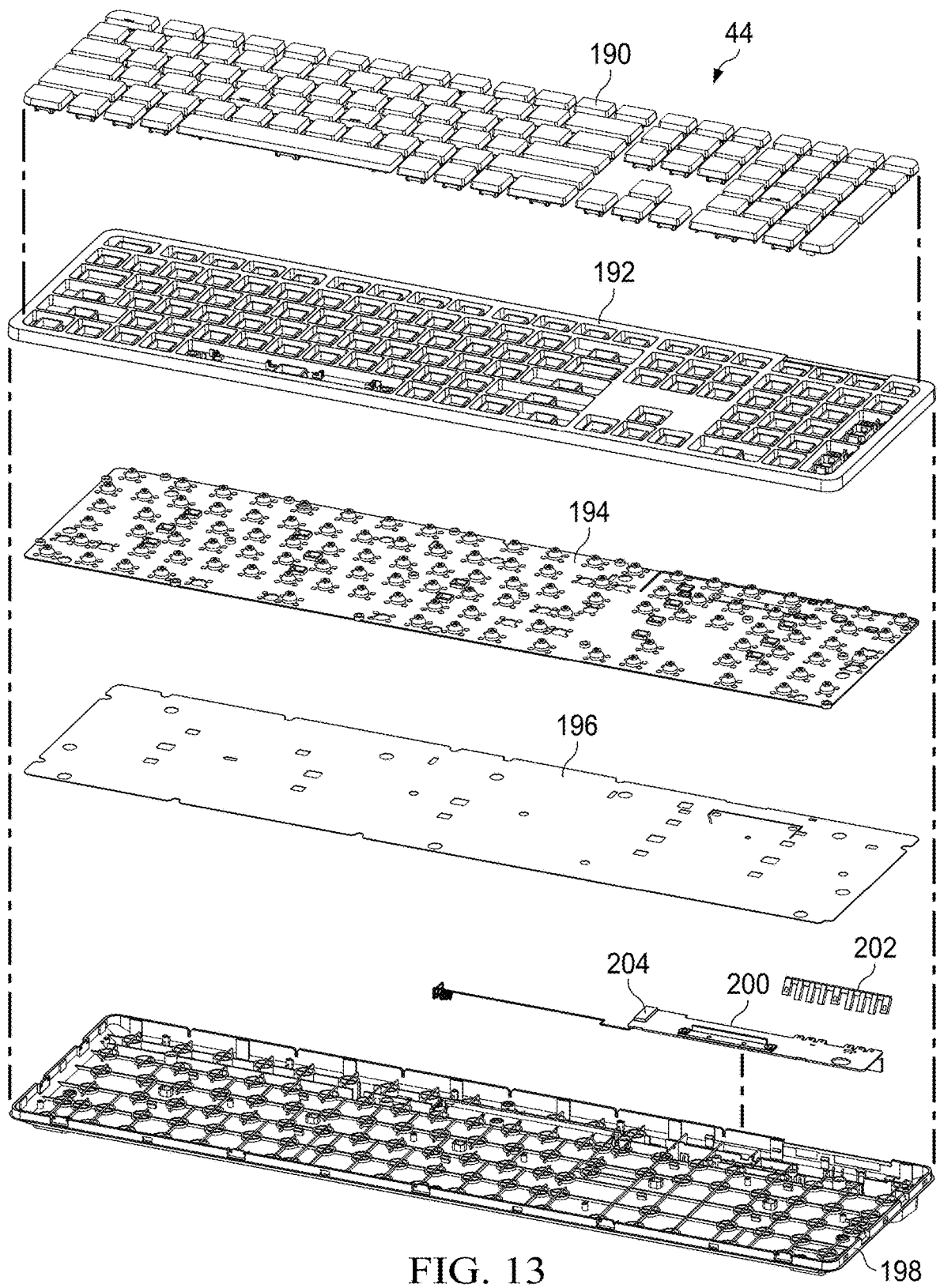
FIG. 13 depicts an upper perspective exploded view of a keyboard configured to detect fluid access to the keyboard interior.

Referring now to FIG. 13, an upper perspective exploded view depicts a keyboard 44 configured to detect fluid access to the keyboard interior. In the example embodiment, a layer of keys 190 couples into a frame 192 to accept key inputs. A membrane of biasing devices 194 fits under the frame 192 to bias the keys upward and to detect a key press, such as is described in FIG. 11. A touch membrane 196 below the biasing devices 194 detects the location of a key touch as described above to support multi-function single touch inputs. A base 198 couples to frame 192 to capture the keyboard components in one assembly. A circuit board 200 has an interface 202 with the key input and touch input membranes and a processing resource 204 with embedded non-transitory memory to manage control and detection of inputs. In the example embodiment, the processing resource includes support for a sensor that detects moisture within the keyboard assembly. For example, processing resource 204 is a binary digital humidity and temperature sensor for moisture detection, such as a Honeywell Humidlcon sensor HIH6000 Series. The liquid detection is a dual layer metasurface THz sensor that has identical resonant cells etched on a surface of quartz substrates to allow through THz spectroscopy analysis. The sensor housing is shielded with a hydrophobic filter and is condensation resistant with an operating range from -40 to 100 degrees C. Trace amounts of liquid are detected and reported to an information handling system, such as to logic of an embedded controller. In the example embodiment, the sensor is located at a base below the keyboard membrane and other keyboard resources, such as a touch detection surface or display panel.

Figure 14:
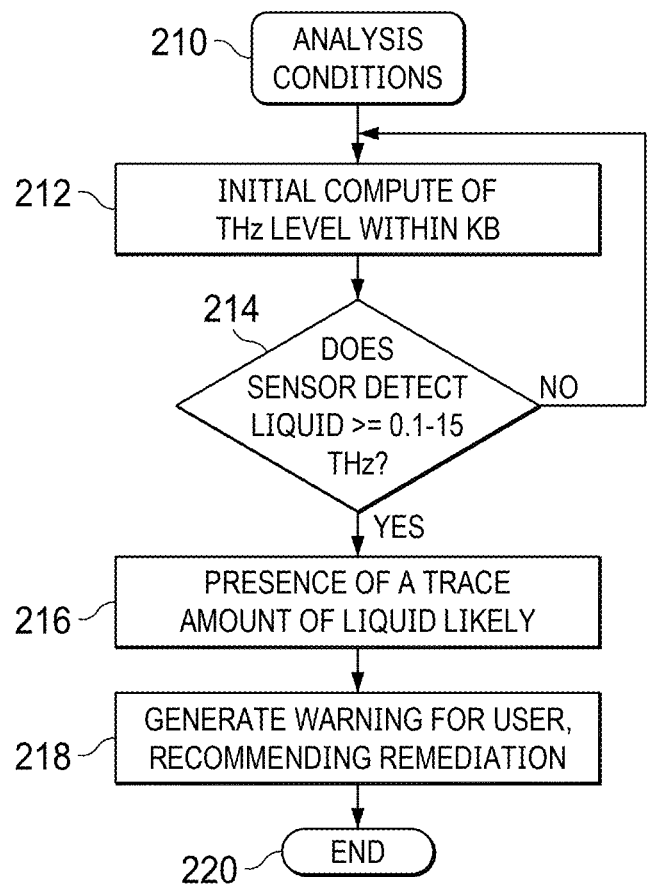
FIG. 14 depicts a flow diagram of a process for detection of trace amounts of liquid within a keyboard by THz spectroscopy analysis.

Referring now to FIG. 14, a flow diagram depicts a process for detection of trace amounts of liquid within a keyboard by THz spectroscopy analysis. The process starts at step 210 to read the conditions in the keyboard. At step 212 an initial computation is performed of THz levels within the keyboard. At step 214 a determination is made of whether the sensor detects liquid greater than or equal to 0.1-15 THz. If not, the process returns in an iterative fashion to step 212 to continue monitoring for liquid contamination within the keyboard. If the THz is greater than the threshold range, the process continues to step 216 to determine that the presence of a trace amount of fluid is likely. In one example embodiment, moisture readings are stored and compared over time so that a rapid change of a reading from a previous reading or set of readings can indicated moisture introduction. At step 218 a warning is generated for the end user regarding liquid intrusion and recommending remediation and at step 220 the process ends. The warning may be communicated through an information handling system display or with an indication at the keyboard, such as an LED indicator or a display panel included in the display.

Figure 15:
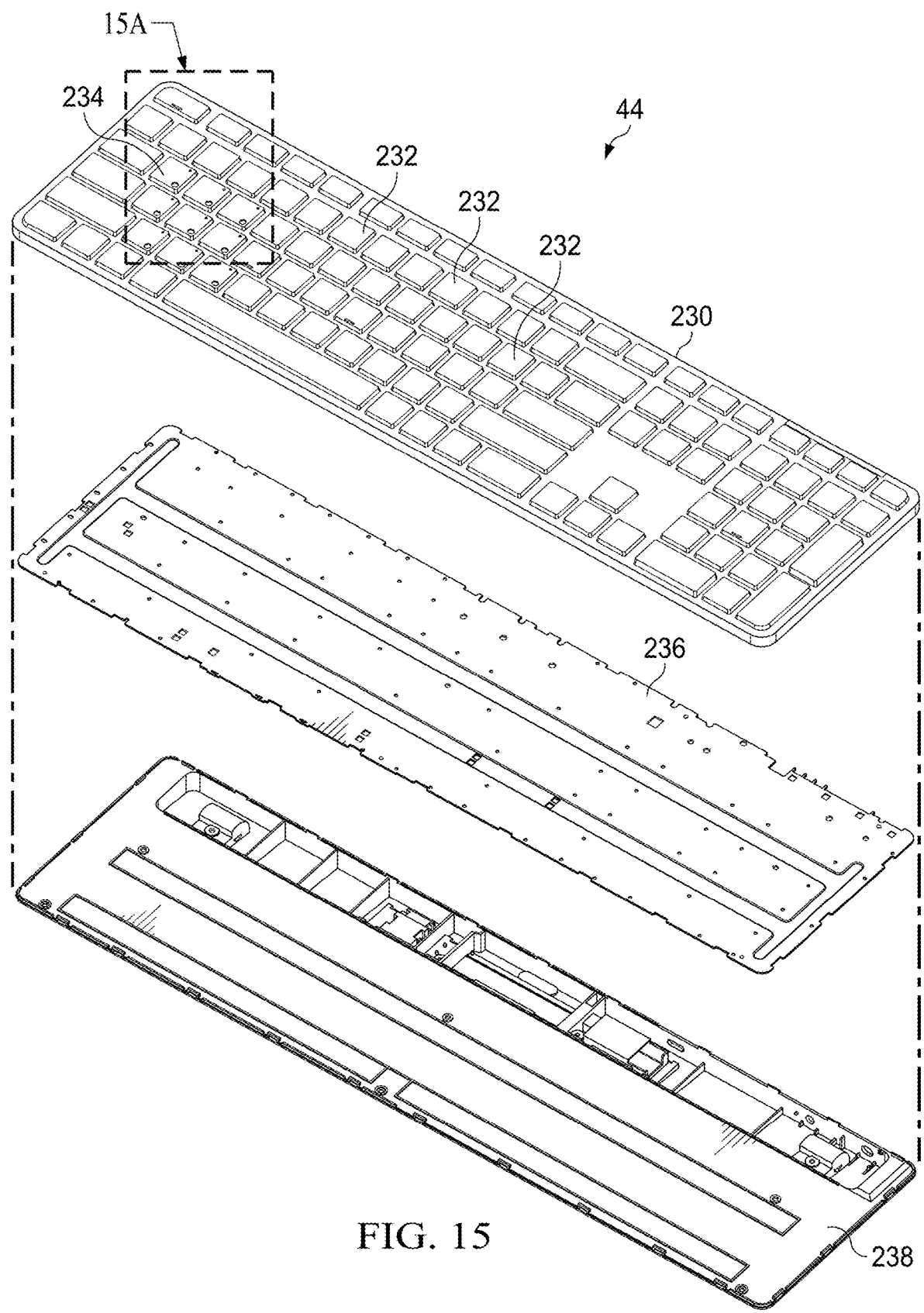
FIGS. 15, 15A and 15B depict a peripheral keyboard example embodiment having optical sensors below the keyboard keys to detect air gestures performed above the keyboard as inputs.
Figure 15A:
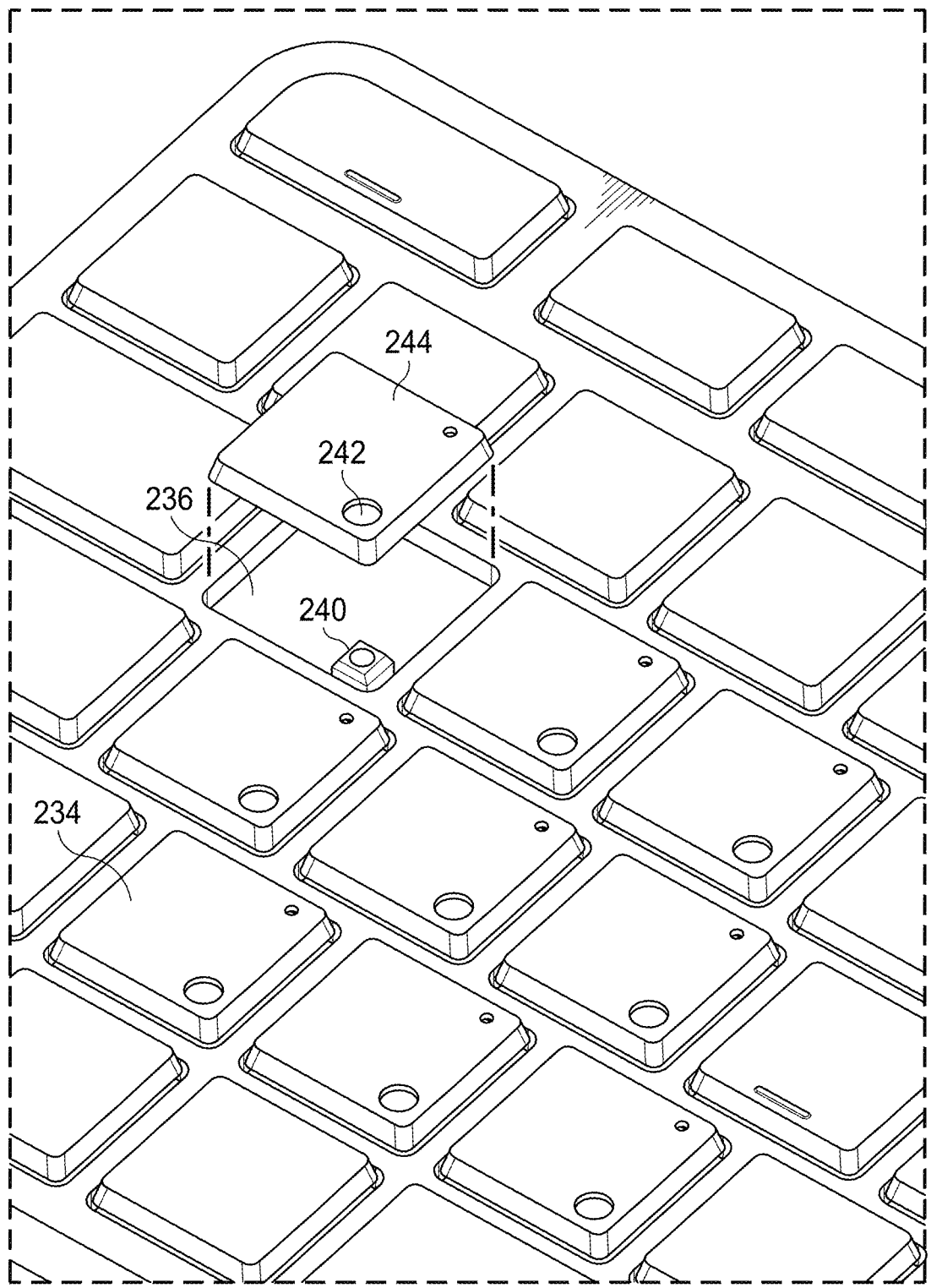
Figure 15B:
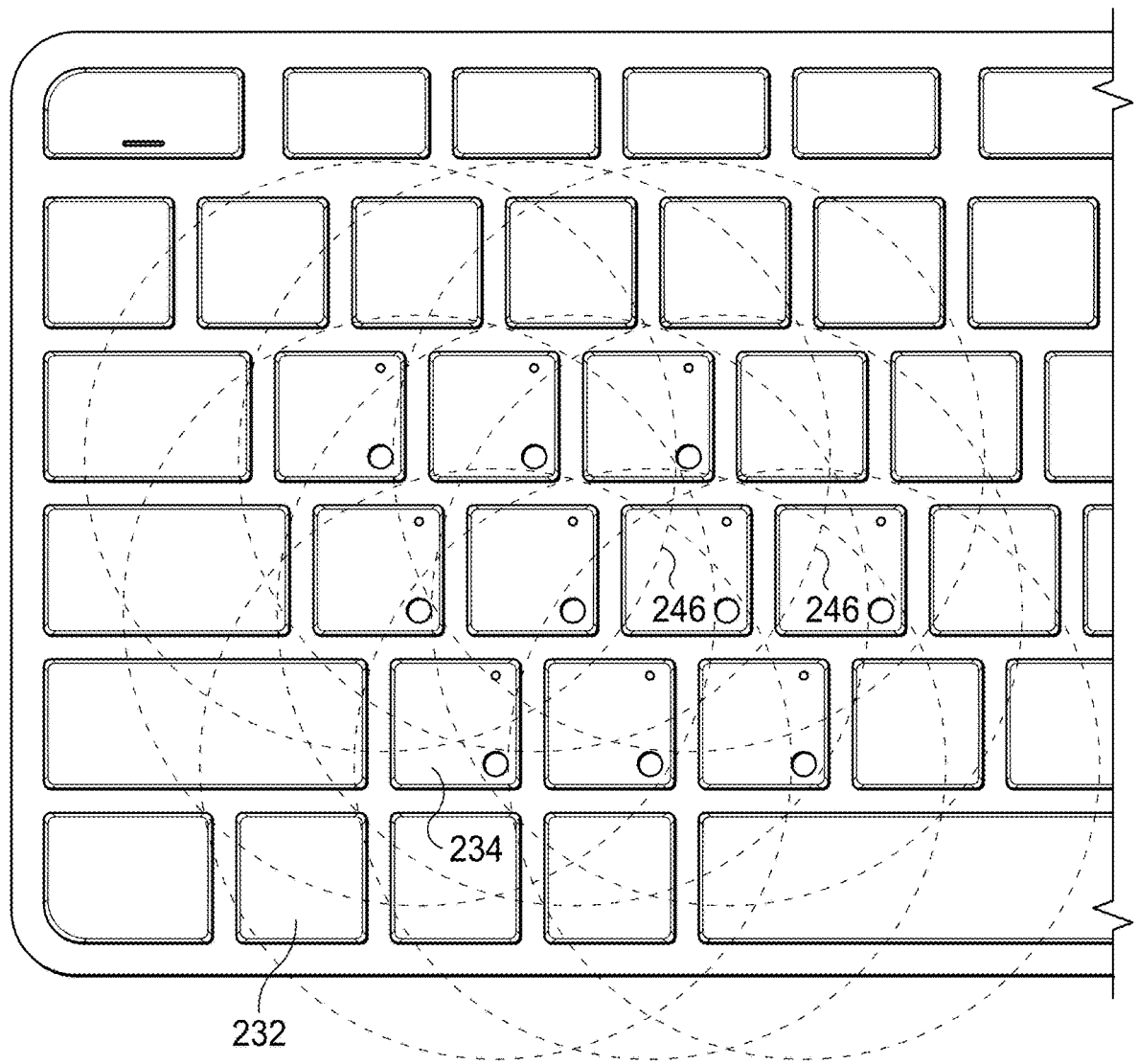

Referring now to FIGS. 15, 15A and 15B, a peripheral keyboard example embodiment is depicted having optical sensors below the keyboard keys to detect air gestures performed above the keyboard as inputs. Smart optical sensors monitor an area above the keyboard to detect hand gestures that have assigned values and communicate the values to an information handling system when the gestures are detected. In particular, hand gestures detected in the air above a keyboard aid an end user in making uncommon inputs that the end user might otherwise have to look at the keyboard to find the desired key, especially in low light conditions. For instance, a repeated use of ENTER, CTRL, SHIFT and functions keys distract from the end user's attention to a display while searching for less familiar keys. The example embodiment of FIG. 15 addresses these difficulties with a smart optical sensor arrangement 234 under some of the keys 232 held in a key frame 230 and a capacitive touch detection layer 236 captured between the frame 230 and a base 238. When a finger touch is detected at a key by proximity to capacitive touch detection layer 236, a position code that identifies the key is sent to the embedded controller so that a user interface at a display of an information handling system can present the identity of the display. The user interface identification of the key allows an end user to continue viewing the display while selecting less common keys for inputs. Alternatively, optical sensors in an optical sensor arrangement 234 detect an air gesture of the end user and apply the air gesture as a key input. When a key input is performed by the capacitive touch or the optical sensor, a sound like a key click may be output by a speaker to provide feedback to the end user.

FIG. 15A depicts the optical sensor arrangement 234 with a key cap 244 exploded out to show the underlying optical sensor 240 and capacitive touch detection layer 236. Each key cap 244 in the optical sensor arrangement 234 includes a window 242 through which the optical sensor 240 under the key has a field of view directly above the keys. For example, the optical sensor is a PixArt PAC9001LU integrated circuit controlled by a PCT3854QR controller to sense position and movement directly above each key within the optical sensor arrangement 234. FIG. 15B depicts a Venn diagram showing overlapping coverage of the optical sensors 240 in the location above optical sensor arrangement 234 where an end user can perform a gesture to replace a key input, such as enabling CNTRL or ALT for a multi-function key input. Some examples of gestures to command an input include a pointed finger to move a cursor on a display to a new location, tapping an index finger and thumb to perform an enter key input, a middle finger, index finger and thumb press to command a shift, and a "C" shape of the hand with the thumb and ring finger to command a CNTRL input.

Figure 16:
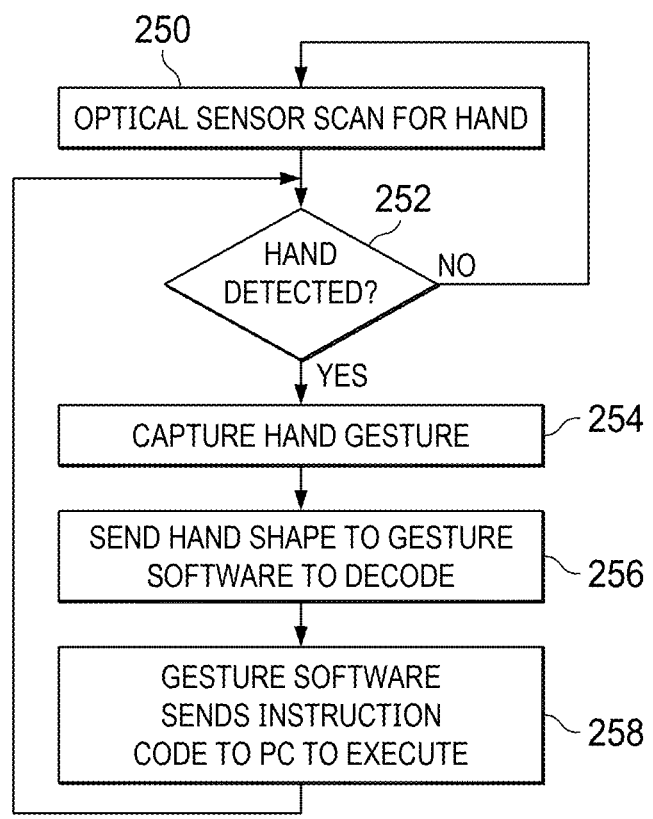
FIG. 16 depicts a flow diagram of a process for detecting air gestures above a keyboard with plural optical sensors under plural keys in an optical sensor arrangement.

Referring now to FIG. 16, a flow diagram depicts a process for detecting air gestures above a keyboard with plural optical sensors under plural keys in an optical sensor arrangement. The process starts at step 250 with an optical sensor scan for a hand above the keys of the optical sensor arrangement. If a hand is not detected, the process iterates to step 252 to continue searching for the hand. When a hand is detected, the process continues to step 254 to capture the hand gesture. At step 256, the hand shape is sent to a gesture detection logic to decode the gesture, such as the processing resource that is managing the optical sensors, the embedded controller and/or the system processor. Once the gesture logic decodes the gesture, at step 258 it sends instruction code to the information handling system to execute the detected gesture value.

Figure 17:
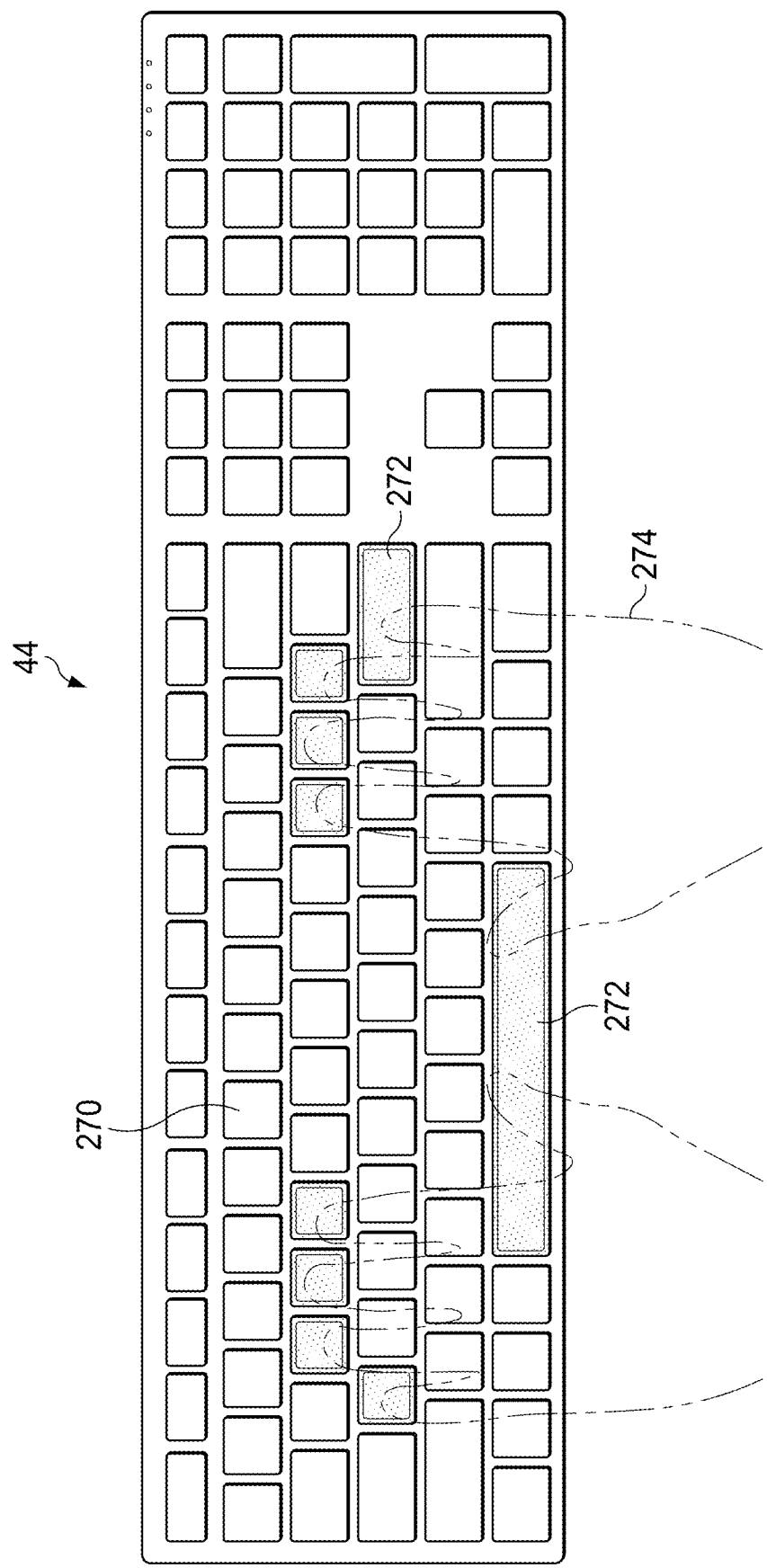
FIGS. 17 and 17A depict an example peripheral keyboard having key values detected by the keyboard capacitive touch detection membrane highlighted at the keyboard and in a user interface.
Figure 17A:
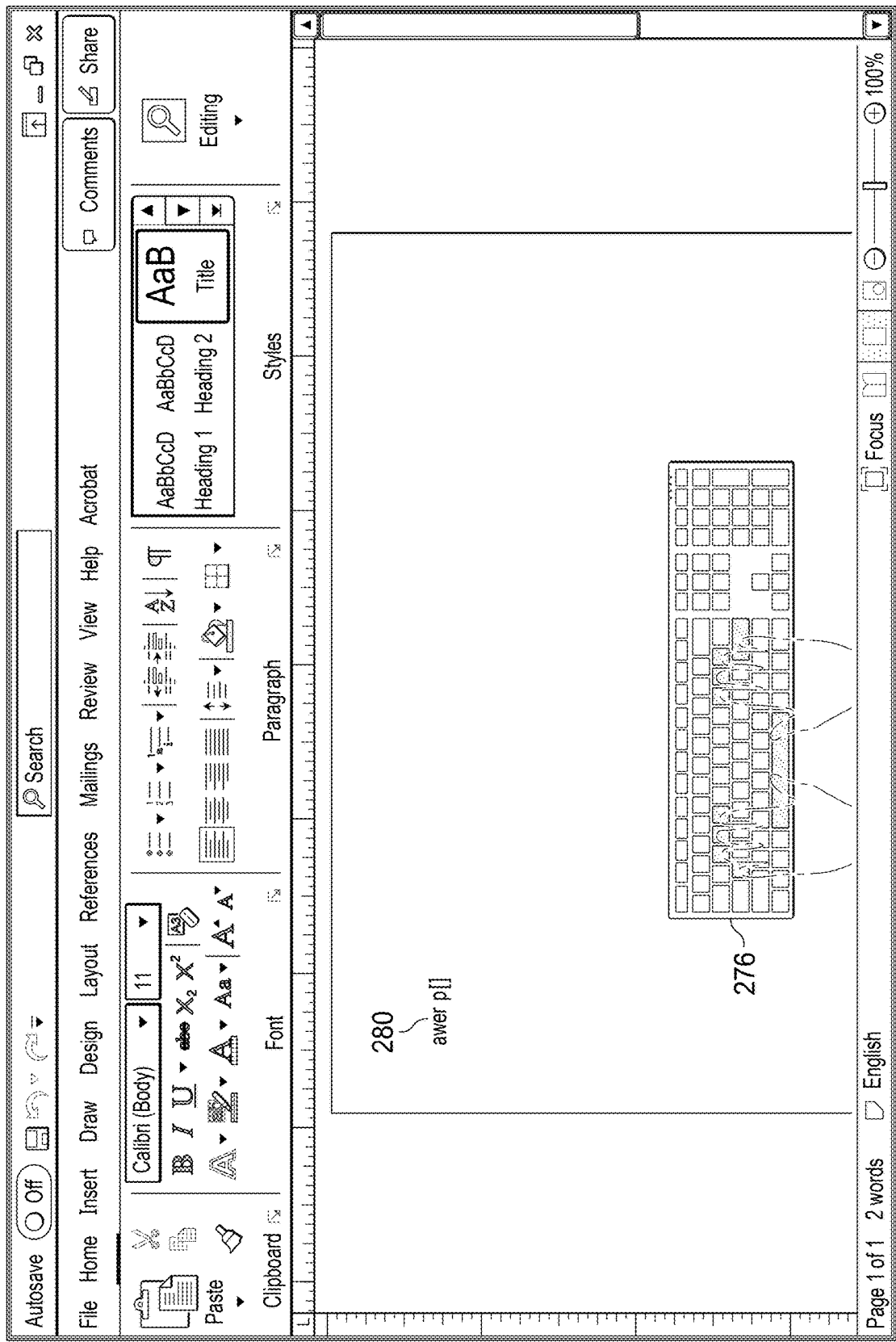

Referring now to FIGS. 17 and 17A, an example peripheral keyboard 44 is depicted having key values detected by the keyboard capacitive touch detection membrane highlighted at the keyboard and in a user interface. In the example embodiment, when an end user hand 274 places fingers over keys 270, the capacitive touch detection membrane detects the keys that have a finger over top and highlight the keys with a backlight to show the key value 272. Simultaneously, as shown in FIG. 17A, a graphical user interface 278 presents a visual image of the keyboard 276 as a graphic with the keys and letters highlighted where the fingers are located. The key values are presented in a list 280 readily viewable by the end user so that the end user has three reference points to view the key values: the highlight values on the keys themselves, the graphical image of the keyboard with the highlighted values and the list of values. In one example embodiment, predefined keys that are less common and more difficult for end users to find may be highlighted in larger text, such as CNTRL and function keys.

Figure 18:
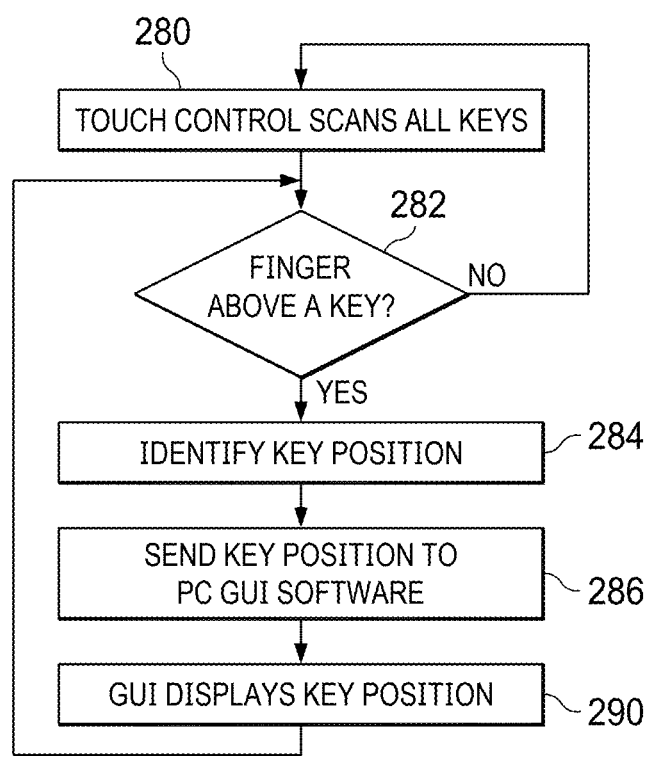
FIG. 18 depicts a flow diagram of a process for determining a key touch position from capacitive touch detection sensing with a touch detection sensor membrane disposed under the keyboard keys.

Referring now to FIG. 18, a flow diagram depicts a process for determining a key touch position from capacitive touch detection sensing with a touch detection sensor membrane disposed under the keyboard keys. The process starts at step 280 with touch control scans of all the keys to detect keys that have a finger placed over them. At step 282 a determination is made of whether a finger is placed over any of the keys and, if not, the process returns to step 280 to continue monitoring for a finger placement over the keys. When a finger placement is detected over the key, the process continues to step 284 to identify the key position. At step 286 the key position is communicated to the information handling system embedded controller to populate the graphical user interface with the key positions. At step 290, the graphical user interface presents the key positions as highlighted and as a list where the end user finger is detected.

Figure 19:
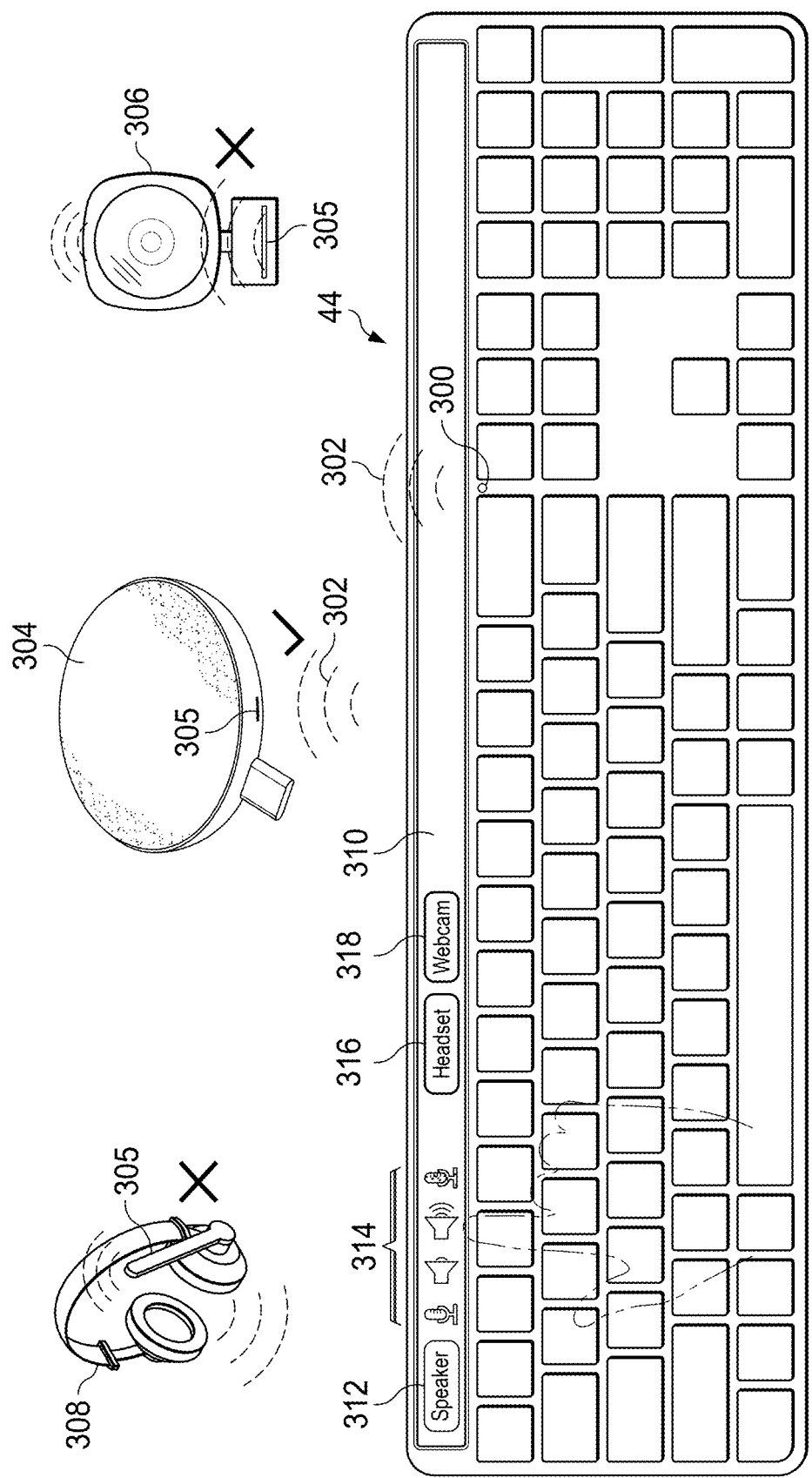
FIG. 19 depicts an upper view of a keyboard having an ultrasound position and doppler sensor to control keyboard-to-peer devices.

Referring now to FIG. 19, an upper view depicts a keyboard having an ultrasound position and doppler sensor to control keyboard-to-peer devices. In the example embodiment, keyboard 44 controls a headset 308, a speaker 304 and a webcam 306. Conventional control of these types of peer devices from a keyboard involves communication of commands from the keyboard through an information handling system and then out to the peer devices, such as under the management of an embedded controller and/or a wireless network controller. Conventional control tends to have latency between issuance of commands and performance of commands. To provide direct control of peer devices by keyboard 44, a MEMs speaker 300 is included in keyboard 44 to generate ultrasound pulses that carry commands to microphones of the peer devices. For example, MEM speaker 300 generates 20 KHz volume up and down pulses that are inaudible to the human ear but distinguished by microphones 305 coupled to each peer device. In one example embodiment, the ultrasound pulses are 1 msec to communicate a zero and 3 msec to communicate a one. The ultrasound pulses send bits of information that are received at peer device microphones and applied to control peer device operations, such as increasing volume, decreasing volume, recording video, pausing video and similar commands. Advantageously, the ultrasonic commands leverage existing hardware elements so that deployed keyboards and peer devices can update operating embedded control to enable commands. For instance, MEMs speaker 300 may be a doppler sensor designed to capture gestures above the keyboard and microphones in the peer devices and capture ambient noise to support noise cancellation.

In the example embodiment of FIG. 19, an LCD function bar 310 presents control icons to select peer devices and control the operation of the peer devices. In alternative embodiments, peer commands may be input through conventional keys, such as function keys of the keyboard. The peer devices include a speaker 304, a webcamera 306 and a headphone 308. Each peer device includes a microphone 305 that receives ultrasound pulses from MEMs speaker 300 and decodes the received ultrasound audio as bits of information. An end user selects a speaker icon 312 at LCD function bar 310 to present speaker controls 314 that manage speaker volume up and down. An end user can also select headphones icon 316 or webcam icon 318 to control headphones 308 and webcamera 306 respectively. When an end user selects a volume up or a volume down for speaker 304, MEMs speaker 300 sends ultrasound pulses 302 to speaker 304 microphone 305 with identification bits so that logic of speaker 304 knows to respond to the volume command while other peer devices do not respond. The form of the instruction string may include an identifier for the keyboard, identifier for the speaker, a volume level, and/or a change in volume amount. The use of identifiers for the keyboard and peer devices help to allow multiple keyboards in an area control their own specific devices. When a peer device receives an ultrasound command, the peer device may respond by generating an ultrasound ACK that is received by a microphone of the keyboard. In one embodiment, the keyboard 44 sends a preamble code to a predetermined time with a continuous or near continuous ultrasound pattern to aid speaker 305 in preparation to receive a command where the speaker is outputting audible sounds that might mask the ultrasound command. For example, a microphone filter once notified of an incoming ultrasound command enables a narrow notch filter to listen for the command and the ultrasound frequency, such as 20 KHz. In one alternative embodiment, each peer device distinguishes commands directed to it by identifying a particular ultrasound frequency range associated with the peer device. MEMs speaker 300 then adjusts the ultrasound frequency of the command based upon the device that is being commanded. In another embodiment, the preamble may be performed with a frequency or a pattern that identifies which of plural peer devices will receive a command after the preamble is complete.

Figure 20:
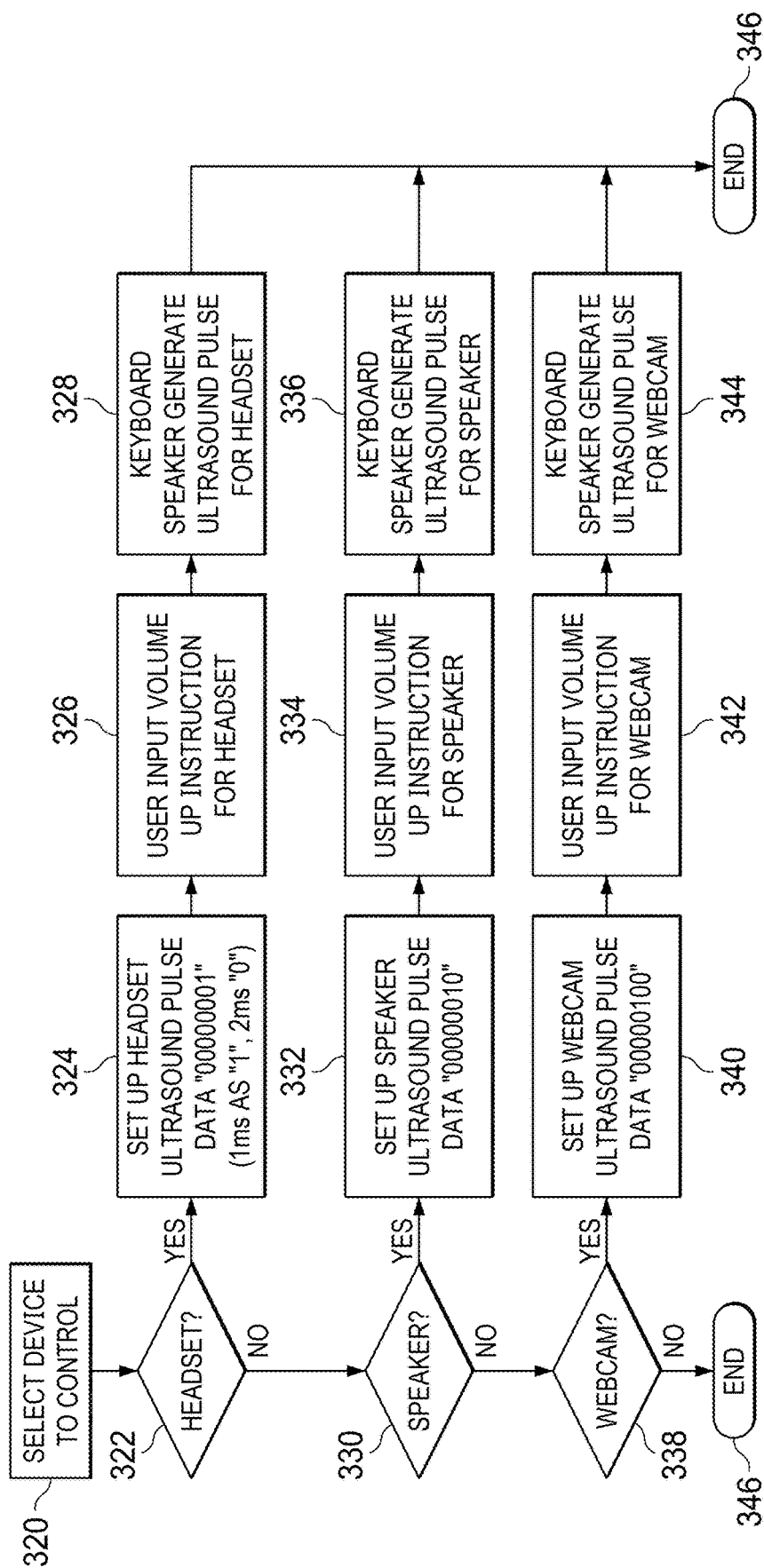
FIGS. 20 and 20A depict an ultrasound keyboard-to-peer control flow chart and block diagram having an example of commands to control peer devices from a keyboard with ultrasonic pulses.
Figure 20A:
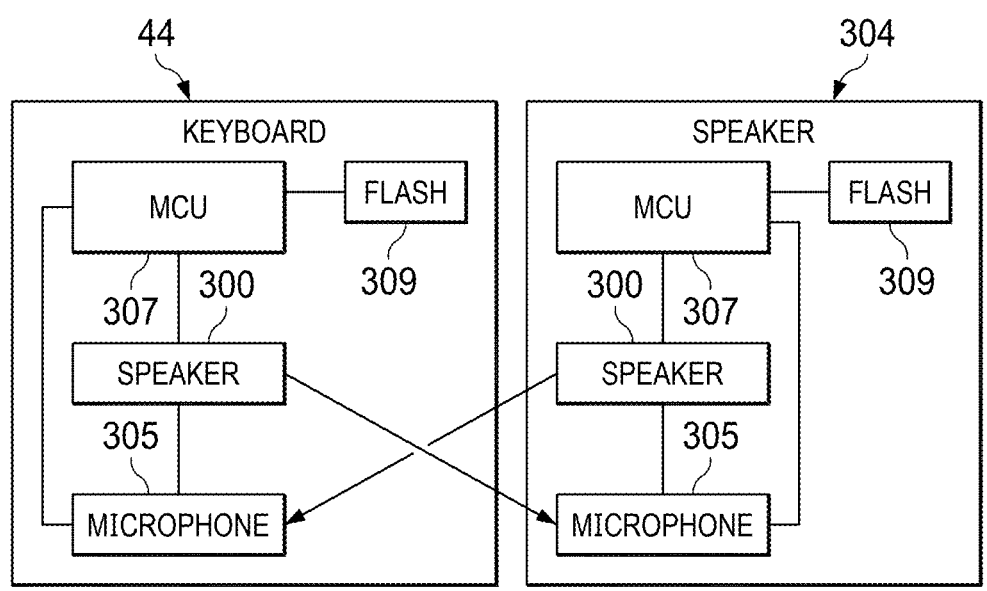

Referring now to FIGS. 20 and 20A, an ultrasound keyboard-to-peer control flow chart and block diagram depict example commands to control peer devices from a keyboard with ultrasonic pulses. The control process starts at step 320 with selection by an end user of the peer device to control. At step 322 a determination is made of whether the peer device to control is a headset and, if so, the process continues to step 324 to set up the headset ultrasound pulse data as a byte value of one sent as 1 msec pulses for one and 2 msec pulses for zero. At step 326 the user selects an input of increased volume as an instruction for the headset. At step 328 the keyboard speaker generates an ultrasound pulse to command the headset volume up and the process ends at step 346. If at step 322 the headset is not selected the process continues to step 330 to determine if the speaker is the peer device selected for a command. If so, the process continues to step 332 to set up the speaker ultrasound pulse data with a byte value of two. At step 334 the end user inputs an up volume instruction for the speaker and at step 336 the keyboard speaker generates an ultrasound pulse for the speaker to command speaker volume up. If the speaker is not selected at step 330, the process continues to step 338 to determine if the webcamera is selected and, if not selected the process ends at step 346. When the webcamera is selected at step 338 the process continues to step 340 to setup the webcamera ultrasonic pulse data with a byte value of four. At step 342 the user inputs a volume up instruction for the webcamera and at step 344 the keyboard speaker generates the ultrasonic pulse to command the webcamera volume up. In various embodiments a variety of commands are available, such as pause, mute, record or other commands associated with each peer device. In one embodiment, the set up byte to select the peer device for the command may be sent as a preamble that has a length determined from the amount of noise in the area of keyboard so that the command has a desired likelihood to be heard by the peer device microphone.

FIG. 20A depicts a simplified block diagram of system for commanding from a keyboard peer device control with ultrasound pulses. A processing resource of keyboard 44, such as a microcontroller unit (MCU) 307, executes instructions stored in a non-transitory memory, such as flash 309, to generate ultrasonic pulses with control information to manage operations at a speaker 304 or other peer device. The ultrasonic pulses from speaker 300 of keyboard 44 are received by a microphone 305 of speaker 304 where a processing resource, such as an MCU 307 executing instructions in flash memory 309, decodes the command included in the ultrasonic pulses to perform the operational change at the speaker, such as changing the volume. Once the command is received and performed, the instructions on the speaker 304 MCU 307 generate an usltrasonic pulse ACK response sent by a MEMs speaker 300 to a microphone 305 on keyboard 44. Alternatively, speaker 304 can include the ultrasonic ACK in the content played by the speaker or the keyboard microphone can listen for a change in volume of the content played by speaker 304.

Figure 21:
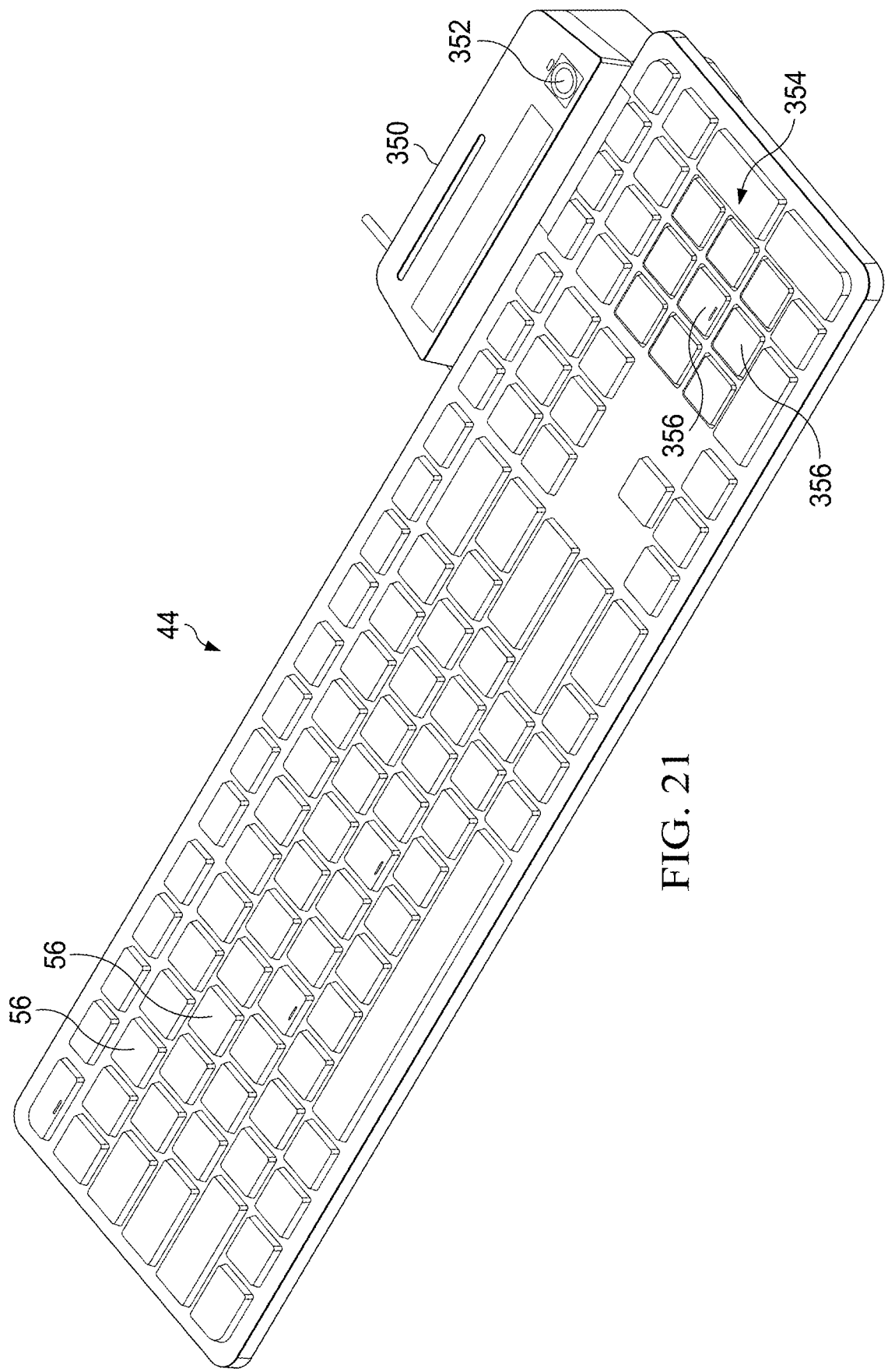
FIG. 21 depicts an upper perspective view of a keyboard having a zero trust dual authentication security system.

Referring now to FIG. 21, an upper perspective view of a keyboard 44 depicts a zero trust dual authentication security system. Keyboard 44 includes a smart card reader 350 with an integrated fingerprint reader 352 to enforce enhanced security before an end user has access to make inputs through keys 56. As a first security measure, an end user must insert a smart card with security information into smart card reader 350 to gain access to an information handling system interfaced with the keyboard. When keyboard 44 is inactive, none of keys 56 will accept inputs and keys 356 of a number pad 354 are collapsed to a retracted state to physically prevent inputs. Number pad 354 collapses keys with a stepper motor that slides a tray of magnets under the number pad keys 356 to pull the keys down. When a smart card is recognized as authorized by smart card reader 350, a touch detection membrane located under the number pad is activated to accept touch inputs. An end user enters a pattern at the capacitive touch detection surface, such as by using the number pad key values as a reference, and the pattern is compared against an authorized pattern by the keyboard processing resource to authorize access to the keys. When an authorized pattern is traced on the capacitive touch detection surface and an authorized fingerprint is input to fingerprint reader 352, the step motor activates to remove the magnets from under the number pad keys and the keyboard keys are activated to accept key inputs. Although the example embodiment has the touch detection surface below the number pad keys 1-9, in alternative embodiments, the touch detection surface may be located under other keys or under the entirety of the keyboard keys as described above.

Figure 22:
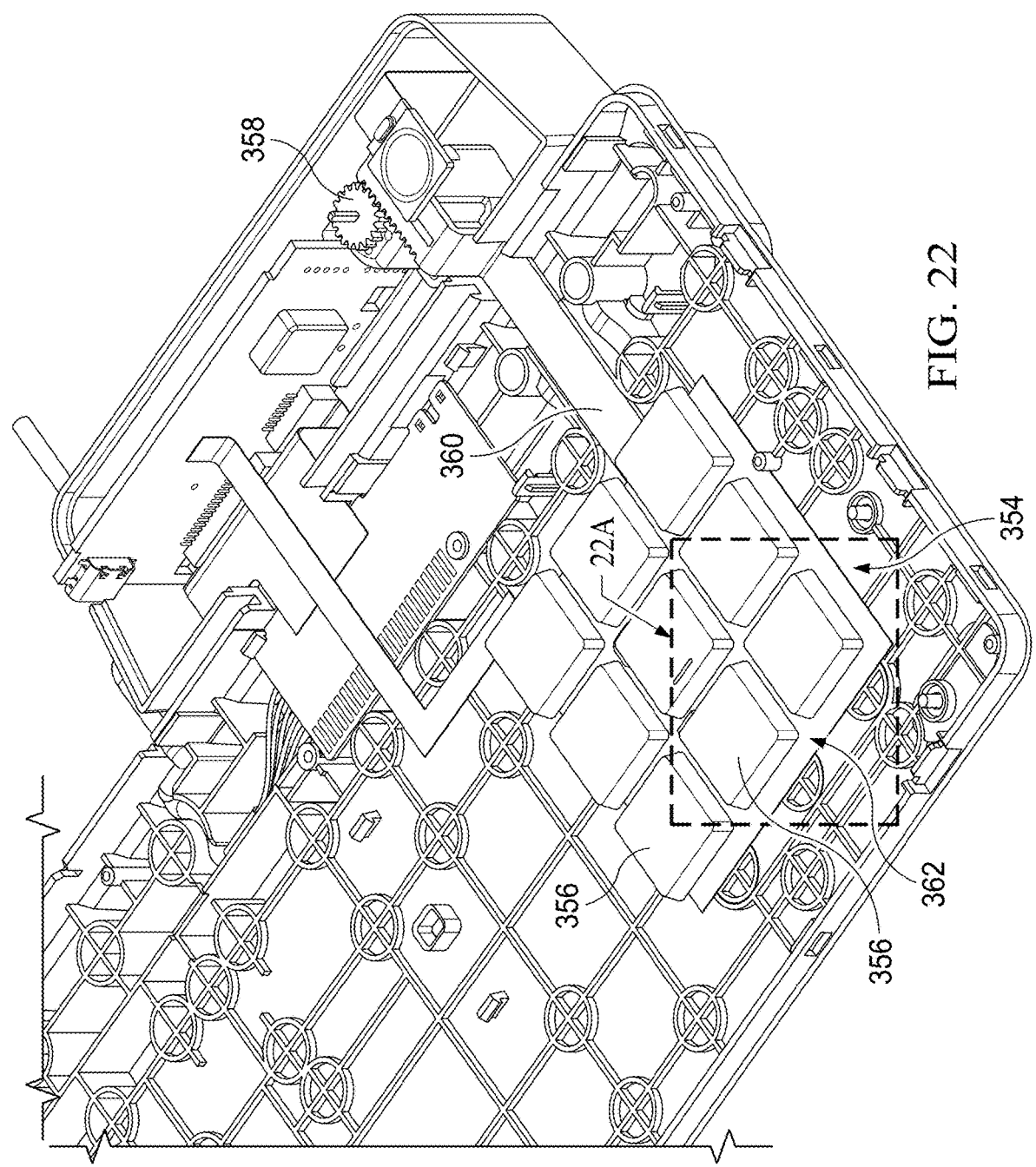
Figure 22A:
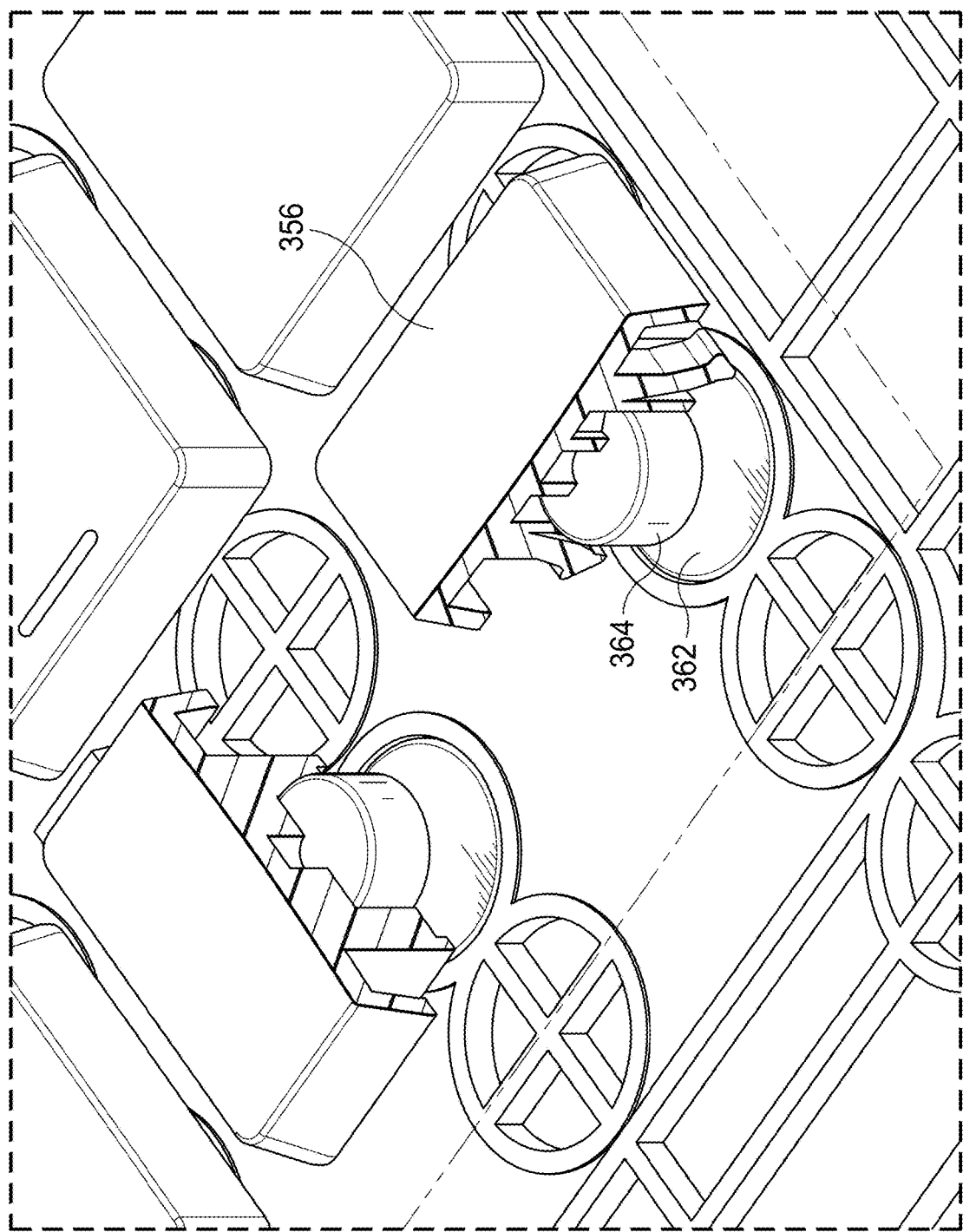

Referring now to FIGS. 22, 22A, 22B and 22C, sectional transparent views of the keyboard depict key retraction and touch sensing to support dual authentication for keyboard key access. FIG. 22 depicts an upper perspective view of a stepper motor 358 engagement by an arm 360 of number pad 354 having number keys 356 placed over a capacitive touch detection membrane 362. In the example depicted by FIG. 22, keys 356 are lowered to a retracted state by magnetic interactions between magnets in each number pad key 356 and magnets in the capacitive touch detection membrane. FIG. 22A depicts a sectional view of number pad keys 356 that include a magnet 364 pulled to a retracted position by a tray magnet 362, which moves by the stepper motor between the depicted aligned condition that retracts the key and a misaligned position that allows a rubber dome bias to raise the key. FIG. 22B depicts a side sectional view of a tray 368 having tray magnets 366 that slide in the direction of arrow 372 to misalign the tray magnets and key magnets 364 so that a rubber dome biases the number pad keys 356 to an upward position. FIG. 22C depicts a side sectional view of the number pad keys 356 retracted to a lowered position when tray 368 slides in the direction of arrow 370 to align key magnets 364 and tray magnets 366.

Figure 23:
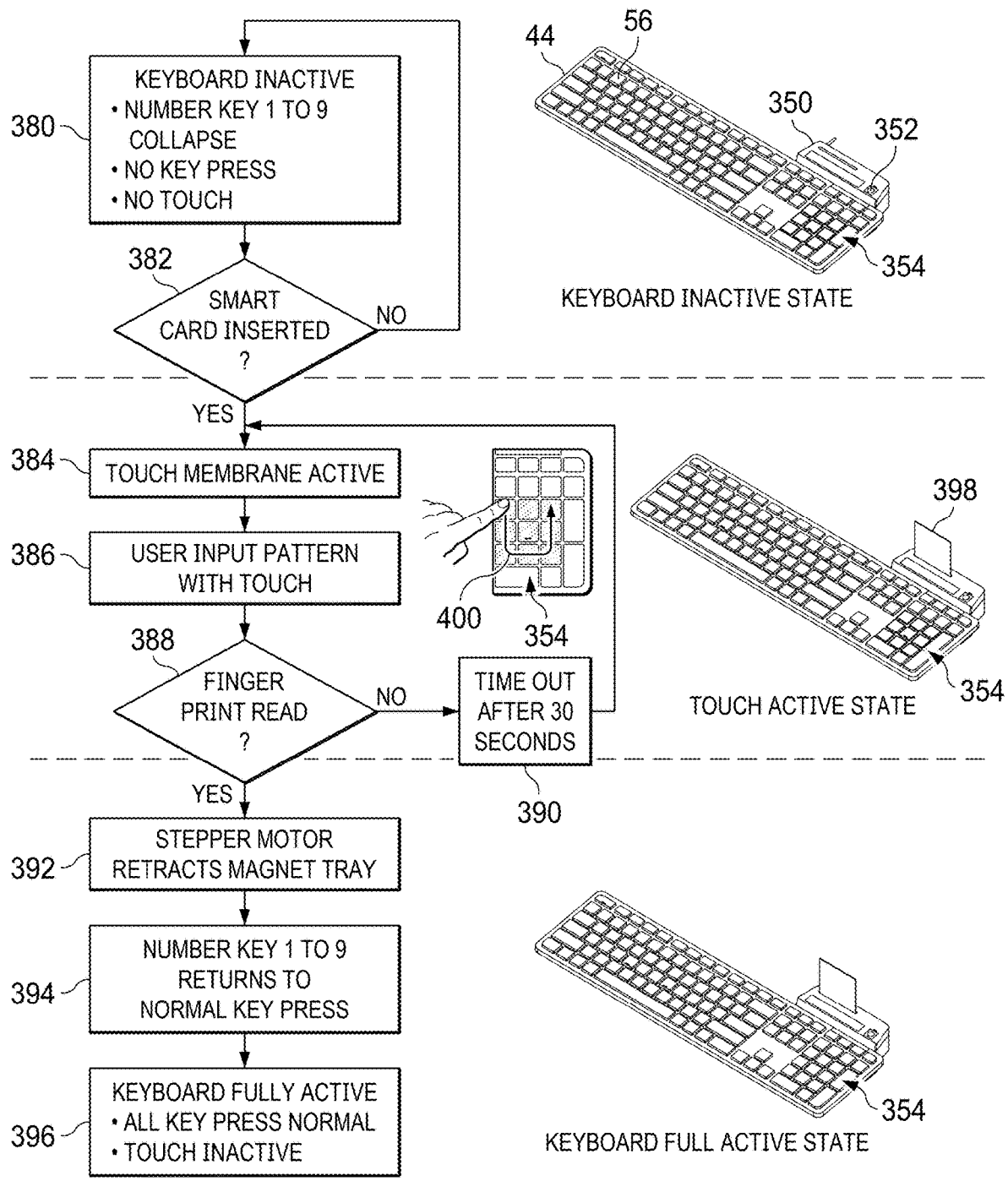
FIG. 23 depicts a flow diagram of a process for dual authentication at a keyboard to authorize access to an information handling system.

Referring now to FIG. 23, a flow diagram depicts a process for dual authentication at a keyboard 44 to authorize access to an information handling system. The process starts at step 380 with the keyboard inactive and unable to accept user inputs to the information handling system. In the inactive state number pad 354 has the keys retracted to a lowered position, keys 56 are disconnected from communication of inputs and the capacitive touch detection membrane is powered down. At step 382 a determination is made of whether a smart card 398 is inserted into smart card reader 350 and, if not, the process reiteratively returns to step 380 to maintain the inactive state and monitor for a smart card insertion. When a smart card insertion is detected at step 382, the process continues to step 384 to activate the touch detection membrane located under the number pad. At step 386 with the number pad keys retracted the end user traces a pattern 400 to authenticate the end user associated with the smart card. Once the pattern is traced, fingerprint reader 352 is activated and a step 388 the end user finger print is read to verify the end user identity. If the fingerprint is not read by a time out period, such as 30 seconds at step 390, the process returns to step 400 to activate the touch detection membrane and require an input of the security pattern. If at step 388 the fingerprint is matched, the process continues to step 392 to activate the stepper motor and retract the magnet tray. At step 394 the number pad keys are biased upward once the magnetic attraction is removed and available to accept conventional inputs. At step 396 the keyboard is in a fully active state with all keys accepting inputs and the touch detection membrane inactive.

Figure 24:
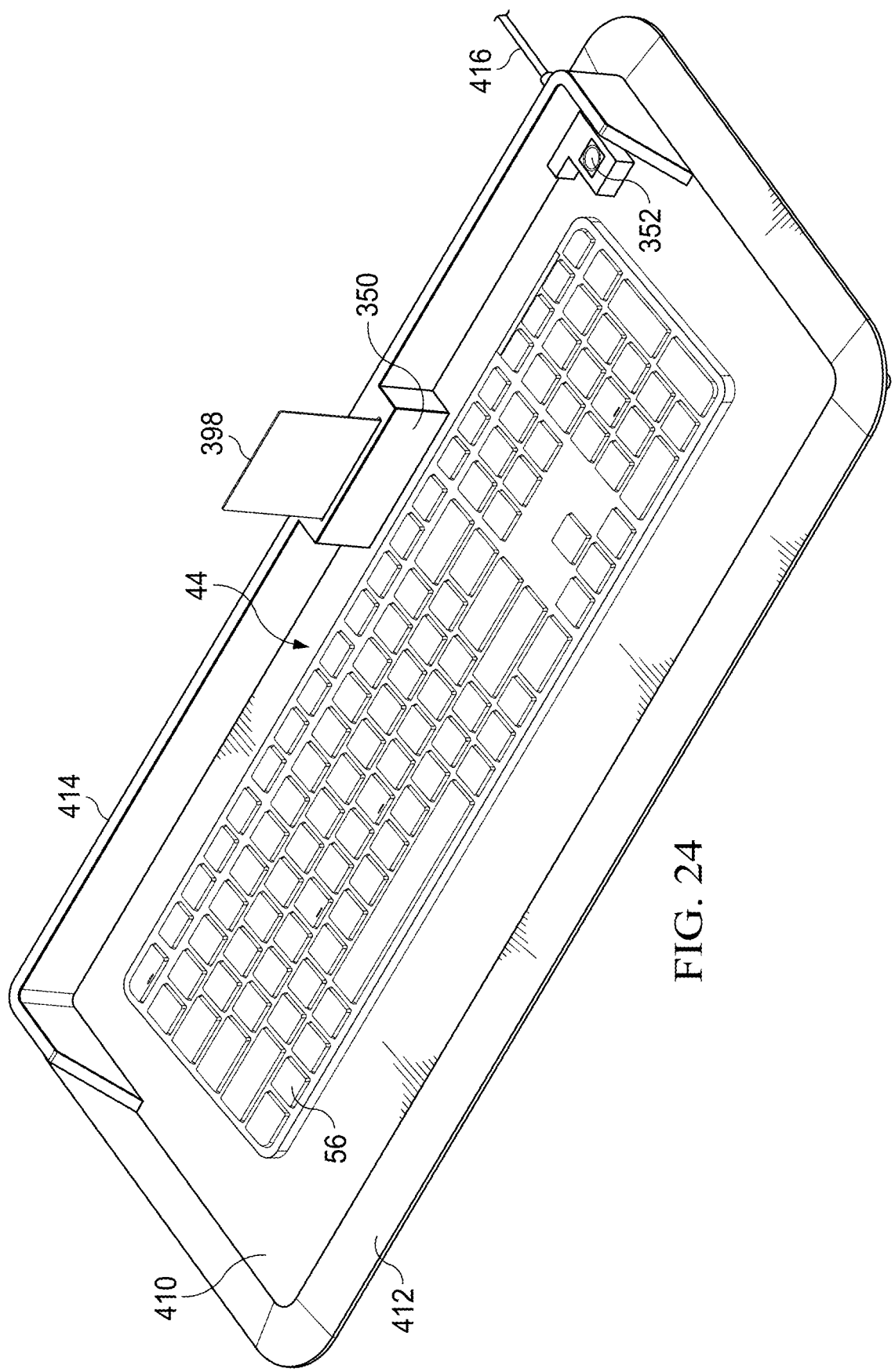
FIG. 24 depicts an alternative embodiment of a secure keyboard that offers a split secure access to a base unit and to user inputs at the keyboard.

Referring now to FIG. 24, an alternative embodiment of a secure keyboard is depicted that offers a split secure access to a base unit and to user inputs at a keyboard. Keyboards that include security resources can have more expensive repairs so that a secured information handling system access can be delayed when a breakdown occurs. By splitting the keyboard functionality from the security functionality, security equipment may be maintained separate from a keyboard to reduce expense and enhance usable life for both the keyboard and security equipment. In the example embodiment, a peripheral keyboard 44 with active keys 56 freely rests in a base 410 that is bolted to a desktop surface with a bezel 412 covering the bolts to provide access to the keyboard. A smart card reader 350 accepts a smart card 398 to authorize interactions with an information handling system in combination with a fingerprint reader 352. The base interfaces with the information handling system through a USB or similar cable 416. A shield 414 coupled to the rear side of base 410 blocks transmission of wireless signals from the keyboard through the rear side of the base, such as low power Near Field Communication (NFC) signals used to communicate between base 410 and peripheral keyboard 44.

Figure 25:
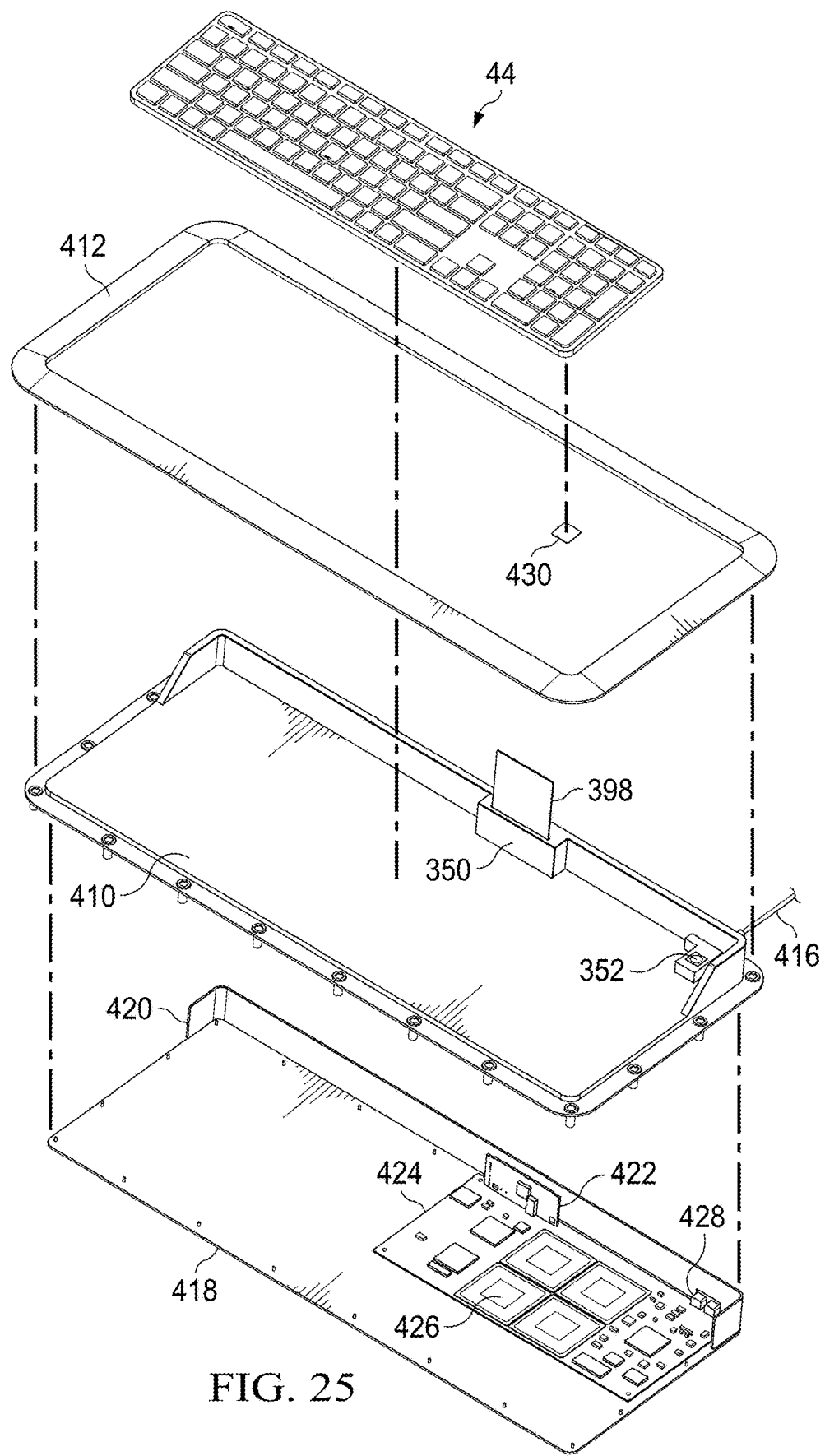
FIG. 25 depicts an exploded view of a split access secure keyboard to accept inputs in a base unit and in a separate mode.

Referring now to FIG. 25, an exploded perspective view depicts a split access secure keyboard to accept inputs in a base unit and in a separate mode. In the example embodiment, a base 410 affixes to a desktop with bolts and a base bottom case 418 is secured with a bezel 412 that affixes to the base and overlaps the perimeter of the base bottom case. A smart card circuit board 422 fits into smart card reader 350 to accept and read smart card 398. A main circuit board 424 couples to the base bottom case 418 and couples processing resources for keyboard interfaces with a USB cable and the fingerprint reader 352. Dual USB ports 428 interface with main board 424 to communicate between a keyboard and an information handling system. Main board 424 has four NFC coils 426 that communicate with an NFC circuit 430 disposed on a bottom of keyboard 44. A shield 420 at the rear side of base bottom case 418 blocks transmission of NFC signals from the rear side of the keyboard. In operation, the NFC coils 426 communicate with the keyboard NFC circuit 430 and also pass battery charge to the keyboard. An otherwise unsecure keyboard placed on the base accepts key inputs to communicate in a secure manner with an information handling system based upon smart card and fingerprint authorization. The short range of the NFC signals minimizes the risk of unauthorized access to keyboard inputs.

Figure 26:
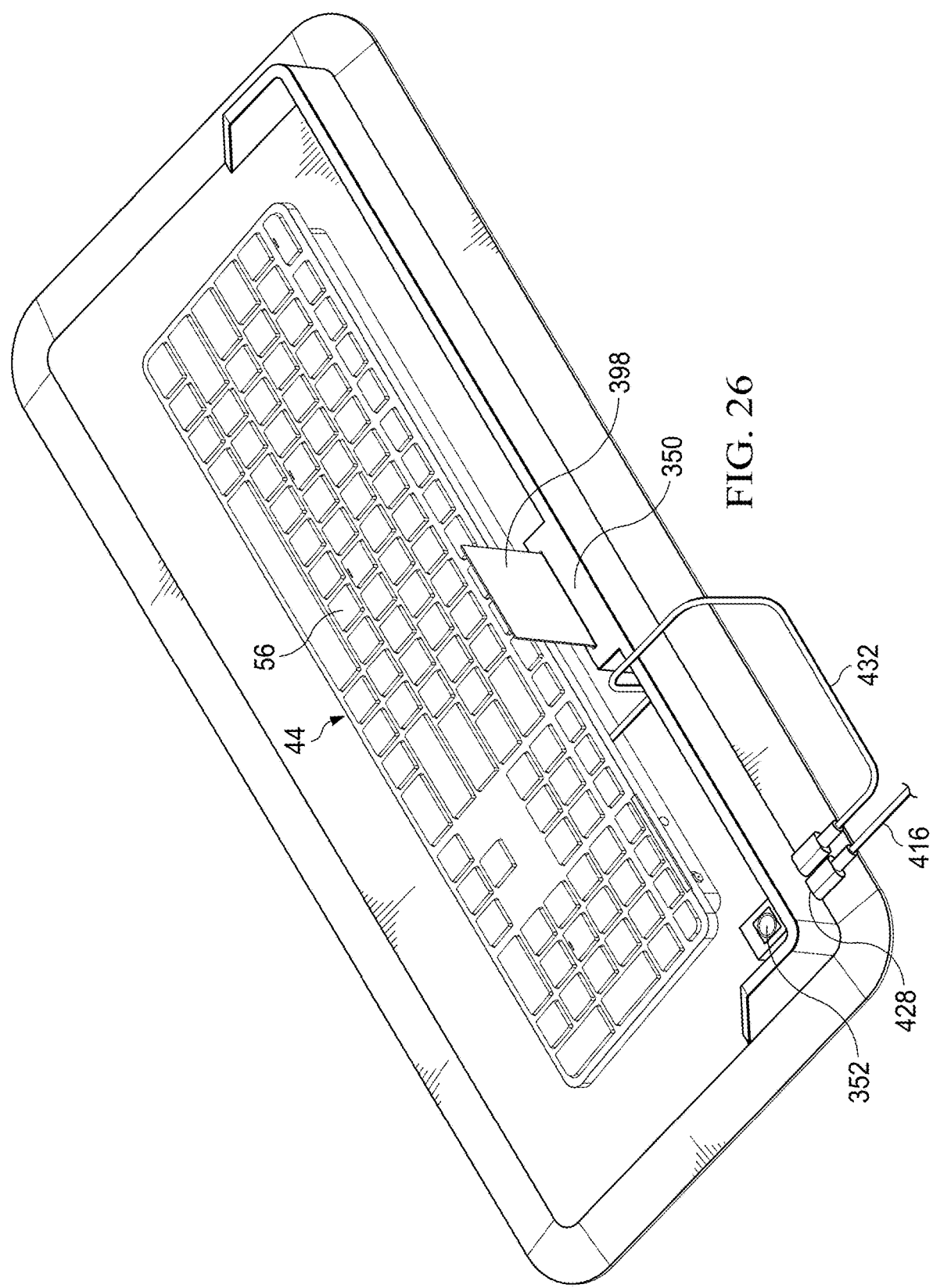
FIGS. 26 and 26A depict a rear upper perspective view and functional block diagram of a split access keyboard secure interface to a keyboard and an information handling system.
Figure 26A:
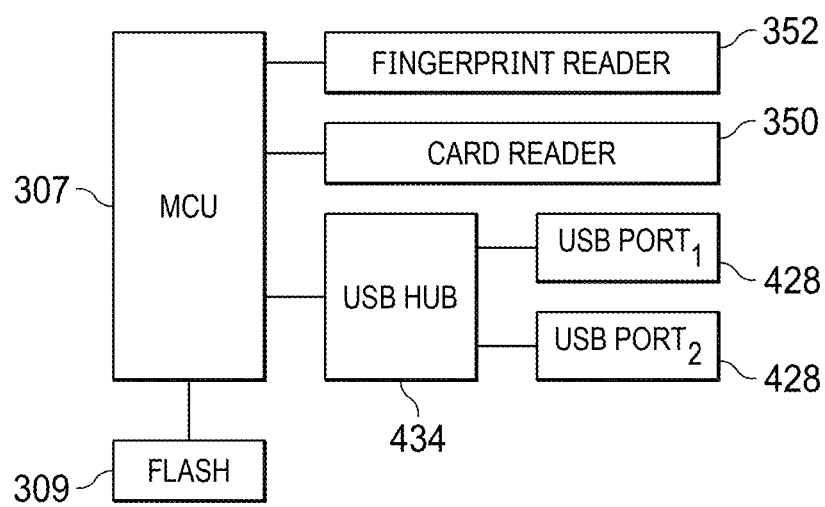

Referring now to FIGS. 26 and 26A, a rear upper perspective view depicts a split access keyboard secure interface to a keyboard and an information handling system. Card reader 350 when an authorized card is inserted and fingerprint reader 352 when an authorized fingerprint is read activate a USB port 428 to communicate keyboard inputs to an information handling system through a USB cable 416. This physical security protects the information handling system from an interface with an unsecure keyboard. Peripheral keyboard 44 in the example embodiment accepts key 56 inputs and communicates the key inputs to a second USB port 428 through a USB cable 432. Logic stored in flash memory of the main board and executing on the MCU processing resource prevents communication from the first USB port to the second USB port unless the smart card and fingerprint security information is satisfied. Although the NFC interface described in FIG. 25 performs a similar function, the dual USB port arrangement supports a conventional keyboard interface with a peripheral keyboard that lacks an NFC circuit at the bottom surface. FIG. 26A depicts a functional block diagram of the main board to selectively communicate key inputs to an information handling system. Instructions stored in flash 309 and executed by MCU 307 command USB hub 434 to prevent communication from a first USB port 428 to a second USB port 428 unless authorization is provided by both smart card reader 350 and fingerprint reader 352.

Referring now to FIGS. 27 and 27A, an alternative embodiment of peripheral keyboard 44 depicts a touchpad area 450 in a peripheral keyboard 44 under number pad keys 452. A capacitive touch membrane couples under the touchpad area 450 to enable touch detection by proximity detection when an end user places a finger on the number pad keys 452. Magnetic attraction under number pad keys 452 retracts the number pad keys when in a touchpad mode so that the end user has a flat touch surface across the number pad keys at which to trace finger movements. When the end user prefers to use the number pad keys to input numbers with key presses, the magnetic attraction is removed to bias the keys upward to accept key presses. FIG. 27A depicts a sectional view of a key 56 having a magnet 454 within the scissors 70 that is collapsed to a retracted position by magnet 456 when aligned to enable the touchpad area 450.

Figure 28:
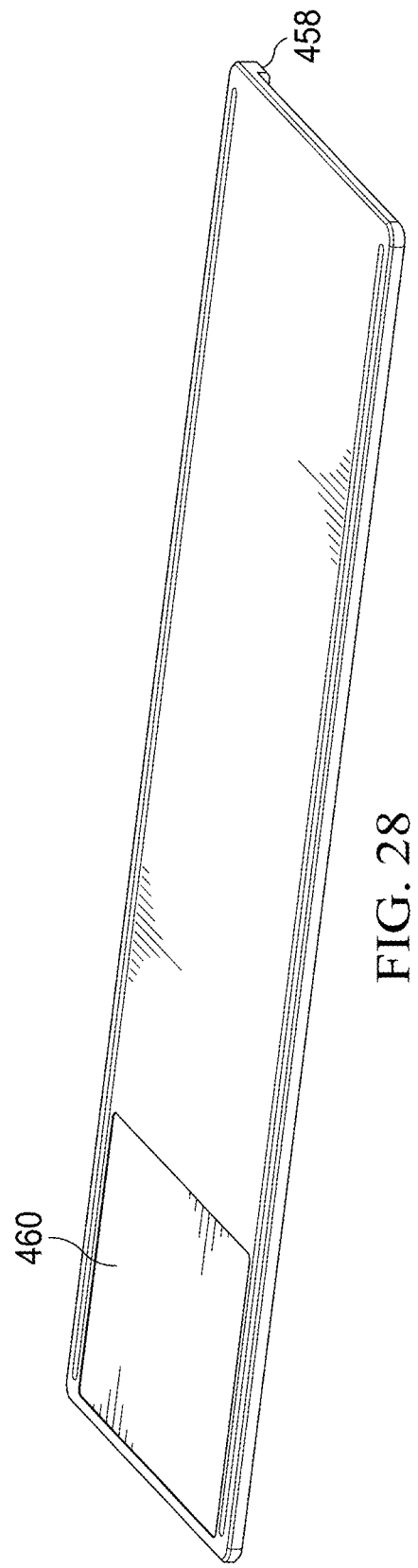
FIG. 28 depicts an upper perspective view of a keyboard tray having a magnet sheet that interacts with key magnets to collapse number pad keys in support of the touchpad mode.

Referring now to FIG. 28, an upper perspective view of a keyboard tray 458 depicts a magnet sheet 460 that interacts with key magnets to collapse number pad keys in support of the touchpad mode. Keyboard tray 458 snaps into place on a bottom side of a peripheral keyboard so that magnet sheet 460 aligns with the touchpad area underneath the number pad keys. When an end user desires to enable the number pad, the end user removes the keyboard tray from the bottom side of the peripheral keyboard to release the number pad keys. In one embodiment, the magnetic sheet 460 may have an area that passes under the entire keyboard so that all of the keys will collapse when each key has a magnet. This reduces the vertical height of the keyboard when stored, such as in the keyboard storage case described in greater detail below.

Figure 29:
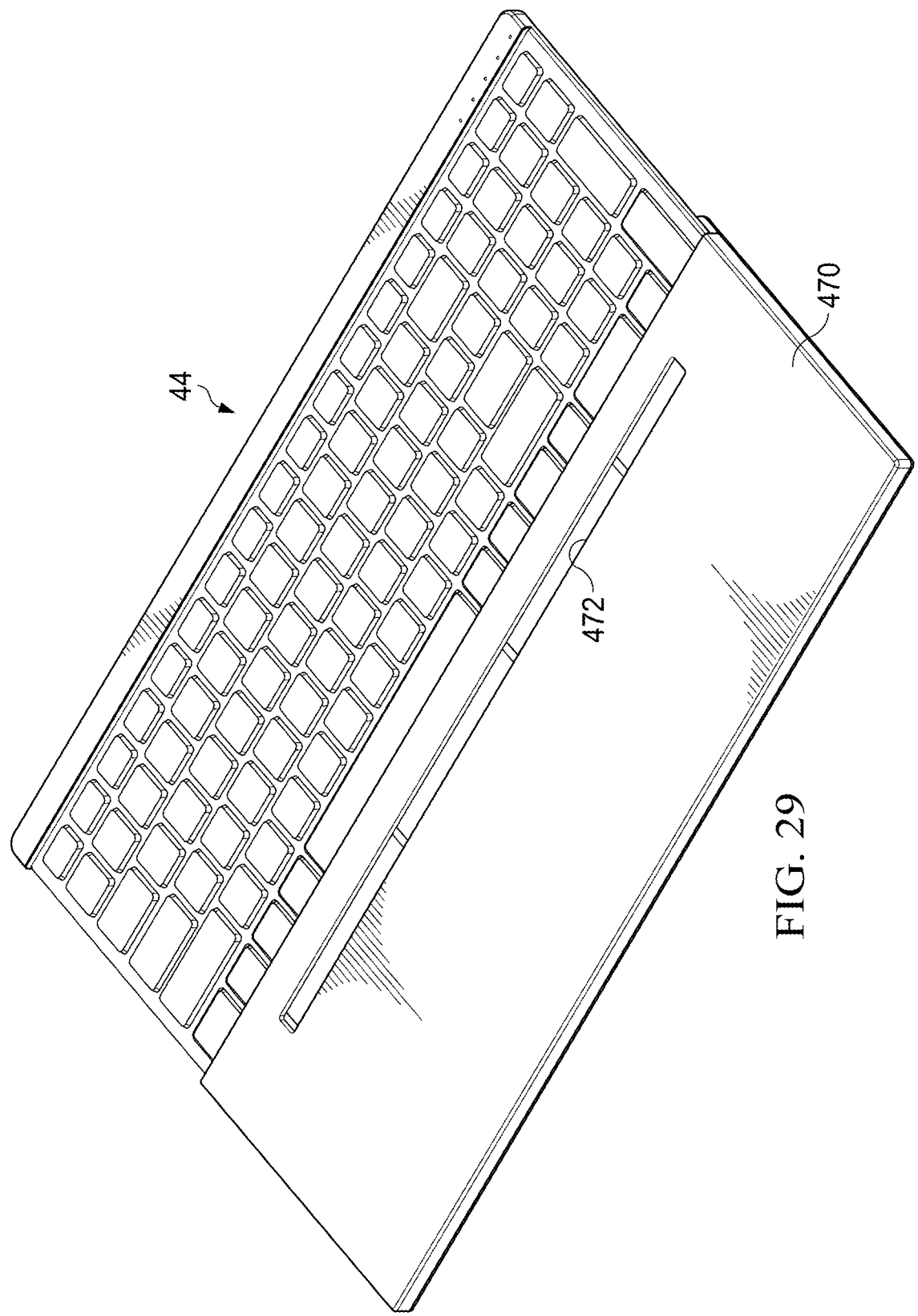
FIGS. 29 and 29A depict an example embodiment of a carrying case that carries a peripheral keyboard with the keyboard keys in a retracted state.
Figure 29A:
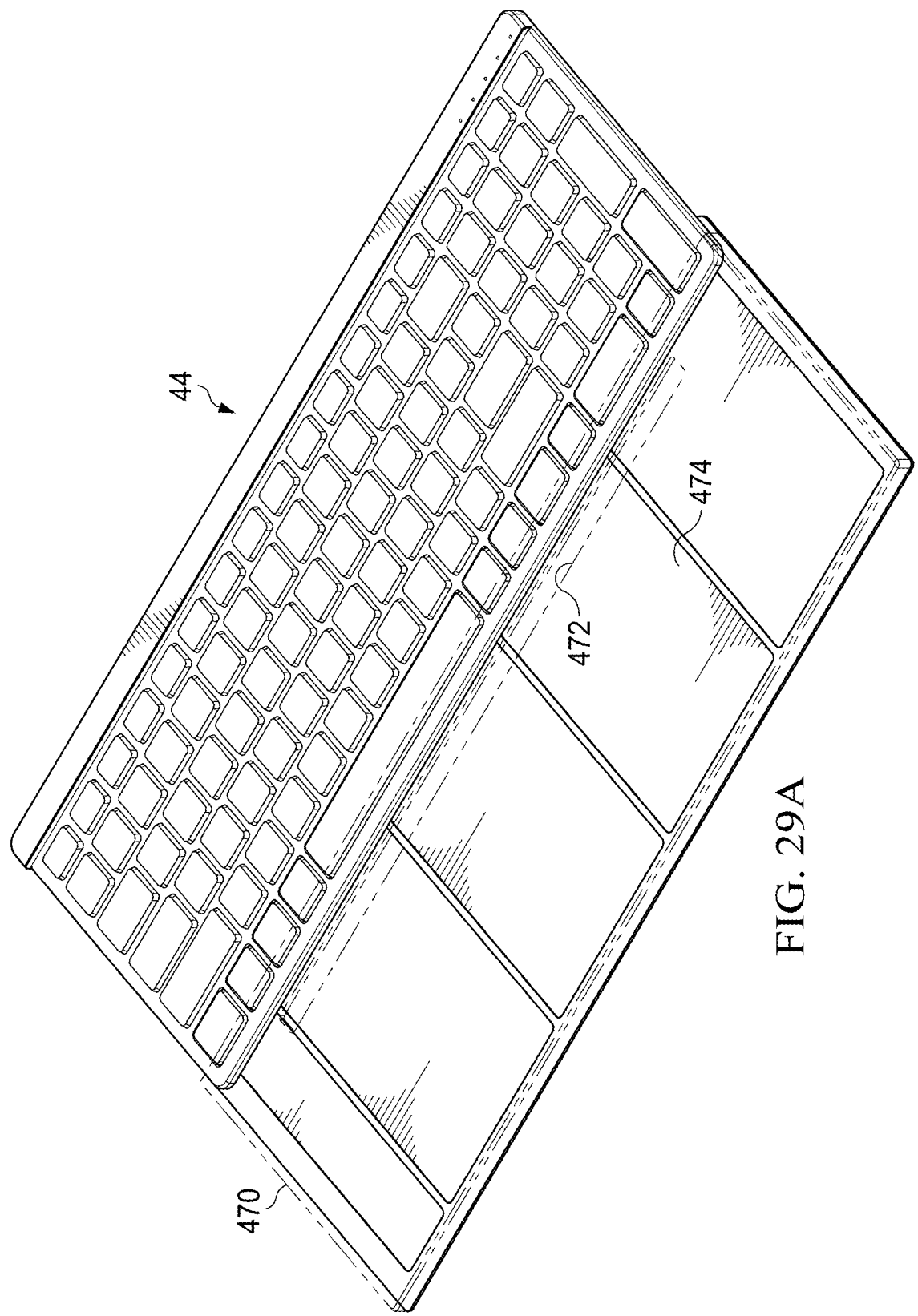

Referring now to FIGS. 29 and 29A, an example embodiment of a carrying case 470 is depicted that carries a peripheral keyboard 44 with the keyboard keys in a retracted state. FIG. 29 depicts a first example embodiment of the carrying case 470 having a magnetic strip 472 at an entrance opening so that peripheral keyboard 44 has magnets in the keys that retract the keys as the keys enter into the carrying case. Once the keys pass the magnetic strip 472, the key caps are released to press against the carrying case interior, which maintains the keys in the retracted state. FIG. 29A depicts a transparent view of an alternative embodiment of the carrying case 470 having magnetic sheets 474 at a bottom surface of the carrying case that maintain the keys in the retracted state while in the carrying case. Magnetic strip 472 provides an initial increase in the magnetic field at entry of the keyboard into the carrying case to initiate retraction while magnetic sheets 474 maintain the retracted position.

Figure 30:
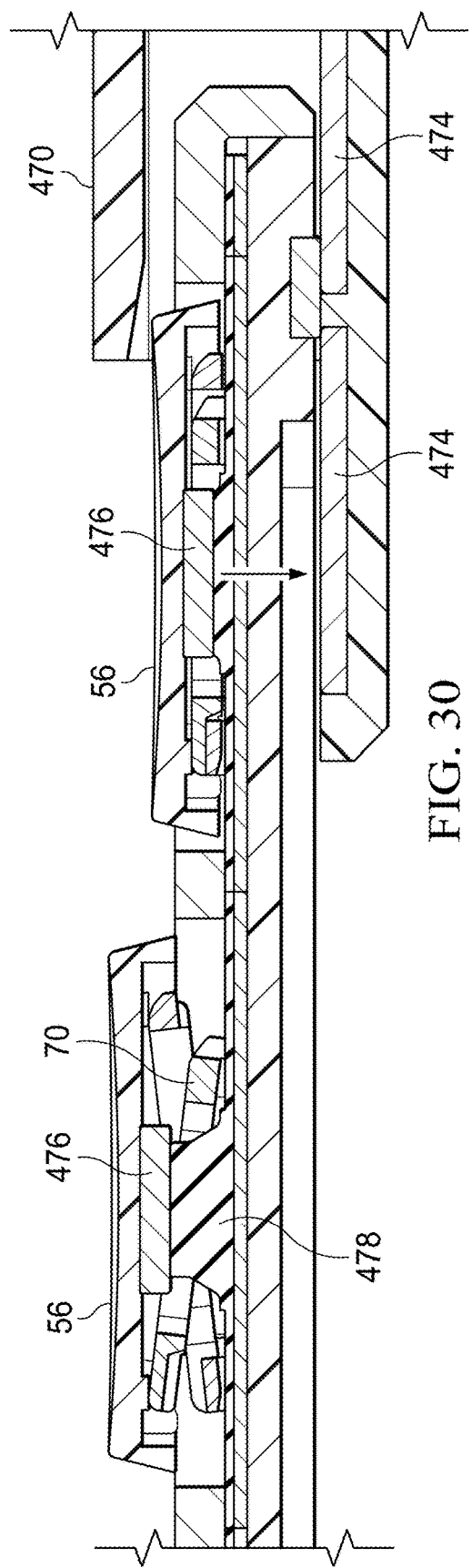
FIG. 30 depicts a sectional side view of a peripheral keyboard having keys magnetically retracted when inserted into a carrying case.
Figure 31:
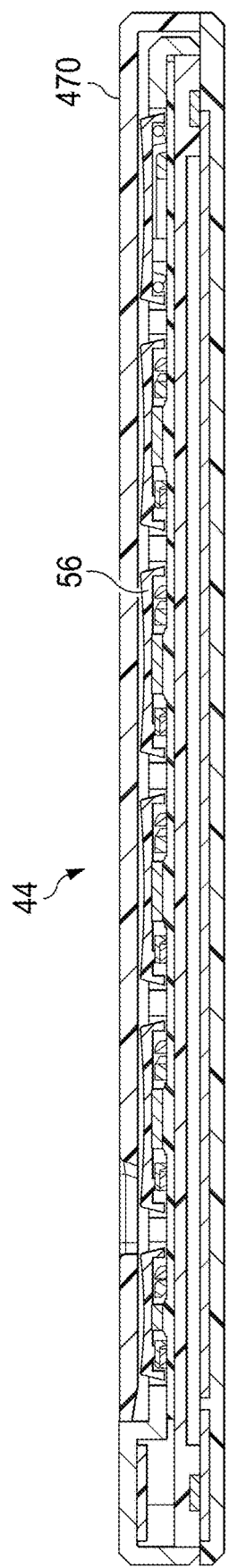
FIG. 31 depicts a peripheral keyboard fully inserted into the carrying case so that keys are fully retracted and the keyboard stores in an area of reduced height with the rear edge extending out of the carrying case so that an end user can grasp the end and pull the keyboard out of the carrying case.

Referring now to FIG. 30, a sectional side view depicts a peripheral keyboard having keys magnetically retracted when inserted into a carrying case. As peripheral keyboard 44 inserts into carrying case 470, magnet sheets 474 interact with magnets 476 in each key 56 to retract the key at the scissors 70 and overcome the upward biasing forces of rubber dome 478. When peripheral keyboard 44 is pulled out of carrying case 470, magnets 476 lose their magnetic attraction with misalignment to magnet sheets 474 so that rubber dome 478 biases keys 56 to a raised position. FIG. 31 depicts a peripheral keyboard 44 fully inserted into carrying case 470 so that keys 56 are fully retracted and the keyboard stores in an area of reduced height with the rear edge extending out of the carrying case so that an end user can grasp the end and pull the keyboard out of the carrying case.

Figure 32:
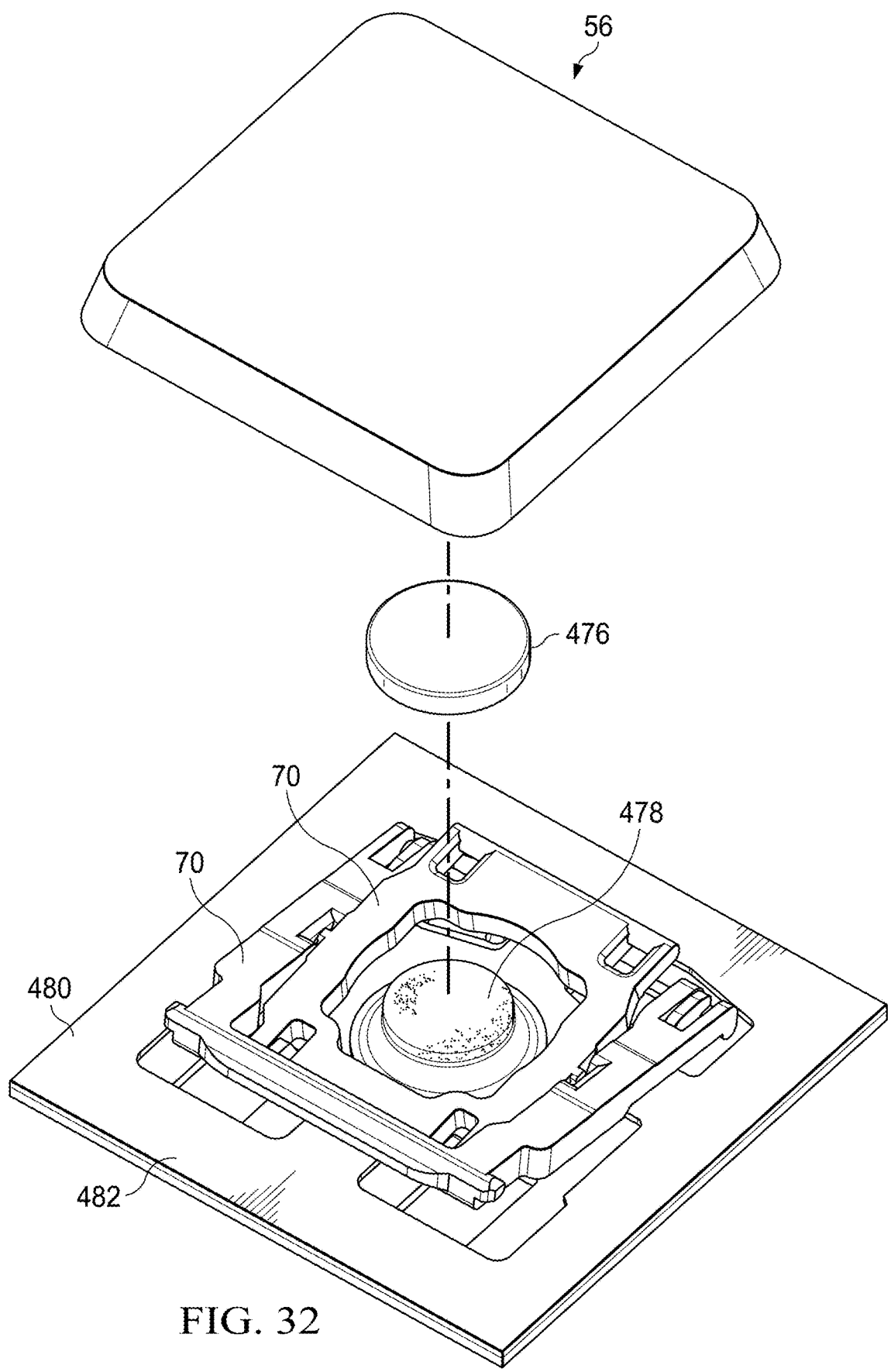
FIG. 32 depicts an exploded perspective view of a key that includes a magnet to support retraction of the key for storage and when in a touchpad mode of operation.

Referring now to FIG. 32, an exploded perspective view depicts a key 56 that includes a magnet 476 to support retraction of the key for storage and when in a touchpad mode of operation. In the example embodiment, the key has a modular form although alternative embodiments may have other formats. A base plate 480 has a membrane 482 coupled to an upper surface that can include a key sensor to detect a touch of the key depressed to perform an input and a touch detection surface to proximity sense fingers at the key upper surface. A rubber dome 478 biases the key 56 upwards with the vertical movement guided by scissors 70. A magnet 476 couples to the bottom of key 56 with adhesive to retract the key and overcome the bias of rubber dome 478 when a magnetic field is applied below the key. A capacitive touch detection sensor in membrane 482 detects an end user finger through the key by proximity, such as to support a touchpad operation as described above. In the various embodiments described herein that detect proximity by capacitive touch detection above keys, the keys may include metallic material as described above to enhance the capacitive touch detection sensor's ability to sense through the keys.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor coupled in the housing and operable to execute instructions to process information;
   a memory coupled in the housing and interfaced with the processor, the memory operable to store the instructions and information; and
   a keyboard interfaced with the processor, the keyboard having plural keys biased to a raised position, each key accepting an end user press as an input, the keyboard further having a display panel coupled at an upper surface, the display panel having a touch detection surface and plural transparent keys with transparent key caps, the display panel presenting a key input value for each transparent key viewable through the transparent key cap;
   wherein the key input values comprise a predictive text.

2. The information handling system of claim 1 wherein each transparent key comprises:
   a base portion having a first set of magnets to magnetically couple to the display panel;
   an upper portion slidingly engaged with the base portion and having a second set of magnets to interact with the first set of magnets and bias the upper portion away from the display panel; and
   a transparent key cap to accept end user inputs as presses that overcome the bias of the upper portion.

3. The information handling system of claim 2 further comprising a conductive strip extending down from the upper portion to contact the display panel when the upper portion is pressed down as an input.

4. The information handling system of claim 3 wherein the plural transparent keys arrange as a number pad having fourteen square areas and three rectangular areas.

5. The information handling system of claim 2 further comprising:
   a controller interfaced with the keyboard and operable to execute instructions; and
   a non-transitory memory storing instructions that when executed on the controller causes:
   detection of a position of each transparent key base portion on the display panel; and
   presentation of visual images at each position and associated with a key input at the position.

6. The information handling system of claim 2 wherein the instructions further:
   detect a pattern associated with the transparent key positions; and
   in response to the pattern, present key values at the transparent keys associated with the pattern.

7. The information handling system of claim 6 wherein the pattern is a number pad.

8. The information handling system of claim 6 further comprising:
   a conductive transparent key cap on each of the plural transparent keys; and
   a conductive coating on the transparent key upper portion;
   wherein touches to the conductive transparent key cap are detected by the touch detection surface in part through the conductive coating.

9. A method for coupling adaptive modular keys to an information handling system keyboard, the method comprising:
   coupling a display panel at a keyboard upper surface;
   coupling each of the adaptive modular keys to the display panel by magnetic attraction; and
   presenting a key input value for each of the adaptive modular keys at the display panel, the key input value visible through a transparent key cap of each adaptive modular key;
   wherein the key input values comprise a predictive text.

10. The method of claim 9 further comprising:
    coupling for each of the adaptive modular keys an upper portion sliding in a base portion;
    biasing the upper portion away from the base portion and display panel; and
    detecting a key input when the upper portion contacts the display panel.

11. The method of claim 10 further comprising:
    biasing the upper portion from the base portion with like polarity magnets; and
    coupling a conductive strip to a bottom side of the upper portion to enhance detection of a touch by the upper portion at the display panel.

12. The method of claim 11 further comprising:
    detecting a position of each adaptive modular key base portion on the display screen;

comparing a pattern of the detected positions with plural predetermined patterns to identify the key values associated with the adaptive modular keys; and automatically presenting the key values at the display panel at each of the adaptive modular keys.

13. The method of claim 11 further comprising coating the base portion and upper portion with metal powder to enhance capacitive touch detection of touches at the transparent key cap.

14. The method of claim 9 further comprising:

predicting text based upon end user inputs;

presenting a predicted text value at each adaptive modular key; and inserting the predicted text when an end user touches an adaptive modular key associated with the presentation of the predicted text.

15. A keyboard comprising:

plural keys biased to a raised position, each key accepting an end user press as an input;

a display panel coupled at an upper surface, the display panel having a touch detection surface; and plural transparent keys with transparent key caps, the display panel presenting a key input value for each transparent key viewable through the transparent key cap;

wherein the key input values comprise a predictive text.

16. The keyboard of claim 15 further wherein each transparent key comprises:

a base portion having a first set of magnets to magnetically couple to the display panel;

an upper portion slidingly engaged with the base portion and having a second set of magnets to interact with the first set of magnets and bias the upper portion away from the display panel; and a transparent key cap to accept end user inputs as presses that overcome the bias of the upper portion.

17. The keyboard of claim 16 further comprising a conductive strip extending down from the upper portion to contact the display panel when the upper portion is pressed down as an input.

18. The keyboard of claim 17 further comprising:

a controller interfaced with the keyboard and operable to execute instructions; and a non-transitory memory storing instructions that when executed on the controller causes:

detection of a position of each transparent key base portion on the display panel; and presentation of visual images at each position and associated with a key input at the position.

19. The keyboard of claim 18 wherein the instructions further:

detect a pattern associated with the transparent key positions; and in response to the pattern, present key values at the transparent keys associated with the pattern.

* * * * *